US012652559B2

(12) United States Patent
Zhang

(10) Patent No.: US 12,652,559 B2
(45) Date of Patent: Jun. 9, 2026

(54) METHOD AND DEVICE FOR FAST MASTER CELL GROUP LINK RECOVERY IN WIRELESS COMMUNICATIONS

(71) Applicant: Apogee Networks, LLC, Plano, TX (US)

(72) Inventor: Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 586 days.

(21) Appl. No.: 17/974,498

(22) Filed: Oct. 26, 2022

(65) Prior Publication Data

US 2023/0100878 A1 Mar. 30, 2023

Related U.S. Application Data

(63) Continuation of application No. PCT/CN2021/091503, filed on Apr. 30, 2021.

(30) Foreign Application Priority Data

May 6, 2020 (CN) .......................... 202010372499.4
May 9, 2020 (CN) .......................... 202010384934.5

(Continued)

(51) Int. Cl.
*H04W 24/08* (2009.01)
*H04W 76/15* (2018.01)
(Continued)

(52) U.S. Cl.
CPC ........... *H04W 24/08* (2013.01); *H04W 76/19* (2018.02); *H04W 76/25* (2018.02); *H04W 76/30* (2018.02)

(58) Field of Classification Search
CPC ..... H04W 76/15; H04W 76/18; H04W 76/19; H04W 76/25; H04W 76/27; H04W 76/30;
(Continued)

(56) References Cited

U.S. PATENT DOCUMENTS 11,483,889 B2 * 10/2022 Kim ...................... H04W 76/19
12,185,402 B2 * 12/2024 Orsino .................. H04W 76/19
(Continued)

FOREIGN PATENT DOCUMENTS

CN 104811982 A 7/2015
CN 106537971 A 3/2017
(Continued)

OTHER PUBLICATIONS

Office Action received in application EP21723095.2 dated Aug. 24, 2023.
(Continued)

*Primary Examiner* — Jason E Mattis
*Assistant Examiner* — Scott A Schlack
(74) *Attorney, Agent, or Firm* — Volpe Koenig

(57) ABSTRACT

Method and device in a communication node for wireless communications. A communication node determines that a physical-layer problem occurs in a first serving cell; as a response to determining that the physical-layer problem occurs in the first serving cell, starts a first timer; determines that a first condition set is satisfied; as a response to the first condition set being satisfied, transmits a first signaling; as a response to the first condition set being satisfied, starts a second timer and stops the first timer; when the second timer is in a running state, monitors a second signaling; the first condition set comprises that an RLF occurs in the first serving cell and the second timer is configured; the second timer is associated with the first serving cell; the first signaling is used to initiate a radio connection recovery; and the second signaling is used to update a radio connection.

14 Claims, 12 Drawing Sheets

(30) Foreign Application Priority Data

| May 15, 2020 | (CN) | .......................... 202010414985.8 |
| May 28, 2020 | (CN) | .......................... 202010466971.0 |
| Mar. 24, 2021 | (CN) | .......................... 202110313749.1 |

(51) Int. Cl.

| | |
| --- | --- |
| *H04W 76/19* | (2018.01) |
| *H04W 76/25* | (2018.01) |
| *H04W 76/30* | (2018.01) |

(58) Field of Classification Search

CPC ............. H04W 76/38; H04W 36/0011; H04W 36/0058; H04W 36/0069; H04W 36/00695; H04W 36/0079; H04W 36/00837; H04W 36/32; H04W 36/36; H04W 36/305; H04W 36/362; H04W 74/0841; H04W 74/0858; H04W 24/08; H04W 24/10

See application file for complete search history.

(56) References Cited

U.S. PATENT DOCUMENTS

| | | | | |
| --- | --- | --- | --- | --- |
| 2019/0253949 | A1 | 8/2019 | Park et al. | |
| 2020/0037242 | A1 | 1/2020 | Yilmaz et al. | |
| 2020/0045764 | A1 | 2/2020 | Kim | |
| 2020/0059395 | A1* | 2/2020 | Chen | ................... H04W 28/082 |
| 2022/0110180 | A1* | 4/2022 | Jung | .................... H04W 76/30 |
| 2022/0124568 | A1* | 4/2022 | Wu | ..................... H04W 36/305 |
| 2023/0081518 | A1* | 3/2023 | Jin | .................... H04W 36/0011 |
| | | | | 370/311 |
| 2023/0086398 | A1* | 3/2023 | Teyeb | ................... H04W 76/19 |
| 2023/0142688 | A1* | 5/2023 | Wu | ....................... H04W 76/19 |
| | | | | 370/329 |
| 2023/0262540 | A1* | 8/2023 | Kim | .................... H04W 36/362 |
| | | | | 370/216 |

FOREIGN PATENT DOCUMENTS

| | | | |
| --- | --- | --- | --- |
| CN | 110447180 | A | 11/2019 |
| CN | 110582128 | A | 12/2019 |
| CN | 110839301 | A | 2/2020 |
| WO | 2017163676 | A1 | 9/2017 |
| WO | 2020034949 | A1 | 2/2020 |

OTHER PUBLICATIONS

Office Action received in application EP21723095.2 dated Sep. 18, 2024.

Second Office Action of Chinese patent application No. CN202010384934.5 dated Apr. 26, 2023.

Supplementary Search Report of Chinese patent application No. CN202010384934.5 dated Apr. 23, 2023.

3GPP TS 38.331 V16.0.0 Technical Specification, 3rdGeneration Partnership Project; Technical Specification Group Radio Access Network; NR; Radio Resource Control(RRC) protocol specification(Release 16) Mar. 31, 2020.

Ericsson (Rapporteur) CR for 36.331 on CA/DC Enhancements 3GPP TSG-RAN WG2 Meeting #109bis-e R2-2003381 Apr. 15, 2020.

Notification to Grant Patent Right for Invention of Chinses patent application No. CN202010384934.5 dated Jul. 28, 2023.

Notification to Grant Patent Right for Invention of Chinses patent application No. CN202110313749.1 dated Jun. 27, 2023.

Second Search Report of Chinses patent application No. CN202110313749.1 dated Jun. 2, 2023.

Supplementary Search Report of Chinses patent application No. CN202110313749.1 dated Jun. 1, 2023.

3GPP TS 38.331 V16.0.0(Mar. 2020) 3rd Generation Partnership Project; Technical Specification Group Radio Access Network; NR;Radio Resource Control (RRC) protocol specification (Release 16) Apr. 6, 2020.

Intel Corporation "Open issues on Configuration of MCG failure indication and timer T316" 3GPP TSG-RAN WG2 Meeting #108 R2-1914863 Nov. 8, 2019.

ISR received in application No. PCT/CN2021/091503 dated Jul. 19, 2021.

First Office Action of Chinses patent application No. CN202010384934.5 dated Dec. 29, 2022.

First Office Action of Chinses patent application No. CN202110313749.1 dated Jan. 12, 2023.

First Search Report of Chinses patent application No. CN202010384934.5 dated Dec. 21, 2022.

First Search Report of Chinses patent application No. CN202110313749.1 dated Dec. 30, 2022.

Samsung, "Draft 36331 Rel-16 resulting from CR merge [108#28][R16 RRC]," 3GPP TSG-RAN WG2 Meeting #109e, R2-20xxxxx (R2-2001159), Online (Feb. 24-Mar. 6, 2020).

Third Generation Partnership Project, "Technical Specification Group Radio Access Network; Evolved Universal Terrestrial Radio Access (E-UTRA) and NR; Multi-connectivity; Stage 2 (Release 16)," 3GPP TS 37.340 V16.1.0 (Mar. 2020).

Third Generation Partnership Project, "Technical Specification Group Radio Access Network; NR; Multiplexing and channel coding (Release 16)," 3GPP TS 38.212 V16.1.0 (Mar. 2020).

Third Generation Partnership Project, "Technical Specification Group Radio Access Network; NR; Physical layer procedures for data (Release 16)," 3GPP TS 38.214 V16.1.0 (Mar. 2020).

Third Generation Partnership Project, "Technical Specification Group Radio Access Network; NR; NR and NG-RAN Overall Description; Stage 2 (Release 16)," 3GPP TS 38.300 V16.1.0 (Mar. 2020).

Third Generation Partnership Project, "Technical Specification Group Radio Access Network; NR; Medium Access Control (MAC) protocol specification (Release 16)," 3GPP TS 38.321 V16.0.0 (Mar. 2020).

* cited by examiner

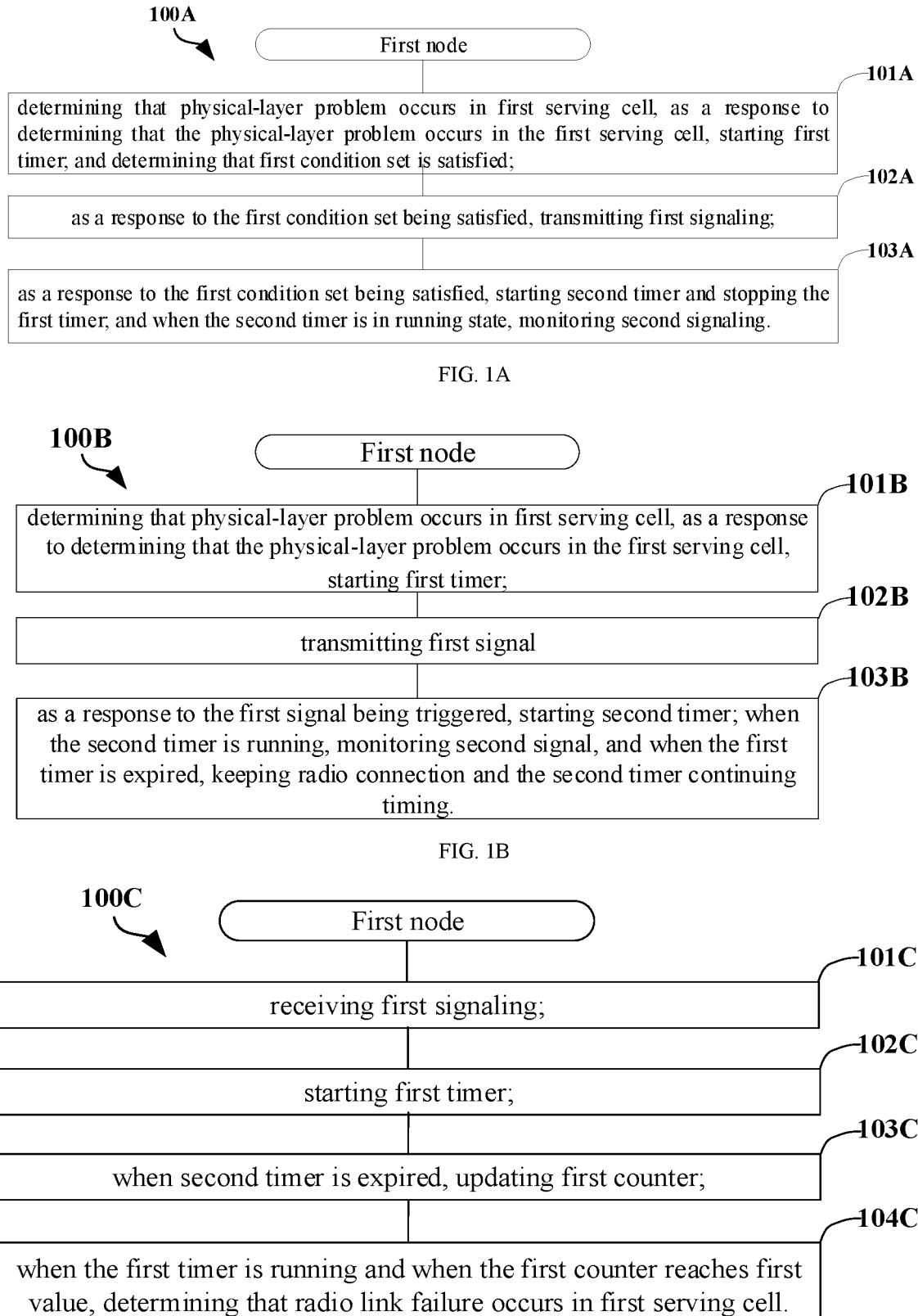

100A

First node determining that physical-layer problem occurs in first serving cell, as a response to determining that the physical-layer problem occurs in the first serving cell, starting first timer; and determining that first condition set is satisfied; ⌐101A as a response to the first condition set being satisfied, transmitting first signaling; ⌐102A as a response to the first condition set being satisfied, starting second timer and stopping the first timer; and when the second timer is in running state, monitoring second signaling. ⌐103A

First node determining that physical-layer problem occurs in first serving cell, as a response to determining that the physical-layer problem occurs in the first serving cell, starting first timer; ⌐101B transmitting first signal ⌐102B as a response to the first signal being triggered, starting second timer; when the second timer is running, monitoring second signal, and when the first timer is expired, keeping radio connection and the second timer continuing timing. ⌐103B

First node receiving first signaling; ⌐101C starting first timer; ⌐102C when second timer is expired, updating first counter; ⌐103C when the first timer is running and when the first counter reaches first value, determining that radio link failure occurs in first serving cell. ⌐104C

FIG. 1C

Radio connection failure occurs ⟷ being unrelated to First timer

Transmitting behavior of first signaling → does not effect → timing of third timer

FIG. 9A

☒ First offset part of second timer
☒ First expiration value part of second timer Starting second timer                                        Second timer being expired Ninth time    Tenth time                                Eleventh time    Time

FIG. 9B

☐ First timer

First condition set being satisfied     Second condition set being satisfied

Starting first timer     Stopping first timer     First timer being expired

Second timer being in running state → used to determine → not to start first timer

FIG. 10A

Starting second timer → used to determine → resetting first counter and second counter

FIG. 10B

Third condition set being satisfied → used to determine → resetting first counter

FIG. 10C

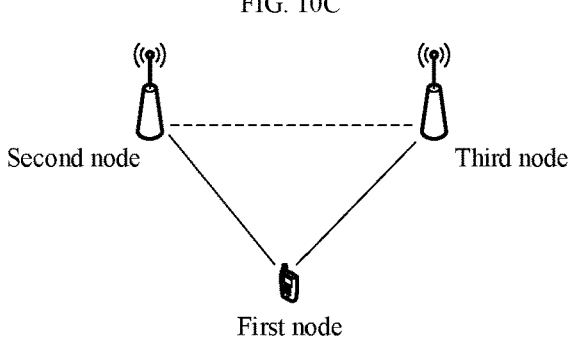

Second node          Third node

First node

FIG. 11A

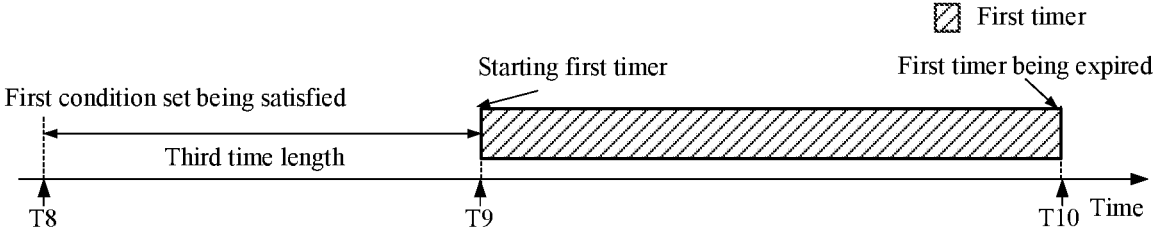
FIG. 11B
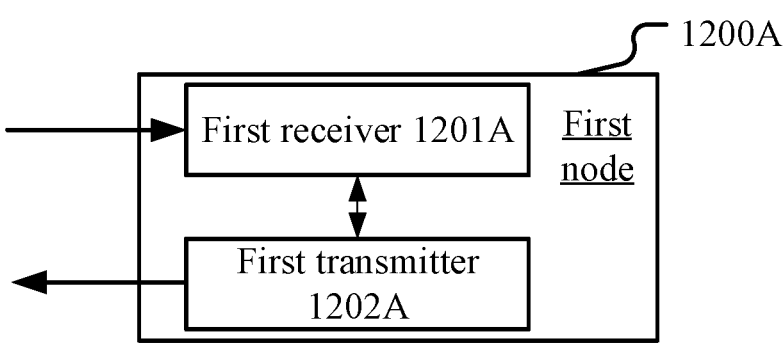
FIG. 11C
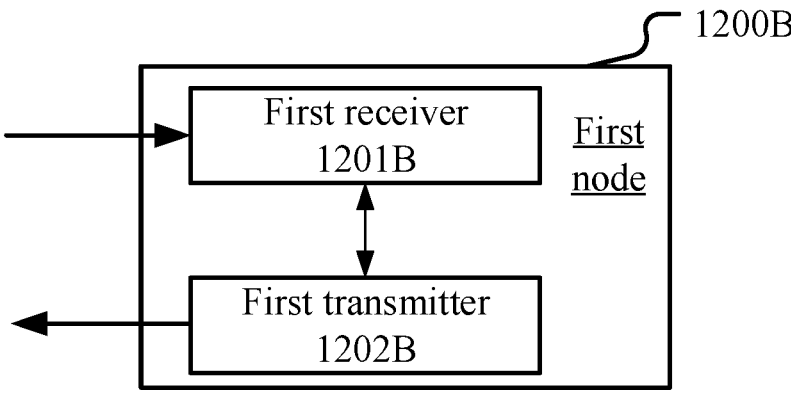
FIG. 12A
FIG. 12B
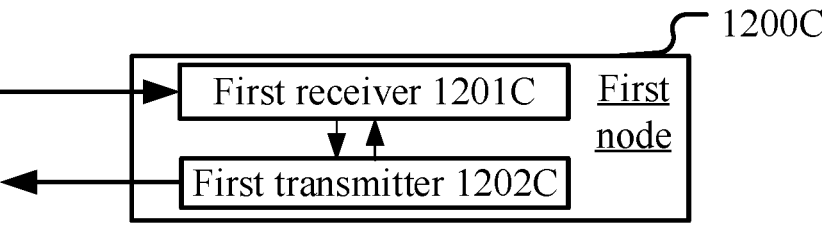
FIG. 12C

METHOD AND DEVICE FOR FAST MASTER CELL GROUP LINK RECOVERY IN WIRELESS COMMUNICATIONS

CROSS REFERENCE TO RELATED APPLICATIONS

This application is a continuation of International Application No. PCT/CN2021/091503, filed Apr. 30, 2021, which claims the priority benefit of Chinese Patent Application No. 202010372499.4, filed on May 6, 2020, and claims the priority benefit of Chinese Patent Application No. 202010384934.5, filed on May 9, 2020, and claims the priority benefit of Chinese Patent Application No. 202110313749.1, filed on Mar. 24, 2021, and claims the priority benefit of Chinese Patent Application No. 202010414985.8, filed on May 15, 2020, and claims the priority benefit of Chinese Patent Application No. 202010466971.0, filed on May 28, 2020, the full disclosure of which is incorporated herein by reference.

BACKGROUND

Technical Field

The present disclosure relates to transmission methods and devices in wireless communication systems, and in particular to a transmission method and device of radio link failure and recovery.

Related Art

When a counter N310 reaches a maximum value, it indicates that a physical-layer problem occurs and starts a timer T310; when the timer T310 is expired, it determines that a Radio Link Failure (RLF) occurs. Fast Master Cell Group (MCG) Link Recovery was studied in a Work Item (WI) of enhanced Dual Connectivity and Carrier Aggregation (eDCCA) in Release 16, in which MCG link recovery through a Secondary Cell Group (SCG) after an MCG RLF is supported. And when the Fast MCG Link Recovery is performed, a timer T316 is started and an MCGFailureInformation message is transmitted.

When the timer T310 is running and a UE satisfies a measurement configuration and transmits a measurement report, the UE starts a timer T312; when an RRC connection reconfiguration message carrying synchronization information is received, the UE stops the timer T312; when the timer T312 is expired, the UE performs an RRC connection reestablishment procedure or enters into an RRC_IDLE state. When an RLF occurs in an MCG, and if a condition of Fast MCG Link Recovery is satisfied, the UE transmits an MCG failure information message and starts the timer T316; when the UE receives an RRC connection release message or an RRC connection reconfiguration message and completes an RRC connection reconfiguration, it stops the timer T316; when the timer T316 is expired, the UE performs an RRC connection reestablishment procedure. The Current RLF-related timers are only for Terrestrial Networks (TN). Facing increasingly higher communication requirements, 3rd Generation Partner Project (3GPP) started a research on Non-Terrestrial Network (NTN) communications, 3GPP RAN #80 plenary decided to carry out a research on a solution of New Radio (NR) supporting NTNs. When a counter N310 reaches a maximum value, it indicates that a physical-layer problem occurs and starts the timer T310; when the timer T310 is expired, the UE declares that an RLF occurs, and initiates a Radio Resource Control (RRC) connection reestablishment or an RRC connection recovery procedure. Facing increasing higher communication requirements, 3GPP started a research on NTN communications, 3GPP RAN #80 plenary decided to carry out a research on a solution of NR supporting NTNs.

SUMMARY

The existing 3GPP protocol is for that a timer T310 and a timer T316 are not designed collaboratively, when the timer T310 is running and an MCG RLF occurs in a UE, such as a Random Access (RA) problem or a rlc-MaxNum-Retx, according to the exiting technology, if a condition of fast MCG link recovery is satisfied, the UE performs an MCG failure information procedure and starts the timer T316 instead of triggering an RRC connection reestablishment procedure, when the timer T316 is running, the timer T310 continues running until it is stopped or expired. When the timer T316 is running, and if the timer T310 is expired, the UE will perform a fast MCG link recovery procedure or an RRC reestablishment procedure or enters into an RRC-IDLE state according to an expiration behavior of the timer T310, which results in that the timer T316 is stopped and the current fast MCG link recovery procedure is terminated. For one thing, when the timer T316 is running, an expiration of the timer T310 will cause a fast MCG Link Recovery failure; For another, when an RLF occurs in the UE, the UE first enters into a fast MCG link recovery procedure, jumps out of the fast MCG link recovery procedure due to the expiration of the timer T310 and then performs an RRC reestablishment, which increases delay of UE link recovery and results in unnecessary signaling overhead. Similarly, for a timer of the RLF, such as a timer T312, there will be similar problems.

To address the above problem, the present disclosure provides a solution. In the statement above, the scenario of TN communications is taken as an example; the present disclosure is also applicable to other scenarios, such as NTN transmission, where similar technical effects can be achieved. Additionally, the adoption of a unified solution for various scenarios contributes to the reduction of hardware complexity and costs.

Transmission delay of NTN networks is much longer than transmission delay of TN networks. Some timers has little to do with the transmission delay, such as the timer T310; however, some timers need signaling interaction between a UE and a base station when they are running, which will inevitably be affected by large delay, such as the timer T312. When the UE starts the T312, it needs to wait for receiving an RRC connection reconfiguration message when the timer T312 is running, since a delay of a Geostationary satellite (GEO) may reach 500 ms, the timer T310 is easily expired during this period, which will cause the stop of the timer T312. For timers T310 and T316, similar problems also exist. Therefore, in NTN, a collaborative design needs to be performed on a delay-sensitive timer and a delay-insensitive timer.

To address the above problem, the present disclosure provides a solution. It should be noted that though the present disclosure only took the NTN scenario for example in the statement above, it is also applicable to other scenarios such as TN where similar technical effect can be achieved; additionally, the adoption of a unified solution for various scenarios contributes to the reduction of hardware complexity and costs.

Transmission delay of NTN networks is much longer than transmission delay of TN networks. If the timer T310 is set too short, an RLF will be triggered frequently; and if the timer T310 is set too long, an RLF cannot be triggered in time when the link is poor. Therefore, in NTN, a design is needed for the timer T310.

To address the above problem, the present disclosure provides a solution. It should be noted that though the present disclosure only took the NTN scenario for example in the statement above, it is also applicable to other scenarios such as terrestrial transmissions where similar technical effect can be achieved; additionally, the adoption of a unified solution for various scenarios contributes to the reduction of hardware complexity and costs.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:

determining that a physical-layer problem occurs in a first serving cell; as a response to determining that the physical-layer problem occurs in the first serving cell, starting a first timer; determining that a first condition set is satisfied;

as a response to the first condition set being satisfied, transmitting a first signaling; and as a response to the first condition set being satisfied, starting a second timer and stopping the first timer; when the second timer is in a running state, monitoring a second signaling;

herein, the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, a problem to be solved in the present disclosure includes: when the second timer is running, an expiration of the first timer may cause the radio connection recovery failure.

In one embodiment, a problem to be solved in the present disclosure includes: when the timer T316 is running, an expiration of the timer T310 will cause a Fast MCG Link Recovery failure.

In one embodiment, a problem to be solved in the present disclosure includes: when the timer T316 is running, an expiration of the timer T312 will cause a Fast MCG Link Recovery failure.

In one embodiment, a problem to be solved in the present disclosure includes increasing delay of a UE link recovery.

In one embodiment, a problem to be solved in the present disclosure includes resulting in unnecessary signaling overhead.

In one embodiment, characteristics of the above method include when the second timer is started and if the first timer is running, stopping the first timer.

In one embodiment, characteristics of the above method include when the timer T316 is started and if the timer T310 is running, stopping the timer T310.

In one embodiment, characteristics of the above method include when the timer T316 is started and if the timer T312 is running, stopping the timer T312.

In one embodiment, characteristics of the above method include: the timer T310 and the timer T316 are not running at the same time.

In one embodiment, characteristics of the above method include: starting the second timer is taken as a trigger condition for stopping the first timer.

In one embodiment, advantages of the above method include that the influence of the first timer on a Fast MCG Link Recovery is avoided.

In one embodiment, advantages of the above method include that the influence of the timer T310 on a Fast MCG Link Recovery is avoided.

In one embodiment, advantages of the above method include that the influence of the timer T312 on a Fast MCG Link Recovery is avoided.

In one embodiment, advantages of the above method include that the probability of a Fast MCG Link Recovery is improved.

In one embodiment, advantages of the above method include reducing unnecessary signaling overhead.

In one embodiment, advantages of the above method include reducing unnecessary delay.

According to one aspect of the present disclosure, wherein the occurrence of the radio connection failure is unrelated to the first timer.

According to one aspect of the present disclosure, comprising:

determining that the physical-layer problem occurs in a second serving cell; as a response to determining that the physical-layer problem occurs in the second serving cell, starting a third timer;

herein, a transmitting behavior of the first signaling does not affect a timing of the third timer.

According to one aspect of the present disclosure, comprising:

as a response to the second signaling being received, when the second signaling comprises an RRC connection release message, stopping the second timer; when the second signaling comprises an RRC connection reconfiguration message, transmitting a third signaling and stopping the second timer;

herein, the third signaling is used to confirm the RRC connection reconfiguration message.

According to one aspect of the present disclosure, comprising:

when the second timer is expired, transmitting a fourth signaling;

herein, the fourth signaling is used to request an RRC connection reestablishment.

According to one aspect of the present disclosure, comprising:

receiving a fifth signaling;

herein, the fifth signaling is used to indicate an expiration value of the first timer and an expiration value of the second timer; the fifth signaling comprises a first field, and the first field is used to indicate a state of the second timer.

According to one aspect of the present disclosure, wherein when the second timer is in a running state, the first timer is not started.

The present disclosure provides a method in a second node for wireless communications, comprising:

monitoring a first signaling; and when the first signaling is received, transmitting a second signaling;

herein, as a response to determining that a physical-layer problem occurs in a first serving cell, a first timer is started; as a response to a first condition set being satisfied, a second timer is started and the first timer is stopped; the first condition set comprises that an RLF occurs in the first serving cell and the second timer is configured; the second timer is associated with the first serving cell; the first signaling is used to initiate a radio connection recovery; and the second signaling is used to update a radio connection.

According to one aspect of the present disclosure, wherein the occurrence of the radio connection failure is unrelated to the first timer.

According to one aspect of the present disclosure, wherein as a response to determining that the physical-layer problem occurs in a second serving cell, a third timer is started; herein, a transmitting behavior of the first signaling does not affect a timing of the third timer.

According to one aspect of the present disclosure, comprising:

as a response to the second signaling being transmitted, when the second signaling comprises an RRC connection release message, the second timer being stopped; when the second signaling comprises an RRC connection reconfiguration message, a third signaling being received by a maintenance base station of the first serving cell, and the second timer being stopped, herein, the third signaling is used to confirm the RRC connection reconfiguration message.

According to one aspect of the present disclosure, comprising:

when the second timer is expired, a fourth signaling being received by a target node;

herein, the fourth signaling is used to request an RRC connection reestablishment; and the target node is determined by a transmitter of the first signaling through cell selection.

According to one aspect of the present disclosure, comprising:

a fifth signaling being received by a maintenance base station of the first serving cell;

herein, the fifth signaling is used to indicate an expiration value of the first timer and an expiration value of the second timer; the fifth signaling comprises a first field, and the first field is used to indicate a state of the second timer.

According to one aspect of the present disclosure, wherein when the second timer is in a running state, the first timer is not started.

The present disclosure provides a first node for wireless communications, comprising:

a first receiver, determining that a physical-layer problem occurs in a first serving cell; as a response to determining that the physical-layer problem occurs in the first serving cell, starting a first timer; determining that a first condition set is satisfied;

a first transmitter, as a response to the first condition set being satisfied, transmitting a first signaling;

the first receiver, as a response to the first condition set being satisfied, starting a second timer and stopping the first timer; when the second timer is in a running state, monitoring a second signaling;

herein, the first condition set comprises that an RLF occurs in the first serving cell and the second timer is configured; the second timer is associated with the first serving cell; the first signaling is used to initiate a radio connection recovery; and the second signaling is used to update a radio connection.

The present disclosure provides a second node for wireless communications, comprising:

a second receiver, monitoring a first signaling; and a second transmitter, when the first signaling is received, transmitting a second signaling;

herein, as a response to determining that a physical-layer problem occurs in a first serving cell, a first timer is started; as a response to a first condition set being satisfied, a second timer is started and the first timer is stopped; the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the present disclosure has the following advantages over conventional schemes:

the influence of the first timer on a Fast MCG Link Recovery is avoided;

the influence of the timer T310 on a Fast MCG Link Recovery is avoided;

the influence of the timer T312 on a Fast MCG Link Recovery is avoided;

the probability of a Fast MCG Link Recovery is increased;

unnecessary signaling overhead is reduced;

unnecessary delay is reduced.

The present disclosure provides a method in a first node for wireless communications, comprising:

determining that a physical-layer problem occurs in a first serving cell; as a response to the phrase of determining that a physical-layer problem occurs in a first serving cell, starting a first serving cell;

transmitting a first signal; and as a response to the first signal being triggered, starting a second timer; when the second timer is running, monitoring a second signal, when the first timer is expired, maintaining a radio connection and the second timer continuing timing;

herein, the first signal is used to trigger the second signal; and the second timer is related to a parameter of a maintenance base station of the first serving cell.

In one embodiment, a problem to be solved in the present disclosure includes: a timer of an RLF in TN is not applicable in NTN.

In one embodiment, a problem to be solved in the present disclosure includes: the applicability of the timer T312 in NTN is poor.

In one embodiment, a problem to be solved in the present disclosure includes: when a UE transmits a signal and does not receive a response signal due to large delay, it may execute following procedure of an RLF due to an expiration of the T310.

In one embodiment, a problem to be solved in the present disclosure includes: a delay-insensitive timer and a delay-sensitive timer need to be designed collaboratively.

In one embodiment, characteristics of the above method include: in NTN, a delay-insensitive timer does not affect a running of a delay-sensitive time.

In one embodiment, characteristics of the above method include: a second timer does not stop due to an expiration of a first timer.

In one embodiment, characteristics of the above method include: in NTN, when a UE transmits a first signal, a second timer is used to determine a time for monitoring a second signal, which is not stopped due to an expiration of a first timer.

In one embodiment, characteristics of the above method include: a second timer is related to a maintenance base station of a first serving cell.

In one embodiment, characteristics of the above method include: a second timer is related to NTN.

In one embodiment, characteristics of the above method include: a second timer comprises an NTN-specific timer.

In one embodiment, characteristics of the above method include: a second timer comprises a timer T312.

In one embodiment, characteristics of the above method include: a first timer comprises a timer T310.

In one embodiment, advantages of the above method include that after a first signal is triggered, the probability of a second signal being received is increased.

In one embodiment, advantages of the above method include that an NTN-specific second timer is defined.

In one embodiment, advantages of the above method include that a second timer is decoupling with a timer T310.

According to one aspect of the present disclosure, comprising:

as a response to the first signal being triggered, resetting a first counter and a second counter;

herein, the first counter reaching a first value is used to determine to start the first timer; the second counter reaching a second value is used to determine to stop the first timer; and the first value and the second value are non-negative integers.

According to one aspect of the present disclosure, comprising:

after a first event occurs and when the second timer is expired, determining that an RLF occurs; and as a response to the behavior of determining that an RLF occurs, transmitting a first signaling;

herein, the first signaling is used to request updating a radio connection, and the first event comprises that the second timer is running and the first timer is expired.

In one embodiment, characteristics of the above method include: the second timer being expired and the first timer being expired when the second timer is running are used to determine that a radio connection failure occurs.

In one embodiment, characteristics of the above method include: when the second timer is expired, an RLF is triggered as soon as possible.

In one embodiment, characteristics of the above method include: when the second timer is expired and the first timer is expired when the second timer is running, a link recovery is performed.

In one embodiment, characteristics of the above method include: when the second timer is expired and the first timer is expired when the second timer is running, an RRC connection reestablishment is performed.

According to one aspect of the present disclosure, comprising:

receiving a second signaling;

herein, the second signaling is used to indicate a first parameter set of the second timer; the first parameter set comprises a first expiration value and a first offset, and a sum of the first expiration value and the first offset is used to determine an end time of the second timer.

In one embodiment, characteristics of the above method include: through the first offset, a running time of the second timer is prolonged.

In one embodiment, characteristics of the above method include: through the first offset, the second timer is delayed to be started.

In one embodiment, characteristics of the above method include: in NTN, configuration of a timer of TN is multiplexed as much as possible.

In one embodiment, characteristics of the above method include: NTN is enhanced on the basis of a timer of TN.

According to one aspect of the present disclosure, wherein the first parameter set comprises a first indicator, and the first indicator is used to determine whether the second timer is valid.

In one embodiment, characteristics of the above method include setting a switch for the second timer.

In one embodiment, characteristics of the above method include: the second timer is set to be valid only when configuration is required.

According to one aspect of the present disclosure, comprising:

receiving the second signal; as a response to receiving the second signal, stopping the second timer.

In one embodiment, characteristics of the above method include: receiving the second signal is used to trigger stopping the second timer.

According to one aspect of the present disclosure, wherein the first signal is transmitted when the first timer is running.

The present disclosure provides a method in a second node for wireless communications, comprising:

receiving a first signal; and as a response to the first signal being received, transmitting a second signal;

herein, as a response to determining that a physical-layer problem occurs in a first serving cell, a first timer is started; as a response to the first signal being triggered, a second timer is started; when the second timer is running, the second signal is monitored, and when the first timer is expired, a radio connection is maintained and the second timer continues timing; the first signal is used to trigger the second signal; and the second timer is related to a parameter of a maintenance base station of the first serving cell.

According to one aspect of the present disclosure, comprising:

as a response to the first signal being triggered, resetting a first counter and a second counter;

herein, the first counter reaching a first value is used to determine to start the first timer; the second counter reaching a second value is used to determine to stop the first timer; and the first value and the second value are non-negative integers.

According to one aspect of the present disclosure, comprising:

as a response to determining that an RLF occurs, receiving a first signaling;

herein, after a first event occurs and when the second timer is expired, the radio connection failure is determined to occur; the first signaling is used to request updating a radio connection, and the first event comprises that the second timer is running and the first timer is expired.

According to one aspect of the present disclosure, comprising:

transmitting a second signaling;

herein, the second signaling is used to indicate a first parameter set of the second timer; the first parameter set comprises a first expiration value and a first offset, and a sum of the first expiration value and the first offset is used to determine an end time of the second timer.

According to one aspect of the present disclosure, wherein the first parameter set comprises a first indicator, and the first indicator is used to determine whether the second timer is valid.

According to one aspect of the present disclosure, comprising:

as a response to receiving the second signal, stopping the second timer.

According to one aspect of the present disclosure, wherein the first signal is transmitted when the first timer is running.

The present disclosure provides a first node for wireless communications, comprising:

a first receiver, determining that a physical-layer problem occurs in a first serving cell; as a response to the phrase of determining that a physical-layer problem occurs in a first serving cell, starting a first serving cell;

a first transmitter, transmitting a first signal; and the first receiver, as a response to the first signal being triggered, starting a second timer; when the second timer is running, monitoring a second signal, when the first timer is expired, maintaining a radio connection and the second timer continuing timing;

herein, the first signal is used to trigger the second signal; and the second timer is related to a parameter of a maintenance base station of the first serving cell.

The present disclosure provides a second node for wireless communications, comprising:

a second receiver, receiving a first signal; and a second transmitter, as a response to the first signal being received, transmitting a second signal;

herein, as a response to determining that a physical-layer problem occurs in a first serving cell, a first timer is started; as a response to the first signal being triggered, a second timer is started; when the second timer is running, the second signal is monitored, and when the first timer is expired, a radio connection is maintained and the second timer continues timing; the first signal is used to trigger the second signal; and the second timer is related to a parameter of a maintenance base station of the first serving cell.

In one embodiment, aiming at the problem that an expiration of the first timer triggers an RLF in a large-delay network, the present disclosure proposes a method that an expiration of the first timer does not trigger an RLF when the second timer is running, and extends the second timer to match the large-delay network. the present disclosure has the following advantages over conventional schemes:

in NTN, when the timer T310 is expired, the timer T312 does not stop running;

the second timer can be configured according to a parameter of a maintenance base station of the first serving cell;

after a first signal is triggered, the probability of a second signal being received is increased;

when the second timer is running, an expiration of the first timer does not trigger an RLF;

NTN-specific second timer is defined;

a second timer is decoupling with a timer T310;

a length of a second timer is extended through a first offset.

The present disclosure provides a method in a first node for wireless communications, comprising:

receiving a first signaling; starting a first timer; when a second timer is expired, updating a first counter;

when the first timer is running and when the first counter reaches a first value, determining that an RLF occurs in a first serving cell;

herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, a problem to be solved in the present disclosure includes: due to large delay of NTN, frequent RLFs will be caused by determining an RLF through an expiration of the timer T310 defined by the current protocol.

In one embodiment, a problem to be solved in the present disclosure includes: if the T310 in NTN is set too short, an RLF will be triggered frequently.

In one embodiment, a problem to be solved in the present disclosure includes: if the T310 in NTN is set too long, an RLF cannot be triggered in time when the link is poor.

In one embodiment, a problem to be solved in the present disclosure includes: an expiration value of the first timer in TN is small.

In one embodiment, characteristics of the above method include: when the first timer is running, whether an RLF occurs is determined through expiration times of the second timer.

In one embodiment, characteristics of the above method include: the first timer is an NTN-specific timer.

In one embodiment, characteristics of the above method include: the first timer is related to NTN.

In one embodiment, characteristics of the above method include: the first timer is only valid for an NTN cell.

In one embodiment, characteristics of the above method include: the first timer comprises the T312, the T316, etc.

In one embodiment, characteristics of the above method include: the first timer comprises a new timer.

In one embodiment, characteristics of the above method include: an expiration value of the first timer is greater than the second timer.

In one embodiment, characteristics of the above method include: when the first timer is running, an expiration of the second timer does not trigger an RLF.

In one embodiment, characteristics of the above method include: the first timer being expired and a first counter not being less than a first value are used to trigger an RLF.

In one embodiment, characteristics of the above method include: when the first timer is started, the first counter is reset.

In one embodiment, characteristics of the above method include: the first counter counts when the first timer is running.

In one embodiment, advantages of the above method include avoiding frequent triggering an RLF of physical layer.

In one embodiment, advantages of the above method include triggering an RLF of a physical layer in time.

In one embodiment, advantages of the above method include obtaining statistical characteristics of a radio link.

According to one aspect of the present disclosure, comprising:

transmitting a first signal; as a response to the first signal being transmitted, starting the first timer after waiting for a third time length; and receiving a second signal; as a response to the second signal being received, stopping the first timer;

herein, the first signal comprises a measurement report, and the second signal comprises a response for the first signal.

According to one aspect of the present disclosure, comprising:

when a first condition set is satisfied, starting the first timer after waiting for a third time length;

In one embodiment, the first condition set comprises determining that a physical-layer problem occurs in the first serving cell.

In one embodiment, the first condition set comprises that the first signal is transmitted.

According to one aspect of the present disclosure, comprising:

when a second condition set is satisfied, stopping the first timer.

In one embodiment, the second condition set comprises the physical-layer problem recovery.

In one embodiment, the second condition set comprises that the second signal is received.

In one embodiment, the second condition set comprises initiating a first procedure, and the first procedure is used for a radio link update.

In one embodiment, the second condition set comprises the first counter reaching the first value.

In one embodiment, the second condition set comprises the first serving cell being released.

According to one aspect of the present disclosure, comprising:

when a third condition set being satisfied, resetting the first counter.

In one embodiment, the third condition set comprises that the first timer being started.

In one embodiment, the third condition set comprises initiating a first procedure.

In one embodiment, the third condition set comprises the first serving cell being released.

According to one aspect of the present disclosure, comprising: when the physical-layer problem occurs in the first serving cell, starting the second timer; and when the physical-layer problem of the first serving cell is recovered, stopping the second timer.

According to one aspect of the present disclosure, wherein when a timekeeping of the first timer reaches the first time length, the first counter not being less than a first value is used to determine an occurrence of the RLF.

The present disclosure provides a method in a second node for wireless communications, comprising:

transmitting a first signaling;

herein, a first timer is started; when a second timer is expired, the first counter is updated; when the first timer is running and when the first counter reaches a first value, an occurrence of an RLF is determined in a first serving cell; herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

According to one aspect of the present disclosure, comprising:

receiving a first signal; and transmitting a second signal;

herein, as a response to the first signal being transmitted, the first timer is started after waiting for a third time length; as a response to the second signal being received, the first timer is stopped; the first signal comprises a measurement report, and the second signal comprises a response for the first signal.

According to one aspect of the present disclosure, wherein when a first condition set is satisfied, the first timer is started after waiting for a third time length.

In one embodiment, the first condition set comprises determining that a physical-layer problem occurs in the first serving cell.

In one embodiment, the first condition set comprises the first signal being transmitted.

According to one aspect of the present disclosure, wherein when a second condition set is satisfied, the first timer is stopped.

In one embodiment, the second condition set comprises the physical-layer problem recovery.

In one embodiment, the second condition set comprises the second signal being received.

In one embodiment, the second condition set comprises initiating a first procedure.

In one embodiment, a first procedure is used for a radio link update.

In one embodiment, the second condition set comprises the first counter reaching the first value.

In one embodiment, the second condition set comprises the first serving cell being released.

According to one aspect of the present disclosure, wherein when a third condition set is satisfied, the first counter is reset.

In one embodiment, the third condition set comprises the first timer being started.

In one embodiment, the third condition set comprises initiating a first procedure, or the third condition set comprises the first serving cell being released.

According to one aspect of the present disclosure, wherein when the physical-layer problem occurs in a first serving cell, the second timer is started; and when the physical-layer problem of the first serving cell is recovered, the second timer is stopped.

According to one aspect of the present disclosure, wherein when a timekeeping of the first timer reaches the first time length, the first counter not being less than a first value is used to determine an occurrence of the RLF.

The present disclosure provides a first node for wireless communications, comprising:

a first receiver, receiving a first signaling; starting a first timer; when a second timer is expired, updating a first counter; when the first timer is running and when the first counter reaches a first value, determining that an RLF occurs in a first serving cell;

herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

The present disclosure provides a second node for wireless communications, comprising:

a second transmitter, transmitting a first signaling;

herein, a first timer is started; when a second timer is expired, the first counter is updated; when the first timer is running and when the first counter reaches a first value, an occurrence of an RLF is determined in a first serving cell; herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, considering the large delay of NTN, determining a length of a timer of an RLF plays a key role in determining an RLF, and the present disclosure is advantageous over the prior art in the following aspects:

frequent triggering of an RLF on the physical layer in NTN is avoided;

an RLF of a physical layer is triggered in time in NTN;

a first timer is defined;

a first counter is defined;

statistical characteristics of a radio link are obtained.

BRIEF DESCRIPTION OF THE DRAWINGS

Other features, objects and advantages of the present disclosure will become more apparent from the detailed description of non-restrictive embodiments taken in conjunction with the following drawings:

FIG. 1A illustrates a flowchart of transmission of a first signaling and a second signaling according to one embodiment of the present disclosure.

FIG. 1B illustrates a flowchart of transmission of a first signal and a second signal according to one embodiment of the present disclosure.

FIG. 1C is a flowchart of transmission of a first signaling according to one embodiment of the present disclosure.

FIG. 9A illustrates a schematic diagram of a transmission behavior of a first signaling not affecting a timekeeping of a third timer according to one embodiment of the present disclosure.

FIG. 9B illustrates a schematic diagram of a first offset being used to determine a time length that a second timer is prolonged to run according to one embodiment of the present disclosure.

FIG. 9C illustrates a schematic diagram of starting, stopping and expiration of a first timer according to one embodiment of the present disclosure.

FIG. 10A illustrates a schematic diagram of a second timer in a running state being used to determine not to start a first timer according to one embodiment of the present disclosure.

FIG. 10B illustrates a schematic diagram of starting a second timer being used to reset a first counter and a second counter according to one embodiment of the present disclosure.

FIG. 10C illustrates a schematic diagram of a third condition set being satisfied being used to reset a first counter according to one embodiment of the present disclosure.

FIG. 11A illustrates a schematic diagram of a first node keeping connection with a first serving cell and a second serving cell through Dual Connectivity according to one embodiment of the present disclosure.

FIG. 11B illustrates a schematic diagram of a first indicator being used to determine whether a second timer is valid according to one embodiment of the present disclosure.

FIG. 11C illustrates a schematic diagram of starting a first timer after waiting for a third time length according to one embodiment of the present disclosure.

FIG. 12A illustrates a structure block diagram of a processing device in a first node according to one embodiment of the present disclosure.

FIG. 12B illustrates a structure block diagram of a processing device in a first node according to one embodiment of the present disclosure.

FIG. 12C illustrates a structure block diagram of a processing device in a first node according to one embodiment of the present disclosure.

DESCRIPTION OF THE EMBODIMENTS

Figure 2:
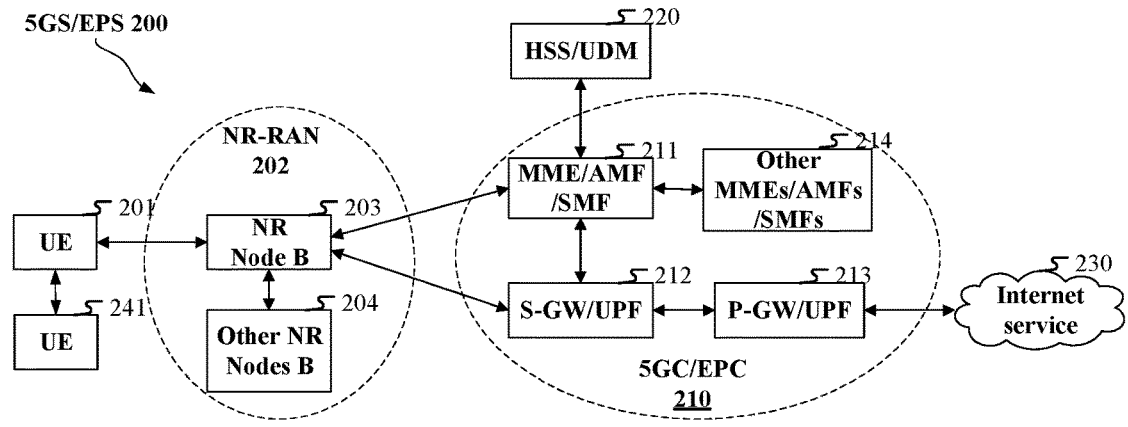
FIG. 2 illustrates a schematic diagram of a network architecture according to one embodiment of the present disclosure.

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Embodiment 1A illustrates a schematic diagram of transmission of a first signaling and a second signaling according to one embodiment of the present disclosure, as shown in FIG. 1A. In FIG. 1A, each box represents a step. It should be noted particularly that the order in which the boxes are arranged does not imply a chronological sequence of each step respectively marked.

In embodiment 1A, a first node in the present disclosure determines that a physical-layer problem occurs in a first serving cell in step 101A; as a response to determining that the physical-layer problem occurs in the first serving cell, starts a first timer; determines that a first condition set is satisfied; as a response to the first condition set being satisfied in step 102A, transmits a first signaling; as a response to the first condition set being satisfied in step 103A, starts a second timer and stops the first timer; and when the second timer is in a running state, monitors a second signaling; herein, the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the first serving cell comprises a serving cell of the first node.

In one embodiment, the first serving cell comprises a Primary Cell (PCell).

In one embodiment, the first serving cell comprises a Primary SCG Cell (PSCell).

In one embodiment, the first serving cell comprises a Special Cell (SPCell).

In one embodiment, the first serving cell comprises an SCell.

In one embodiment, the first serving cell comprises a serving cell of the first node.

In one embodiment, the first serving cell comprises an MCG.

In one embodiment, the first serving cell comprises an SCG.

In one embodiment, the first serving cell comprises a cell of an MCG.

In one embodiment, the first serving cell comprises a cell of an SCG.

In one embodiment, a maintenance base station of the first serving cell comprises a Master Node (MN).

In one embodiment, a maintenance base station of the first serving cell comprises a Secondary Node (SN).

In one embodiment, the phrase of determining that a physical layer problem occurs in a first serving cell includes detecting that the physical-layer problem occurs in the first serving cell.

In one embodiment, the phrase of determining that a physical layer problem occurs in a first serving cell includes indicating that the physical-layer problem occurs in the first serving cell.

In one embodiment, the physical-layer problem occurs in the first serving cell is determined through a Radio Link Monitoring (RLM).

In one embodiment, the physical-layer problem includes: a number of out-of-sync indications received from a lower-layer reaches a maximum value of a first counter.

In one subembodiment of the above embodiment, the maximum value of the first counter is configurable.

In one subembodiment of the above embodiment, the maximum value of the first counter is pre-configured.

In one subembodiment of the above embodiment, the maximum value of the first counter is of fixed magnitude.

In one subembodiment of the above embodiment, the first counter is UE specific.

In one subembodiment of the above embodiment, the first counter is cell specific.

In one subembodiment of the above embodiment, the first counter is used to determine a number of out-of-sync indications.

In one subembodiment of the above embodiment, when an in-sync indication is received, the first counter is reset.

In one subembodiment of the above embodiment, when an RRCReconfiguration message is received and the RRCReconfiguration message comprises a reconfiguration-WithSync, the first counter is reset.

In one subembodiment of the above embodiment, when an RRCConnectionReconfiguration message is received and the RRCConnectionReconfiguration comprises Mobility-ControlInfo, the first counter is reset.

In one subembodiment of the above embodiment, when a connection reestablishment procedure is initiated, the first counter is reset.

In one subembodiment of the above embodiment, when the first timer is running and an out-of-sync indication from lower layer is received, the first counter is increased progressively by N1, the N1 being a positive integer.

In one subsidiary embodiment of the subembodiment, the N1 is equal to 1.

In one subsidiary embodiment of the subembodiment, the N1 is greater than 1.

In one subembodiment of the above embodiment, when the first counter reaches a maximum value, the first timer is started.

In one subembodiment of the above embodiment, the first counter comprises an N310.

In one subembodiment of the above embodiment, the first counter is for the first serving cell.

In one subembodiment of the above embodiment, the first counter is for the second serving cell.

In one embodiment, the phrase that as a response to determining that the physical-layer problem occurs in the first serving cell, starting a first timer includes when the physical-layer problem occurring in the first serving cell is detected, starting the first timer.

In one embodiment, the phrase that as a response to determining that the physical-layer problem occurs in the first serving cell, starting a first timer includes when a number of out-of-sync indications received from a lower-layer reaches a maximum value of the first counter, starting the first timer.

In one embodiment, the phrase that as a response to determining that the physical-layer problem occurs in the first serving cell, starting a first timer includes when the first counter reaches a maximum value, starting the first timer.

In one embodiment, the phrase that as a response to determining that the physical-layer problem occurs in the first serving cell, starting a first timer includes when the counter N310 reaches a maximum value, starting the first timer.

In one embodiment, the phrase that as a response to determining that the physical-layer problem occurs in the first serving cell, starting a first timer includes when the timer T310 is running, starting the first timer.

In one embodiment, the phrase that as a response to determining that the physical-layer problem occurs in the first serving cell, starting a first timer includes when the timer T310 is running, when a measurement report for a measurement ID is triggered and the first timer is configured, starting the first timer.

In one embodiment, the phrase that as a response to determining that the physical-layer problem occurs in the first serving cell, starting a first timer includes starting the first timer includes determining that the physical-layer problem occurs in the first serving cell.

In one embodiment, the starting the first timer includes that the first timer starts timing.

In one embodiment, the starting the first timer includes starting the first timer.

In one embodiment, the starting the first timer includes that the first timer starts running.

In one embodiment, the first timer is used to determine an occurrence of a physical layer problem.

In one embodiment, an expiration of the first timer is used to determine an occurrence of a radio connection failure.

In one embodiment, when the first timer is running, the physical-layer problem recovery is used to stop the first timer.

In one embodiment, the first timer comprises a T310.

In one embodiment, the first timer comprises a T312.

In one embodiment, the first timer is a timer started earlier than the timer T310.

In one embodiment, the first timer is a timer started later than the timer T310.

In one embodiment, the first timer is maintained by an MCG.

In one embodiment, the first timer is maintained by an SCG.

In one embodiment, the first timer is associated with the first serving cell.

In one embodiment, the first timer is specific to the first serving cell.

In one embodiment, the first timer is configured in the first serving cell.

In one embodiment, the first timer is maintained by the first serving cell.

In one embodiment, a timekeeping of the first timer is unrelated to a timekeeping of a second serving cell.

In one embodiment, the first condition set comprises K first-type condition(s), K being a positive integer.

In one subembodiment of the above embodiment, the first-type condition comprises the phrase of a radio connection failure occurring in the first serving cell and the second timer being configured.

In one subembodiment of the above embodiment, the first-type condition comprises that the radio connection failure occurs in the first serving cell.

In one subembodiment of the above embodiment, the first-type condition comprises that the second timer is configured.

In one subembodiment of the above embodiment, the first-type condition comprises that the first node is configured with a split Signaling Radio Bearer 1 (SRB1).

In one subembodiment of the above embodiment, the first-type condition comprises that the first node is configured with an SRB3.

In one subembodiment of the above embodiment, the first-type condition comprises that the MCG is not suspended.

In one subembodiment of the above embodiment, the first-type condition comprises that the SCG is not suspended.

In one subembodiment of the above embodiment, the first-type condition comprises that the second timer is not running when the radio connection failure occurs.

In one subembodiment of the above embodiment, the first-type condition comprises that an RLF is detected in an SCG.

In one subembodiment of the above embodiment, the first-type condition comprises that a synchronization reconfiguration failure occurs in an SCG.

In one subembodiment of the above embodiment, the first-type condition comprises that a configuration failure occurs in an SCG.

In one subembodiment of the above embodiment, the first-type condition comprises that a lower-layer integrity verification failure indication on SRB3 occurs in an SCG.

In one subembodiment of the above embodiment, the phrase of determining a first condition set being satisfied includes determining that the K first-type conditions in the first condition set are satisfied.

In one subembodiment of the above embodiment, the phrase of determining a first condition set being satisfied includes determining that K1 first-type condition(s) in the K first-type conditions in the first condition set is(are) satisfied; herein, K1 is a positive integer less than K.

In one embodiment, the first condition set being satisfied comprises that a radio connection failure occurs in the first serving cell and the second timer is configured, the first node is configured with a split SRB1 or an SRB3, the first serving cell and a second serving cell are not suspended, and the second timer is not running.

In one embodiment, the first condition set comprises determination of performing a fast MCG link recovery procedure.

In one embodiment, the first condition set comprises determination of performing an MCG failure information procedure.

In one embodiment, the phrase the first condition set comprises that an RLF occurs in the first serving cell and the second timer is configured includes: a radio connection failure occurring in the first serving cell and the second timer being configured are conditions in the first condition set.

In one embodiment, the phrase the first condition set comprises that an RLF occurs in the first serving cell and the second timer is configured includes: a radio connection failure occurring in the first serving cell is a condition in the first condition set.

In one embodiment, the phrase the first condition set comprises that an RLF occurs in the first serving cell and the second timer is configured includes: the second timer being configured is a condition in the first condition set.

In one embodiment, the first condition set comprises a criterion for triggering a measurement report event.

In one embodiment, the first condition set comprises a criterion for triggering Conditional Handover (CHO).

In one embodiment, the first condition set comprises a criterion for triggering CPC.

In one embodiment, the first condition set comprises an A3 event.

In one embodiment, the first condition set comprises an A4 event.

In one embodiment, the first condition set comprises an A5 event.

In one embodiment, the first condition set comprises an A6 event.

In one embodiment, the first condition set comprises configuring the second timer.

In one embodiment, the first condition set comprises that the second timer is valid.

In one subembodiment of the above embodiment, the second timer being configured as true is used to determine that the second timer is valid.

In one subembodiment of the above embodiment, the second timer being configured as setup is used to determine that the second timer is valid.

In one subembodiment of the above embodiment, the meaning of the valid includes being able to start.

In one subembodiment of the above embodiment, the meaning of the valid includes being able to run.

In one embodiment, the phrase that the first condition set comprises an occurrence of an RLF in the first serving cell and the second timer being configured includes: the first condition set comprises that a physical-layer problem occurs in the first serving cell and the second timer is configured.

In one embodiment, the phrase that the first condition set comprises an occurrence of an RLF in the first serving cell and the second timer being configured includes: the first condition set comprises that the first timer is running and the second timer is configured.

In one embodiment, the radio connection failure comprises an RLF.

In one embodiment, the radio connection failure comprises a Handover Failure (HOF).

In one embodiment, the radio connection failure comprises the physical-layer problem.

In one subembodiment of the above embodiment, the HOF comprises a CHO failure.

In one subembodiment of the above embodiment, the HOF comprises a conventional handover failure.

In one subembodiment of the above embodiment, the HOF comprises a Dual Active Protocol Stack (DAPS) handover failure.

In one embodiment, the first node determines the radio connection failure according to a wireless measurement.

In one subembodiment of the above embodiment, the wireless measurement is performed on a first serving cell.

In one subembodiment, the radio measurement comprises measuring a Synchronization Signal (SS).

In one subembodiment of the above embodiment, the wireless measurement comprises a Cell-specific Reference Signal (SRS).

In one subembodiment, the radio measurement comprises a Synchronization Signal Reference Signal (SS-RS).

In one subembodiment, the radio measurement comprises a Synchronization Signal Block (SSB).

In one subembodiment of the above embodiment, the wireless measurement comprises a Primary SS.

In one subembodiment of the above embodiment, the wireless measurement comprises a Secondary Synchronization Signal (SSS).

In one subembodiment of the above embodiment, the wireless measurement comprises measuring a Synchronization Signal/Physical Broadcast Channel (SS/PBCH) Block.

In one subembodiment of the above embodiment, the wireless measurement comprises measuring a Channel State Information Reference Signal (CSI-RS).

In one subembodiment of the above embodiment, the wireless measurement comprises measuring a Physical Downlink Control Channel (PDCCH) common to a cell.

In one subembodiment of the above embodiment, the radio measurement comprises measuring a PBCH.

In one embodiment, when the timer T310 is expired, the first node determines that a radio connection failure occurs in the first serving cell.

In one embodiment, when the timer T312 is expired, the first node determines that a radio connection failure occurs in the first serving cell.

In one embodiment, when an indication of reaching MaxNumRetx is received from MCG Radio Link Control (RLC), the first node determines that a radio connection failure occurs in the first serving cell.

In one embodiment, when an indication of reaching MaxNumRetx of an SRB or a Data Radio Bearer (DRB) is received from MCG RLC, the first node determines that a radio connection failure occurs in the first serving cell.

In one embodiment, when a problem indication of a RA is received from an MCG Medium Access Control (MAC), and none of timers T300, T301, T304, T311 and T319 is running, the first node determines that a radio connection failure occurs in the first serving cell.

In one embodiment, when a problem indication of an RA is received from an MCG MAC, and none of timers T300, T301, T304 and T311 is running, the first node determines that a radio connection failure occurs in the first serving cell.

In one embodiment, when timer T304 is expired, the first node determines that a radio connection failure occurs in the first serving cell.

In one embodiment, when the timer T304 is running, the radio connection failure occurs.

In one embodiment, when the timer T304 is not running, the radio connection failure occurs.

In one embodiment, the phrase of as a response to the first condition being satisfied includes: when the first condition set is satisfied, a next step is executed immediately.

In one embodiment, the phrase of as a response to the first condition being satisfied includes: when the first condition set is satisfied, a series of steps are executed.

In one embodiment, as a response to the first condition set being satisfied, a first signaling is transmitted, a second timer is started and the first timer is stopped.

In one embodiment, the phrase of transmitting a first signaling and the phrase of starting a second timer occur at the same time.

In one embodiment, the phrase of transmitting a first signaling and the phrase of starting a second timer do not occur at the same time.

In one embodiment, the phrase of transmitting a first signaling triggers the phrase of starting a second timer.

In one embodiment, the phrase of starting a second timer triggers the phrase of transmitting a first signaling.

In one embodiment, both the phrase of transmitting a first signaling and the phrase of starting a second timer are performed after the first condition set is satisfied.

In one embodiment, the phrase that the first signaling is used to initiate a radio connection recovery includes: the first signaling is used to trigger a radio connection recovery procedure.

In one embodiment, the phrase that the first signaling is used to initiate a radio connection recovery includes: the first signaling is a first message in the radio connection recovery procedure.

In one embodiment, the phrase that the first signaling is used to initiate a radio connection recovery includes: when the first node determines to initiate a radio connection recovery procedure, the first signaling is transmitted.

In one embodiment, the phrase that the first signaling is used to initiate a radio connection recovery includes: the first signaling comprises an MCGFailureInformation message.

In one embodiment, the radio connection recovery comprises recovering a link of the first serving cell.

In one embodiment, the radio connection recovery comprises recovering an MCG transmission.

In one embodiment, the radio connection recovery comprises recovering an SCG transmission.

In one embodiment, the radio connection recovery comprises handover.

In one embodiment, the radio connection recovery comprises handover to a target cell.

In one embodiment, the radio connection recovery comprises a fast MCG link recovery.

In one embodiment, the radio connection recovery comprises a fast SCG link recovery.

In one embodiment, the radio connection recovery comprises an MCG failure message procedure.

In one embodiment, the radio connection recovery comprises transmitting a measurement report.

In one embodiment, the radio connection recovery comprises a recovery through a CHO.

In one embodiment, a receiver of the first signaling comprises a maintenance base station of the first serving cell.

In one embodiment, a receiver of the first signaling comprises a maintenance base station of the second serving cell.

In one embodiment, a receiver of the first signaling comprises a maintenance base station of the first serving cell, and the first signaling is forwarded to a serving base station of the first serving cell through a serving base station of the second serving cell.

In one embodiment, the first signaling is transmitted via an air interface.

In one embodiment, the first signaling is transmitted via a radio interface.

In one embodiment, the first signaling is transmitted via a higher-layer signaling.

In one embodiment, the first signaling comprises a higher-layer signaling.

In one embodiment, the first signaling comprises all or part of a higher-layer signaling.

In one embodiment, the first signaling comprises an RRC message.

In one embodiment, the first signaling comprises all or partial IEs in an RRC Message.

In one embodiment, the first signaling comprises all or part of fields in an IE in an RRC message.

In one embodiment, the first signaling comprises an Uplink (UL) signaling.

In one embodiment, an SRB of the first signaling comprises an SRB1.

In one embodiment, an SRB of the first signaling comprises an SRB3.

In one embodiment, a logical channel bearing the first signaling comprises a Dedicated Control Channel (DCCH).

In one embodiment, the first signaling comprises a measurement result.

In one embodiment, the first signaling comprises an MCGFailureInformation message.

In one embodiment, the first signaling comprises a FailureInformation2 message.

In one embodiment, the first signaling comprises MCGFailureInformationEUTRA.

In one embodiment, the first signaling comprises MCGFailureInformationNR.

In one embodiment, the first signaling comprises SCGFailureInformation.

In one embodiment, the first signaling comprises SCGFailureInformationNR.

In one embodiment, the first signaling comprises SCGFailureInformationEUTRA.

In one embodiment, the first signaling comprises SidelinkUEInformation.

In one embodiment, the first signaling comprises SidelinkUEInformationNR.

In one embodiment, the first signaling comprises SidelinkUEInformationEUTRA.

In one embodiment, the first signaling comprises FailureInformation.

In one embodiment, the first signaling comprises ULInformationTransferMRDC.

In one embodiment, the first signaling comprises a MeasurementReport.

In one embodiment, the phrase of starting a second timer and stopping the first timer includes: when the second timer is started, the first timer is stopped.

In one embodiment, the phrase of starting a second timer and stopping the first timer includes: starting the second timer and stopping the first timer are executed at the same time.

In one embodiment, the phrase of starting a second timer and stopping the first timer includes starting the second timer and then stopping the first timer.

In one embodiment, the phrase of starting a second timer and stopping the first timer includes stopping the first timer and then starting the second timer.

In one embodiment, the phrase of starting a second timer and stopping the first timer includes: starting the second timer is used to trigger stopping the first timer.

In one embodiment, the phrase of starting a second timer and stopping the first timer includes: stopping the first timer is used to trigger starting the second timer.

In one embodiment, the phrase of "as a response to the first condition set being satisfied, starting a second timer and stopping the first timer" includes: as a response to the first condition set being satisfied, starting the second timer.

In one embodiment, the phrase of "as a response to the first condition set being satisfied, starting a second timer and stopping the first timer" includes: as a response to the first condition set being satisfied, stopping the first timer.

In one embodiment, the starting a second timer includes that the second timer starts timing.

In one embodiment, the starting a second timer includes starting the second timer.

In one embodiment, the starting a second timer includes that the second timer starts running.

In one embodiment, the second timer is used to determine to perform a fast MCG link recovery.

In one embodiment, the second timer is used to determine to transmit the first signaling.

In one embodiment, an expiration of the second timer is used to determine the fast MCG link recovery failure.

In one embodiment, the second timer comprises a timer T316.

In one embodiment, the second timer comprises a timer T312.

In one embodiment, the second timer is maintained by an MCG.

In one embodiment, the second timer is maintained by an SCG.

In one embodiment, the second timer is associated with the first serving cell.

In one embodiment, the second timer is specific to the first serving cell.

In one embodiment, the second timer is configured in the first serving cell.

In one embodiment, the second timer is maintained by the first serving cell.

In one embodiment, timing of the second timer is unrelated to timing of a second serving cell.

In one subembodiment of the above embodiment, the first condition set being satisfied is used to trigger stopping the first timer.

In one subembodiment of the above embodiment, the first condition set being satisfied is used to determine to stop the first timer.

In one embodiment, when a number of in-sync indications received by the first node from a lower layer reaches a maximum value of a second counter, the first timer is stopped.

In one embodiment, when the first node receives an RRCconfiguration message and the RRCReconfiguration message comprises a reconfigurationWithSync, the first timer is stopped.

In one embodiment, when the first node initiates a connection reestablishment procedure, the first timer is stopped.

In one embodiment, when an SCG is released, the first timer is stopped.

In one embodiment, when a number of in-sync indications received by the first node from a lower layer reaches a maximum value of a second counter, an RRCReconfiguration message is received, and the RRCReconfiguration message comprises a reconfigurationWithSync, the first timer is stopped.

In one embodiment, when a timer T310 is expired, the first timer is stopped.

In one embodiment, stopping an RLM is used to stop the first timer.

In one embodiment, stopping the first timer includes suspending the first timer.

In one embodiment, stopping the first timer includes clearing the first timer.

In one embodiment, stopping the first timer includes keeping the first timer.

In one embodiment, stopping the first timer includes resetting the first timer.

In one embodiment, stopping the first timer includes ending the first timer.

In one embodiment, stopping the first timer includes pausing the first timer.

In one embodiment, stopping the first timer includes that the first timer does not continue counting.

In one embodiment, stopping the first timer includes stopping the radio connection recovery procedure.

In one embodiment, stopping the first timer includes stopping the MCG failure information procedure.

In one embodiment, the phrase that the second timer is in a running state includes: the second timer is valid.

In one embodiment, the phrase that the second timer is in a running state includes: the second timer is timing.

In one embodiment, the phrase that the second timer is in a running state includes: the second timer is running.

In one embodiment, the monitoring a second signaling includes monitoring a PDCCH.

In one embodiment, the monitoring a second signaling comprises an energy monitoring.

In one embodiment, the monitoring a second signaling comprises a coherent detection.

In one embodiment, the monitoring a second signaling comprises a broadband detection.

In one embodiment, the monitoring a second signaling comprises a correlated detection.

In one embodiment, the monitoring a second signaling comprises a synchronization detection.

In one embodiment, the monitoring a second signaling comprises a waveform detection.

In one embodiment, the monitoring a second signaling comprises a maximum likelihood detection.

In one embodiment, the monitoring a second signaling comprises waiting for receiving the second signaling.

In one embodiment, the phrase that the second timer is associated with the first serving cell includes: the second timer is specific to the first serving cell.

In one embodiment, the phrase that the second timer is associated with the first serving cell includes: the second timer is configured in the first serving cell.

In one embodiment, the phrase that the second timer is associated with the first serving cell includes: the second timer is maintained by the first serving cell.

In one embodiment, the phrase that the second timer is associated with the first serving cell includes: timing of the second timer is unrelated to timing of a second serving cell.

In one embodiment, the updating a radio connection includes changing a radio connection state.

In one embodiment, the updating a radio connection includes an RRC connection reconfiguration.

In one embodiment, the updating a radio connection includes an RRC connection release.

In one embodiment, the updating a radio connection includes a configuration for handover.

In one embodiment, the updating a radio connection includes a configuration for UL and DL resources.

In one embodiment, the updating a radio connection includes a configuration for an RA.

In one embodiment, the updating a radio connection includes a configuration for handover.

In one embodiment, a transmitter of the second signaling comprises a maintenance base station of the second serving cell.

In one embodiment, a transmitter of the second signaling comprises the first serving cell, and the second signaling is forwarded to the first node through the second serving cell.

In one embodiment, the second signaling is transmitted via an air interface.

In one embodiment, the second signaling is transmitted via a radio interface.

In one embodiment, the second signaling is transmitted via a high-layer signaling.

In one embodiment, the second signaling comprises a higher-layer signaling.

In one embodiment, the second signaling comprises all or part of a high-layer signaling.

In one embodiment, the second signaling comprises an RRC message.

In one embodiment, the second signaling comprises all or part of IEs in an RRC message.

In one embodiment, the second signaling comprises all or part of fields in an IE of an RRC message.

In one embodiment, the second signaling comprises a UL signaling.

In one embodiment, an SRB of the second signaling comprises an SRB1.

In one embodiment, an SRB of the second signaling comprises an SRB3.

In one embodiment, an SRB of the second signaling comprises a Sidelink SRB.

In one embodiment, a logical channel bearing the second signaling comprises a DCCH.

In one embodiment, a logical channel bearing the second signaling comprises a Sidelink Control Channel (SCCH).

In one embodiment, the second signaling is used for an RRC connection reconfiguration.

In one embodiment, the second signaling is used for an RRC connection release.

In one embodiment, the second signaling comprises an RRCReconfiguration message.

In one embodiment, the second signaling comprises an RRCConnectionReconfiguration message.

In one embodiment, the second signaling comprises an RRCRelease message.

In one embodiment, the second signaling comprises a RRCConnectionRelease message.

In one embodiment, the second signaling comprises a DLInformationTransferMRDC message.

In one embodiment, the second signaling comprises an RRCReconfigurationSidelink message.

In one embodiment, the second signaling comprises an areconfigurationWithSync IE.

In one embodiment, the meaning of starting in the present disclosure includes starting.

In one embodiment, the meaning of starting in the present disclosure includes starting timing.

In one embodiment, the meaning of starting in the present disclosure includes starting running.

In one embodiment, the meaning of stopping in the present disclosure includes stopping.

In one embodiment, the meaning of stopping in the present disclosure includes suspending.

In one embodiment, the meaning of stopping in the present disclosure includes clearing.

In one embodiment, the meaning of stopping in the present disclosure includes keeping.

In one embodiment, the meaning of stopping in the present disclosure includes not changing with time.

In one embodiment, the meaning of stopping in the present disclosure includes not continuing timing.

In one embodiment, the meaning of stopping in the present disclosure includes resetting.

In one embodiment, the meaning of stopping in the present disclosure includes ending.

In one embodiment, the meaning of stopping in the present disclosure includes pausing.

In one embodiment, the meaning of expiration in the present disclosure includes reaching a maximum value.

In one embodiment, the meaning of expiration in the present disclosure includes being no longer valid.

In one embodiment, the meaning of expiration in the present disclosure includes being expired.

In one embodiment, the first timer comprises a timer T310, and the second timer comprises a timer T316.

In one embodiment, the first timer comprises a timer T312, and the second timer comprises a timer T316.

In one embodiment, the first timer comprises a timer T310, and the second timer comprises a timer T312.

Embodiment 1B

Embodiment 1B illustrates a flowchart of transmission of a first signal and a second signal according to one embodiment of the present disclosure, as shown in FIG. 1B. In FIG. 1B, each box represents a step. It should be noted particularly that the order in which the boxes are arranged does not imply a chronological sequence of each step respectively marked.

In embodiment 1B, a first node in the present disclosure determines that a physical-layer problem occurs in a first serving cell in step 101B; as a response to the phrase of determining that a physical-layer problem occurs in a first serving cell, starts a first serving cell; transmits a first signal in step 102B; as a response to the first signal being triggered in step 103B, starts a second timer; when the second timer is running, monitors a second signal, and when the first timer is expired, maintains a radio connection and the second timer continues timing; herein, the first signal is used to trigger the second signal; and the second timer is related to a parameter of a maintenance base station of the first serving cell.

In one embodiment, the first serving cell comprises a serving cell of the first node.

In one embodiment, the first serving cell comprises a PCell.

In one embodiment, the first serving cell comprises a PSCell.

In one embodiment, the first serving cell comprises an SPCell.

In one embodiment, the first serving cell comprises an SCell.

In one embodiment, the first serving cell comprises a serving cell of the first node.

In one embodiment, the first serving cell comprises an MCG.

In one embodiment, the first serving cell comprises an SCG.

In one embodiment, the first serving cell comprises a cell of an MCG.

In one embodiment, the first serving cell comprises a cell of an SCG.

In one embodiment, a maintenance base station of the first serving cell comprises a MN.

In one embodiment, a maintenance base station of the first serving cell comprises an SN.

In one embodiment, the phrase of determining that a physical layer problem occurs in a first serving cell includes detecting that the physical-layer problem occurs in the first serving cell.

In one embodiment, the phrase of determining that a physical layer problem occurs in a first serving cell includes indicating that the physical-layer problem occurs in the first serving cell.

In one embodiment, the physical-layer problem occurs in the first serving cell is determined through an RLM.

In one embodiment, the physical-layer problem includes receiving N310 out-of-sync indications from a lower layer.

In one embodiment, the phrase that as a response to determining that the physical-layer problem occurs in the first serving cell, starting a first timer includes when the physical-layer problem occurring in the first serving cell is detected, starting the first timer.

In one embodiment, the phrase that as a response to determining that the physical-layer problem occurs in the first serving cell, starting a first timer includes when a number of out-of-sync indications received from a lower-layer reaches a maximum value of the first counter, starting the first timer.

In one embodiment, the phrase that as a response to determining that the physical-layer problem occurs in the first serving cell, starting a first timer includes when the first counter reaches a maximum value, starting the first timer.

In one embodiment, the phrase that as a response to determining that the physical-layer problem occurs in the first serving cell, starting a first timer includes when the counter N310 reaches a maximum value, starting the first timer.

In one embodiment, the phrase that as a response to determining that the physical-layer problem occurs in the first serving cell, starting a first timer includes when the timer T310 is running, starting the first timer.

In one embodiment, the phrase that as a response to determining that the physical-layer problem occurs in the first serving cell, starting a first timer includes when the timer T310 is running, when a measurement report for a measurement ID is triggered and the first timer is configured, starting the first timer.

In one embodiment, the phrase that as a response to determining that the physical-layer problem occurs in the first serving cell, starting a first timer includes starting the first timer includes determining that the physical-layer problem occurs in the first serving cell.

In one embodiment, the phrase that as a response to determining that the physical-layer problem occurs in the first serving cell, starting a first timer includes determining that the physical-layer problem occurs in the first serving cell is a condition for the starting the first timer.

In one embodiment, the starting the first timer includes that the first timer starts timing.

In one embodiment, the starting the first timer includes starting the first timer.

In one embodiment, the starting the first timer includes that the first timer starts running.

In one embodiment, the first timer is used to determine a physical-layer problem occurs in the first serving cell.

In one embodiment, when the first timer is running, the physical-layer problem recovery is used to stop the first timer.

In one embodiment, the first timer comprises a T310.

In one embodiment, the first timer is a timer started earlier than the timer T310.

In one embodiment, the first timer is a timer started later than the timer T310.

In one embodiment, the first timer is a timer started when the timer T310 is running.

In one embodiment, the first timer is maintained by an MCG.

In one embodiment, the first timer is maintained by an SCG.

In one embodiment, the first timer is associated with the first serving cell.

In one embodiment, the first timer is specific to the first serving cell.

In one embodiment, the first timer is configured in the first serving cell.

In one embodiment, the first timer is maintained by the first serving cell.

In one embodiment, timing of the first timer is unrelated to timing of a second serving cell.

In one embodiment, timing of the first timer is related to timing of a second serving cell.

In one embodiment, the second serving cell and the first serving cell provides service for the first node through Dual Connectivity.

In one embodiment, the second serving cell comprises a PSCell.

In one embodiment, the second serving cell comprises a UE.

In one embodiment, a receiver of the first signal comprises a maintenance base station of the first serving cell.

In one embodiment, a receiver of the first signal comprises a maintenance base station of the second serving cell.

In one embodiment, a receiver of the first signal comprises a maintenance base station of the first serving cell, and the first signal is forwarded to a serving base station of the first serving cell through a serving base station of the second serving cell.

In one embodiment, the first signal is transmitted via an air interface.

In one embodiment, the first signal is transmitted via a radio interface.

In one embodiment, the second signal comprises a physical-layer signaling.

In one embodiment, the second signal comprises a MAC layer signaling.

In one embodiment, the first signal is transmitted via a higher-layer signaling.

In one embodiment, the first signal comprises a higher-layer signaling.

In one embodiment, the first signal comprises all or part of a higher-layer signaling.

In one embodiment, the first signal comprises an RRC message.

In one embodiment, the first signal comprises all of IEs in an RRC message.

In one embodiment, the first signal comprises part of IEs in an RRC message.

In one embodiment, the first signal comprises all of fields in an IE in an RRC message.

In one embodiment, the first signal comprises part of fields in an IE in an RRC message.

In one embodiment, the first signal comprises an UL signaling.

In one embodiment, the first signal comprises a sidelink signaling.

In one embodiment, an SRB of first signal includes an SRB1.

In one embodiment, an SRB of first signal includes an SRB3.

In one embodiment, a logical channel bearing the first signal comprises a DCCH.

In one embodiment, the first signal comprises a measurement result.

In one embodiment, the first signal comprises a MeasurementReport.

In one embodiment, the first signal comprises an RRC-ConnectionRequest.

In one embodiment, the first signal comprises an RRC-ConnectionResumeRequest.

In one embodiment, the first signal comprises an RRCEarlyDataRequest.

In one embodiment, the first signal comprises a MCGFailureInformation message.

In one embodiment, the first signal comprises a Failure-Information2 message.

In one embodiment, the first signal comprises MCGFailureInformationEUTRA.

In one embodiment, the first signal comprises MCGFailureInformationNR.

In one embodiment, the first signal comprises SCGFailureInformation.

In one embodiment, the first signal comprises SCGFailureInformationNR.

In one embodiment, the first signal comprises SCGFailureInformationEUTRA.

In one embodiment, the first signal comprises Side-linkUEInformation.

In one embodiment, the first signal comprises Side-linkUEInformationNR.

In one embodiment, the first signal comprises Side-linkUEInformationEUTRA.

In one embodiment, the first signal comprises FailureInformation.

In one embodiment, the first signal comprises ULInformationTransferMRDC.

In one embodiment, the phrase of as a response to the first signal being triggered includes as a response to the first signal being transmitted.

In one embodiment, the phrase of as a response to the first signal being transmitted includes a next step when the first signal is transmitted.

In one embodiment, the phrase of as a response to the first signal being transmitted includes a series of steps after the first signal being transmitted.

In one embodiment, the phrase of as a response to the first signal being transmitted includes when the first signal is transmitted.

In one embodiment, the phrase of as a response to the first signal being triggered includes when the first signal is ready to be transmitted.

In one embodiment, the phrase of as a response to the first signal being triggered includes in the procedure when contents of the first signal are set.

In one embodiment, the phrase of as a response to the first signal being triggered includes when contents of the first signal are set.

In one embodiment, the phrase of as a response to the first signal being triggered includes before contents of the first signal are set.

In one embodiment, the phrase of as a response to the first signal being triggered includes before the first signal is transmitted.

In one embodiment, the phrase of as a response to the first signal being triggered includes when the first signal is generated.

In one embodiment, the phrase of as a response to the first signal being triggered includes after the first signal is generated.

In one embodiment, the phrase of as a response to the first signal being triggered includes before the first signal is generated.

In one subembodiment of the above embodiment, the phrase that the first signal is generated includes contents of the first signal are set.

In one subembodiment of the above embodiment, the phrase that the first signal is generated includes contents of the first signal are determined.

In one embodiment, the phrase of as a response to the first signal being triggered includes after the first signal is generated, and before the first signal is delivered to a lower layer, the lower layer comprises at least one of a PDCP layer or an RLC layer or an MAC layer or a PHY layer.

In one embodiment, the behavior of starting the second timer is triggered by the first signal.

In one embodiment, when an entry condition corresponding to a first event is satisfied, the first signal is triggered.

In one subembodiment of the above embodiment, the first event is related to a measurement.

In one subembodiment of the above embodiment, the first event is related to time.

In one subembodiment of the above embodiment, the first event comprises at least one of an Event A1, an Event A2, an Event A3, an Event A4, an Event A5, an Event A6, an Event B1, an Event B2, an Event I1, an Event C1 or an Event C2 in TS 38.331, section 5.5.4.

In one subembodiment of the above embodiment, the entry condition comprises an Entering condition in TS 38.331, section 5.5.4.

In one subembodiment of the above embodiment, the entry condition corresponding to the first event being satisfied is determined according to TS 38.331, section 5.5.4.

In one subembodiment of the above embodiment, the entry condition comprises that a measurement result not less than or greater than a threshold.

In one subembodiment of the above embodiment, the entry condition comprises that a measurement result not greater than or less than a threshold.

In one embodiment, when an entry condition corresponding to a first event is satisfied, the first signal is triggered.

In one embodiment, as a response to the first signal being triggered, the first signal is transmitted.

In one embodiment, as a response to the first signal being triggered, contents in the first signal are set, and the first signal is transmitted.

In one embodiment, as a response to the first signal being triggered, the second timer is started and the first signal is transmitted.

In one embodiment, as a response to the first signal being triggered, when the first timer is running, the second timer is started and the first signal is transmitted.

In one embodiment, as a response to the first signal being triggered, when the first timer is not running, the first signal is transmitted, and the second timer is not started.

In one embodiment, as a response to the first signal being triggered, the second timer is started first and then the first signal is transmitted.

In one embodiment, as a response to the first signal being triggered, contents in the first signal are set, and then the second timer is started.

In one embodiment, the phrase of the first signal being triggered includes a measurement reporting procedure being initiated.

In one embodiment, the phrase of the first signal being triggered includes initiating a measurement reporting procedure.

In one embodiment, the phrase of the first signal being triggered includes satisfying a condition for initiating a measurement reporting procedure.

In one embodiment, the phrase of the first signal being triggered includes the entry condition corresponding to the first event being satisfied.

In one embodiment, when the first signal is triggered, the second timer is started.

In one subembodiment of the above embodiment, when the first signal is triggered, the first timer is running.

In one subembodiment of the above embodiment, when the first signal is triggered, the first timer is not running.

In one embodiment, when the first signal is triggered and the first timer is running, the second timer is started.

In one embodiment, the starting a second timer includes that the second timer starts timing.

In one embodiment, the starting a second timer includes starting the second timer.

In one embodiment, the starting a second timer includes that the second timer starts running.

In one embodiment, the second timer being expired is used to determine that a radio connection failure occurs in the first serving cell.

In one embodiment, the second timer starts being used to determine an execution of link recovery.

In one embodiment, the second timer starts being used to determine a transmission of a UL signal.

In one embodiment, the second timer comprises an NTN-specific RRC timer.

In one embodiment, the second timer is a timer started earlier than the first timer.

In one embodiment, the second timer is a timer started later than the first timer.

In one embodiment, the second timer is a timer started when the first timer is running.

In one embodiment, the second timer is maintained by an MCG.

In one embodiment, the second timer is maintained by an SCG.

In one embodiment, the second timer is associated with the first serving cell.

In one embodiment, the second timer is specific to the first serving cell.

In one embodiment, the second timer is configured in the first serving cell.

In one embodiment, the second timer is maintained by the first serving cell.

In one embodiment, timing of the second timer is unrelated to timing of a second serving cell.

In one embodiment, timing of the second timer is related to timing of a second serving cell.

In one embodiment, the phrase of when the second timer is running includes when the second timer is in a running state.

In one embodiment, the phrase of when the second timer is running includes when the second timer is running.

In one embodiment, the phrase of when the second timer is running includes the second timer is started and is not expired.

In one embodiment, the phrase of monitoring a second signal includes waiting to receive the second signal.

In one embodiment, the phrase of monitoring a second signal includes monitoring a PDCCH.

In one embodiment, the phrase of monitoring a second signal includes monitoring a second signal through an energy detection.

In one embodiment, the phrase of monitoring a second signal includes monitoring a second signal through a coherent detection.

In one embodiment, the phrase of monitoring a second signal includes monitoring a second signal through a broadband detection.

In one embodiment, the phrase of monitoring a second signal includes monitoring a second signal through a correlated detection.

In one embodiment, the phrase of monitoring a second signal includes monitoring a second signal through a synchronization detection.

In one embodiment, the phrase of monitoring a second signal includes monitoring a second signal through a waveform detection.

In one embodiment, the phrase of monitoring a second signal includes monitoring a second signal through a maximum likelihood detection.

In one embodiment, the first node waits for receiving the second signal when the second timer is running.

In one embodiment, the first node receives the second signal and stops the second timer when the second timer is running.

In one embodiment, the first node does not receive the second signal and performs an RRC reestablishment when the second timer is expired.

In one embodiment, the first node does not receive the second signal and performs a radio link recovery when the second timer is expired.

In one embodiment, the first node does not receive the second signal and enters into an RRC_IDLE state when the second timer is expired.

In one embodiment, the phrase that the first timer is expired includes a running time of the first timer reaching an expiration value.

In one embodiment, the phrase that the first timer is expired includes a timing of the first timer reaching a maximum value.

In one embodiment, the phrase that the first timer is expired includes a timing of the first timer reaching an expiration value.

In one embodiment, the phrase that the first timer is expired includes a failure of the first timer.

In one embodiment, the phrase that the first timer is expired includes a timing of the first timer reaching a preset value.

In one embodiment, when the first timer is expired, the second timer not being running is used to determine that a radio connection failure occurs.

In one embodiment, when the first timer is expired, the second timer being running is not used to determine that a radio connection failure occurs.

In one embodiment, when the first timer is expired, the second timer being running is used to determine that no radio connection failure occurs.

In one embodiment, the phrase of keeping a radio connection includes not triggering a next step.

In one embodiment, the phrase of keeping a radio connection includes not triggering an RLF.

In one embodiment, the phrase of keeping a radio connection includes keeping a current RRC connection state.

In one embodiment, the phrase of keeping a radio connection includes not updating a radio connection.

In one embodiment, the phrase that the second timer continues timing includes that the second timer continues running.

In one embodiment, the phrase that the second timer continues timing includes a running of the second timer is not affected by an expiration of the first timer.

In one embodiment, the phrase that the second timer continues timing includes a timing of the second timer is unrelated to an expiration of the first timer.

In one embodiment, when the second timer is running and the first timer is expired, a reception of the second signal is continued to be waited.

In one embodiment, when the second timer is running and the first timer is expired, a radio connection failure is not triggered.

In one embodiment, when the first timer is expired, the second timer not being running is used to determine the radio connection failure.

In one embodiment, when the first timer is expired, the second timer not being running is a condition to determine the radio connection failure.

In one embodiment, the phrase that the first signal is used to trigger the second signal includes: the second signal is a response to the first signal.

In one embodiment, the phrase that the first signal is used to trigger the second signal includes:

transmitting the first signal is used to trigger monitoring the second signal.

In one embodiment, the phrase that the second signal is used to trigger the second signal includes: when the second signal is transmitted and if a receiver of the second signal receives the second signal, the second signal needs to be fed back.

In one embodiment, a transmitter of the second signal comprises a maintenance base station of the first serving cell.

In one embodiment, a transmitter of the second signal comprises a maintenance base station for the second serving cell.

In one embodiment, a transmitter of the second signal comprises a maintenance base station of the first serving cell, and the second signal is forwarded to a serving base station of the first serving cell through a serving base station of the second serving cell.

In one embodiment, the second signal is transmitted via an air interface.

In one embodiment, the second signal is transmitted via a radio interface.

In one embodiment, the second signal comprises a PHY layer signaling.

In one embodiment, the second signal comprises a MAC layer signaling.

In one embodiment, the second signal is transmitted via a high-layer signaling.

In one embodiment, the second signal comprises a higher-layer signaling.

In one embodiment, the second signal comprises all or part of a high-layer signaling.

In one embodiment, the second signal comprises an RRC message.

In one embodiment, the second signal comprises all of IEs in an RRC message.

In one embodiment, the second signal comprises part of IEs in an RRC message.

In one embodiment, the second signal comprises all of fields in an IE in an RRC message.

In one embodiment, the second signal comprises part of fields in an IE in an RRC message.

In one embodiment, the second signal comprises a UL signaling.

In one embodiment, the second signal comprises a Side-link signaling.

In one embodiment, an SRB of the second signal includes an SRB1.

In one embodiment, an SRB of the second signal includes an SRB3.

In one embodiment, a logical channel bearing the second signal comprises a DCCH.

In one embodiment, the second signal comprises DLInformationTransferMRDC.

In one embodiment, the second signal comprises an RRCReconfiguration.

In one embodiment, the second signal comprises an RRCConnectionReconfiguration.

In one embodiment, the second signal comprises an RRCRelease.

In one embodiment, the second signal comprises an RRCConnectionRelease.

In one embodiment, the second signal comprises a Msg2.

In one embodiment, the second signal comprises a Msg4.

In one embodiment, the second signal comprises a MsgB.

In one embodiment, the second signal comprises an RRCConnectionSetup.

In one embodiment, the second signal comprises an RRCConnectionReject.

In one embodiment, the second signal comprises an RRCConnectionResume.

In one embodiment, the second signal comprises an RRCEarlyDataComplete.

In one embodiment, the second signal comprises an RRCConnectionRelease.

In one embodiment, the phrase that the second timer is related to a parameter of a maintenance base station of the first serving cell includes: a parameter of a maintenance base station of the first serving cell is used to determine a parameter of the second timer.

In one embodiment, the phrase that the second timer is related to a parameter of a maintenance base station of the first serving cell includes: the second timer is configured according to a parameter of a maintenance base station of the first serving cell.

In one embodiment, the parameter of a maintenance base station of the first serving cell comprises a Timing Advance (TA).

In one embodiment, the parameter of a maintenance base station of the first serving cell comprises a Round Trip Time (RTT).

In one embodiment, the parameter of a maintenance base station of the first serving cell comprises a base station type.

In one subembodiment of the above embodiment, the base station type comprises an NTN base station.

In one subsidiary embodiment of the subembodiment, the NTN base station comprises one of a Geostationary Earth Orbiting (GEO) satellite, a Medium Earth Orbiting (MEO) satellite, a Low Earth Orbit (LEO) satellite, a Highly Elliptical Orbiting (HEO) satellite, or an Airborne Platform.

In one subembodiment of the above embodiment, the base station type comprises a TN base station.

In one subsidiary embodiment of the subembodiment, the TN base station comprises one of a Cellular Base Station, a Micro Cell base station, a Pico Cell base station, a Femtocell, an eNB or a gNB.

In one embodiment, the parameter of a maintenance base station of the first serving cell comprises a height of a base station.

In one subembodiment of the above embodiment, the higher the base station, the longer the maximum running time of the second timer.

In one subembodiment of the above embodiment, the lower the base station, the shorter the maximum miming time of the second timer.

In one subembodiment of the above embodiment, a maximum running time of the second timer is related to a height of the base station.

In one subembodiment of the above embodiment, the parameter of a maintenance base station of the first serving cell is determined according to a height of the base station.

In one embodiment, the parameter of a maintenance base station of the first serving cell comprises a Public Land Mobile Network (PLMN).

In one subembodiment of the above embodiment, the PLMN is used to determine that a maintenance base station of the first serving cell is an NTN base station.

In one subembodiment of the above embodiment, the PLMN is used to determine that a maintenance base station of the first serving cell is a TN base station.

In one embodiment, the first timer comprises a T310.

In one embodiment, the first signal comprises a MeasurementReport.

In one embodiment, the first signal comprises MCGFailureInformation.

In one embodiment, the first signal comprises a preamble.

In one embodiment, transmitting the first signal is before the starting a first timer.

In one embodiment, transmitting the first signal is after the starting a first timer.

In one embodiment, the first signal is transmitted when the first timer is running.

In one embodiment, when the first signal is triggered, the first timer is not running.

In one embodiment, the first timer is a timer T310, and the second timer is a timer T312.

In one embodiment, the Timer comprises a timer.

In one embodiment, the Timer comprises a Timer.

In one embodiment, the first timer comprises a timer T310.

In one embodiment, the first timer comprises a timer T312.

In one embodiment, the second timer comprises a timer T312.

In one embodiment, the second timer comprises a timer T316.

In one embodiment, the second timer comprises a timer T300.

In one embodiment, the second timer comprises a timer T301.

In one embodiment, the second timer comprises a timer T304.

In one embodiment, the second timer comprises a timer T311.

In one embodiment, the second timer comprises a timer T319.

In one embodiment, the second timer comprises an NTN-specific timer.

In one embodiment, the second timer comprises a timer used to determine a radio connection failure.

In one embodiment, the first timer comprises a timer T310, and the second timer comprises a timer T312.

In one embodiment, the first timer comprises a timer T310, and the second timer comprises a timer T316.

In one embodiment, the first timer comprises a timer T312, and the second timer comprises a timer T316.

Embodiment 1C

Embodiment 1C illustrates a schematic diagram of transmission of a first signaling according to one embodiment of the present disclosure, as shown in FIG. 1C. In FIG. 1, each box represents a step. It should be noted particularly that the order in which the boxes are arranged does not imply a chronological sequence of each step respectively marked.

In Embodiment 1C, a first node in the present disclosure receives the first signaling in step 101C; starts a first timer in step 102C; when a second timer is expired in step 103C, updates a first counter; when the first timer is running and when the first counter reaches a first value in step 104C, determines that an RLF occurs in a first serving cell; herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, a transmitter of the first signaling comprises the second node in the present disclosure.

In one embodiment, a transmitter of the first signaling comprises a maintenance base station for the first serving cell.

In one embodiment, the first serving cell comprises an MCG.

In one embodiment, the first serving cell comprises an SCG.

In one embodiment, the first serving cell comprises an SPCell.

In one subembodiment of the above embodiment, the SPCell comprises a PCell.

In one subembodiment of the above embodiment, the SPCell comprises a PSCell.

In one embodiment, the first serving cell comprises an SCell.

In one embodiment, the first serving cell comprises a serving cell of the first node.

In one embodiment, the first signaling is transmitted via an air interface.

In one embodiment, the first signaling is transmitted via a radio interface.

In one embodiment, the first signaling is transmitted via a high-layer signaling.

In one embodiment, the first signaling is used for an RRC connection release.

In one embodiment, the first signaling is used for an RRC connection recovery.

In one embodiment, the first signaling is used for an RRC connection reconfiguration.

In one embodiment, the first signaling is used for an RRC connection establishment.

In one embodiment, the first signaling is used for broadcast system information.

In one embodiment, the first signaling is used to configure the first timer.

In one embodiment, the first signaling is used to configure the second timer.

In one embodiment, the first signaling is used to configure the first value.

In one embodiment, the first signaling is used to determine the first value.

In one embodiment, the first signaling comprises a higher-layer signaling.

In one embodiment, the first signaling comprises all or part of a high-layer signaling.

In one embodiment, the first signaling comprises an RRC message.

In one embodiment, the first signaling comprises all of IEs in an RRC message.

In one embodiment, the first signaling comprises part of IEs in an RRC message.

In one embodiment, the first signaling comprises all of fields in an IE in an RRC message.

In one embodiment, the first signaling comprises part of fields in an IE in an RRC message.

In one embodiment, the first signaling comprises a Downlink (DL) signaling.

In one embodiment, an SRB of first signaling comprises an SRB1.

In one embodiment, an SRB of first signaling comprises an SRB3.

In one embodiment, an SRB of the first signaling comprises a Sidelink SRB.

In one embodiment, a logical channel bearing the first signaling comprises a DCCH.

In one embodiment, a logical channel bearing the first signaling comprises an SCCH.

In one embodiment, a logical channel bearing the first signaling comprises a Broadcast Control Channel (BCCH).

In one embodiment, a logical channel bearing the first signaling comprises a Bandwidth Reduced Broadcast Control Channel (BR-BCCH).

In one embodiment, the first signaling comprises an RRCResume message.

In one embodiment, the first signaling comprises an RRCConnectionResume message.

In one embodiment, the first signaling comprises an RRCReconfiguration message.

In one embodiment, the first signaling comprises a RRCConnectionReconfiguration message.

In one embodiment, the first signaling comprises an RRCSetup message.

In one embodiment, the first signaling comprises an RRCConnectionSetup message.

In one embodiment, the first signaling comprises an SIB1.

In one embodiment, the first signaling comprises an RNReconfiguration message.

In one embodiment, the first signaling comprises a SystemInformation message.

In one embodiment, the first signaling comprises a SystemInformationBlockType1 message.

In one embodiment, the first signaling comprises a SystemInformationBlockType2.

In one embodiment, the first signaling comprises an RadioResourceConfigDedicated IE.

In one embodiment, the first signaling comprises an SL-CommResourcePool IE.

In one embodiment, the first signaling comprises an RACH-ConfigCommon IE.

In one embodiment, the first signaling comprises an RLF-TimersAndConstants IE.

In one embodiment, the first signaling comprises a UE-TimersAndConstants IE.

In one embodiment, the first signaling comprises a MeasObjectNR IE.

In one embodiment, the first signaling comprises a MeasObjectEUTRA IE.

In one embodiment, the first signaling comprises a MeasObjectToAddModList IE.

In one embodiment, the first signaling comprises a MeasConfig IE.

In one embodiment, the first signaling comprises a MeasScaleFactor IE.

In one embodiment, the first signaling comprises a MeasIdleConfig IE.

In one embodiment, the phrase that the first signaling is used to determine a first timer length and a second time length includes: the first time length and the second time length are one or more fields in the first signaling.

In one embodiment, the phrase that the first signaling is used to determine a first timer length and a second time length includes: the first signaling comprises the first time length and the second time length.

In one embodiment, the phrase that the first signaling is used to determine a first timer length and a second time length includes: the first time length and the second time length are configured via the first signaling.

In one embodiment, the phrase that the first signaling is used to determine a first timer length and a second time length includes: the first time length is configured via a first sub-signaling, the second time length is configured via a second sub-signaling, and the first signaling comprises the first sub-signaling and the second sub-signaling.

In one subembodiment of the above embodiment, the first sub-signaling is the same as the second sub-signaling.

In one subembodiment of the above embodiment, the first sub-signaling is different from the second sub-signaling.

In one subembodiment of the above embodiment, the first sub-signaling and the second sub-signaling are received in a same RRC message.

In one subembodiment of the above embodiment, the first sub-signaling and the second sub-signaling are received in different RRC messages.

In one embodiment, the phrase that the first time length is used to determine an expiration value of the first timer includes: the first time length is for the first timer.

In one embodiment, the phrase that the first time length is used to determine an expiration value of the first timer includes: the first time length is an expiration value of the first timer.

In one embodiment, the phrase that the first time length is used to determine an expiration value of the first timer includes: an expiration value of the first timer comprises the first time length.

In one embodiment, the phrase that the first time length is used to determine an expiration value of the first timer includes: a running time of the first timer is equal to the first time length, and the first timer is expired.

In one subembodiment of the above embodiment, the phrase that the first timer is expired includes: timing of the first timer reaches a maximum value.

In one subembodiment of the above embodiment, the phrase that the first timer is expired includes: the first timer is expired.

In one subembodiment of the above embodiment, the phrase that the first timer is expired includes: the first timer is no longer valid.

In one embodiment, the phrase that the second time length is used to determine an expiration value of the second timer includes: the first time length is for the first timer.

In one embodiment, the phrase that the second time length is used to determine an expiration value of the second timer includes: the first time length is an expiration value of the first timer.

In one embodiment, the phrase that the second time length is used to determine an expiration value of the second timer includes: an expiration value of the first timer comprises the first time length.

In one embodiment, the expiration time comprises a maximum running time.

In one embodiment, the expiration value comprises a failure time.

In one embodiment, the expiration value comprises an expiration time.

In one embodiment, the expiration value of the first timer comprises a maximum running time after the first timer is started.

In one embodiment, the expiration value of the second timer comprises a maximum running time after the second timer is started.

In one embodiment, the second timer comprises a timer T310.

In one embodiment, the second timer is used to determine an occurrence of an RLF.

In one embodiment, the second timer is used to determine an occurrence of a beam failure.

In one embodiment, the second timer is used to determine the an occurrence of a Listen Before Talk (LBT) failure.

In one embodiment, the second timer comprises a lbt-FailureDetectionTimer.

In one embodiment, the second timer comprises an ra-ResponseWindow.

In one embodiment, the second timer comprises a drx-onDurationTimer.

In one embodiment, the second timer comprises a beamFailureRecoveryTimer.

In one embodiment, the second timer comprises a drx-HARQ-RTT-TimerDL.

In one embodiment, the second timer comprises a ra-ContentionResolutionTimer.

In one embodiment, the second timer comprises a msgB-ResponseWindow.

In one embodiment, the second timer comprises an RRC-layer timer.

In one embodiment, the second timer comprises a MAC-layer timer.

In one embodiment, the first time length is configurable.

In one embodiment, the first time length is pre-configured.

In one embodiment, the first time length is configured via the first signaling.

In one embodiment, the first time length is measured by ms.

In one embodiment, the second time length is configurable.

In one embodiment, the second time length is pre-configured.

In one embodiment, the second time length is configured via the first signaling.

In one embodiment, the unit for measurement of the second time length is ms.

In one embodiment, the first time length is greater than the second time length.

In one embodiment, the first time length is less than the second time length.

In one embodiment, the first time length is the same as the second time length.

In one embodiment, the first time length is different from the second time length.

In one embodiment, the first signaling comprises K1 first time length candidate value(s), the first time length is one of the K1 first time length candidate value(s), the K1 being a positive integer.

In one embodiment, the first signaling comprises K2 first time length candidate value(s), the first time length is one of the K2 first time length candidate value(s), the K2 being a positive integer.

In one embodiment, the first signaling comprises the first timer, and the first timer comprises the first value.

In one embodiment, the first timer is configured via an RRC.

In one embodiment, the first timer is configurable.

In one embodiment, the first timer is conditionally configured.

In one subembodiment of the above embodiment, the first timer is configured for NTN.

In one subembodiment of the above embodiment, when the first serving cell is a cell with large delay, the first timer is configured.

In one embodiment, the first timer is NTN-specific.

In one embodiment, the first timer is specific to the first serving cell.

In one embodiment, the starting the first timer includes that the first timer starts timing.

In one embodiment, the starting the first timer includes starting the first timer.

In one embodiment, the starting the first timer includes the that first timer starts running.

In one embodiment, the starting the first timer includes activating the first timer.

In one embodiment, the first timer comprises a T312.

In one embodiment, the first timer comprises a T316.

In one embodiment, the first timer comprises a timer T300.

In one embodiment, the first timer comprises a timer T301.

In one embodiment, the first timer comprises a timer T304.

In one embodiment, the first timer comprises a timer T311.

In one embodiment, the first timer comprises a timer T319.

In one embodiment, the first timer comprises a timer T3xy, and the xy comprises a non-negative integer less than 100.

In one embodiment, the first timer is NTN-specific.

In one embodiment, the first timer is not NTN-specific.

In one embodiment, the first timer is used to determine an RLF.

In one embodiment, the first timer is different from a T310.

In one embodiment, the first timer is different from a T312.

In one embodiment, the first timer comprises an RRC-layer timer.

In one embodiment, the first timer comprises a MAC-layer timer.

In one embodiment, when a number of received out-of-sync indications reaches a first positive integer, the first timer is started.

In one embodiment, when a number of received in-sync indications reaches a second positive integer, the first timer is stopped.

In one embodiment, the phrase of "when a second timer is expired, updating a first counter" includes: the second timer being expired is used to update the first counter.

In one embodiment, the phrase of "when a second timer is expired, updating a first counter" includes: the second timer being expired is a condition for the first counter being updated.

In one embodiment, the phrase that the second timer is expired includes: timing of the second timer reaches the second time length.

In one embodiment, the phrase that the second timer is expired includes: timing of the second timer reaches a maximum value.

In one embodiment, the phrase that the second timer is expired includes: the second timer is expired.

In one embodiment, the phrase that the second timer is expired includes: the second timer is no longer valid.

In one embodiment, the phrase of updating a first counter includes: the first counter is added by 1.

In one embodiment, the phrase of updating a first counter includes: the first counter is subtracted by 1.

In one embodiment, the phrase of updating a first counter includes updating a counting value of the first counter.

In one embodiment, the phrase of updating a first counter includes: the first counter is added by M1, and the M1 is a positive integer greater than 1.

In one embodiment, the phrase of updating a first counter includes: the first counter is subtracted by 2, and the M2 is a positive integer greater than 1.

In one embodiment, the second timer being expired is used to update the first counter.

In one embodiment, when the phrase of the second timer being expired occurs, a value of the first counter is updated.

In one embodiment, when the phrase of the second timer being expired occurs and a value of the first counter is less than the first value, a value of the first counter is updated.

In one embodiment, each time the second timer is expired, the first counter is updated.

In one embodiment, the second timer is expired for M3 times, and the first counter is updated once, the M3 being a positive integer greater than 1.

In one embodiment, the phrase of when the first timer is running includes when the first timer is running.

In one embodiment, the phrase of when the first timer is running includes a time interval when the first timer is started and the first timer is not expired.

In one embodiment, the phrase of when the first timer is running includes a running time of the first timer is less than a first time length.

In one embodiment, the phrase that the first counter reaching a first value includes: a counting of the first counter is equal to the first value.

In one embodiment, the phrase that the first counter reaching a first value includes: a value of the first counter reaches the first value.

In one embodiment, the phrase that the first counter reaching a first value includes: the first counter is not less than the first value.

In one embodiment, the first value is configurable.

In one embodiment, the first value is pre-configured.

In one embodiment, the first value is of a fixed magnitude.

In one embodiment, the first value is related to a parameter of a maintenance base station of the first serving cell.

In one embodiment, the first value comprises a threshold.

In one embodiment, the first value comprises a positive integer.

In one embodiment, the first value is equal to 8.

In one embodiment, the first value is equal to 4.

In one embodiment, the first value is equal to a multiple of 2.

In one embodiment, the first value is related to a parameter of a maintenance base station of the first serving cell.

In one embodiment, the phrase that the first counter is used to determine expiration times of the second timer includes: the first counter is used to count expiration times of the second timer.

In one embodiment, the phrase that the first counter is used to determine expiration times of the second timer includes: the first counter is used to update expiration times of the second timer.

In one embodiment, the phrase that the first counter is used to determine expiration times of the second timer includes: the first counter is used to determine expiration times of the second timer when the first timer is expired.

In one embodiment, the phrase that the first counter is used to determine expiration times of the second timer includes: the first counter is used to determine expiration times of the second timer when the first timer is running.

In one embodiment, the first signaling comprises the first counter, and the first counter comprises the first value.

In one embodiment, the first counter is configured via an RRC.

In one embodiment, the first counter is configurable.

In one embodiment, the first counter is conditionally configured.

In one subembodiment of the above embodiment, the first counter is configured for NTN.

In one subembodiment of the above embodiment, when the first serving cell is a cell with large delay, the first counter is configured.

In one embodiment, the first counter is NTN-specific.

In one embodiment, the first counter is specific to the first serving cell.

In one embodiment, the first counter comprises a counter N3AB, and the AB comprises a non-negative integer less than 100.

In one embodiment, an initial value of the first counter is equal to 0.

In one embodiment, a maximum value of the first counter is equal to the first value.

In one embodiment, a maximum value of the first counter is greater than the first value.

In one embodiment, when the first counter reaches the first value and when the second timer is expired, the first counter is updated.

In one embodiment, when the first counter reaches the first value and when the second timer is expired, the first counter is not updated; the not updating the first counter comprises that a value of the first counter remains unchanged.

In one embodiment, the phrase that the first counter is valid when the first timer is miming includes: when the first timer is running, the first counter is allowed to count.

In one embodiment, the phrase that the first counter is valid when the first timer is running includes: the first counter only counts when the first timer is running.

In one embodiment, the phrase that the first counter is valid when the first timer is running includes: the first counter is only updated when the first timer is running.

In one embodiment, the phase of determining that an RLF occurs in a first cell includes declaring that the RLF occurs in the first serving cell.

In one embodiment, the phase of determining that an RLF occurs in a first cell includes the RLF is assumed to occur in the first serving cell.

In one embodiment, the RLF comprises an RLF.

In one embodiment, the RLF comprises an HOF.

In one embodiment, a reason of the RLF includes that the first counter reaches the first value.

In one embodiment, a reason of the RLF includes that the first counter is not less than the first value when the first timer is expired.

In one embodiment, when the first node declares an RLF, a reason of the RLF is stored in a variant VarRLF-Report.

In one embodiment, when it is determined that an RLF occurs in a first serving cell, the first node executes an MCGFailureInformation procedure.

In one embodiment, when it is determined that an RLF occurs in a first serving cell, the first node executes cell selection, and when a selected cell is a CHO candidate cell, a CHO is executed.

In one embodiment, when it is determined that an RLF occurs in a first serving cell, the first node executes an RRC connection reestablishment procedure.

In one embodiment, the phrase that a timekeeping of the second timer reaching the second time length is used to determine that the second timer is expired includes when the second timer is started, determining that the second timer is expired after the second time length.

In one embodiment, the phrase that a timekeeping of the second timer reaching the second time length is used to determine that the second timer is expired includes after the second timer is started, when a timekeeping of the second timer reaches the second time length and the second timer is not stopped, determining that the second timer is expired.

In one embodiment, the phrase that a timekeeping of the second timer reaching the second time length is used to determine that the second timer is expired includes when a running time of the second timer reaches the second time length, determining that the second timer is expired.

In one embodiment, the phrase that a timekeeping of the second timer reaching the second time length is used to determine that the second timer is expired includes if the physical-layer problem of the first serving cell is not recovered when the second timer is running and when the second timer runs to a maximum value of the second timer, determining that the second timer is expired.

In one embodiment, the phrase that the first timer is related to a parameter of a maintenance base station of the first serving cell includes: a parameter of a maintenance base station of the first serving cell is used to determine a parameter of the first timer.

In one embodiment, the phrase that the first timer is related to a parameter of a maintenance base station of the first serving cell includes: the second timer is configured according to a parameter of a maintenance base station of the first serving cell.

In one embodiment, the parameter of a maintenance base station of the first serving cell comprises a TA.

In one embodiment, the parameter of a maintenance base station of the first serving cell comprises an RTT.

In one embodiment, the parameter of a maintenance base station of the first serving cell comprises a base station type.

In one subembodiment of the above embodiment, the base station type comprises an NTN base station.

In one subsidiary embodiment of the subembodiment, the NTN base station comprises one of a GEO satellite, an MEO satellite, a LEO satellite, an HEO satellite, or an Airborne Platform.

In one subembodiment of the above embodiment, the base station type comprises a TN base station.

In one subsidiary embodiment of the subembodiment, the TN base station comprises one of a Cellular Base Station, a Micro Cell base station, a Pico Cell base station, a Femto-cell, an eNB or a gNB.

In one embodiment, the parameter of a maintenance base station of the first serving cell comprises a height of a base station.

In one subembodiment of the above embodiment, the higher the base station, the longer the maximum running time of the first timer.

In one subembodiment of the above embodiment, the lower the base station, the shorter the maximum running time of the first timer.

In one subembodiment of the above embodiment, a maximum running time of the first timer is related to a height of the base station.

In one subembodiment of the above embodiment, the parameter of a maintenance base station of the serving cell is determined according to a height of the base station.

In one embodiment, the parameter of a maintenance base station of the first serving cell comprises a PLMN.

In one subembodiment of the above embodiment, the PLMN is used to determine that a maintenance base station of the first serving cell is an NTN base station.

In one subembodiment of the above embodiment, the PLMN is used to determine that a maintenance base station of the first serving cell is a TN base station.

In one embodiment, the timer, time, time length in the present disclosure ignore time delay brought by system processing, coding, decoding, receiving and transmitting.

In one embodiment, when there is a time delay brought by system processing, coding, decoding, receiving, transmitting, etc., values corresponding to the timer, the time and the time length can be automatically increased or decreased.

Embodiment 2

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LIE) and Long-Term Evolution Advanced (LIE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/ SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmissions in NTN.

In one embodiment, the UE 201 supports transmissions in networks with large delay difference.

In one embodiment, the UE 201 supports transmissions in TN.

In one embodiment, the UE 201 supports Dual Connectivity transmissions.

In one embodiment, the UE 201 supports Sidelink transmissions.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device that supports transmissions with low-latency and high-reliability.

In one embodiment, the gNB 203 corresponds to the second node in the present disclosure.

In one embodiment, the gNB 203 corresponds to the third node in the present disclosure.

In one embodiment, the gNB 203 supports transmissions in NTN.

In one embodiment, the gNB 203 supports transmissions in networks with large delay difference.

In one embodiment, the gNB 203 supports transmissions in TN.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay difference.

In one embodiment, the gNB 203 is a flight platform.

In one embodiment, the gNB 203 is satellite equipment.

In one embodiment, the gNB 203 is a UE.

In one embodiment, the gNB 203 is a gateway.

Embodiment 3

Figure 3:
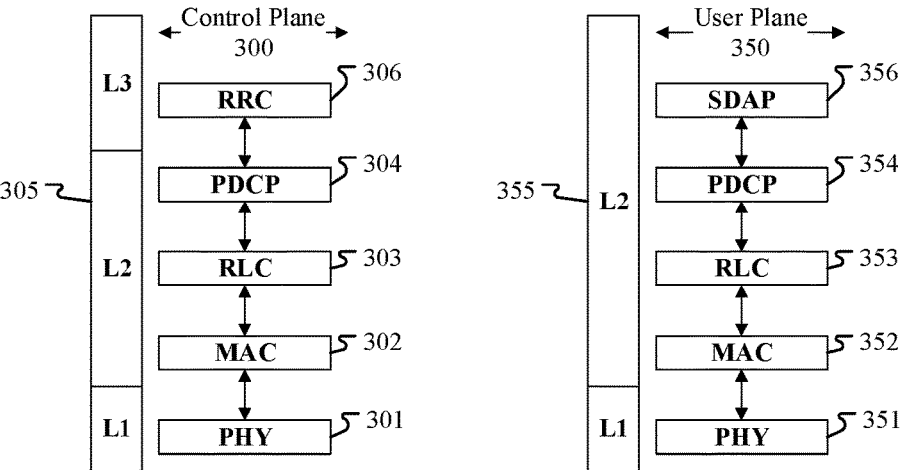
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a MAC sublayer 302, an RLC sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and a DRB to support the diversity of traffic.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling in the present disclosure is generated by the RRC 306.

In one embodiment, the second signaling in the present disclosure is generated by the RRC 306.

In one embodiment, the third signaling in the present disclosure is generated by the RRC 306.

In one embodiment, the fourth signaling in the present disclosure is generated by the RRC 306.

In one embodiment, the fifth signaling in the present disclosure is generated by the RRC 306.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the RRC 306.

In one embodiment, the second signal in the present disclosure is generated by the MAC 302 or the MAC 352.

In one embodiment, the second signal in the present disclosure is generated by the PHY 301 or the PHY 351.

Embodiment 4

Figure 4:
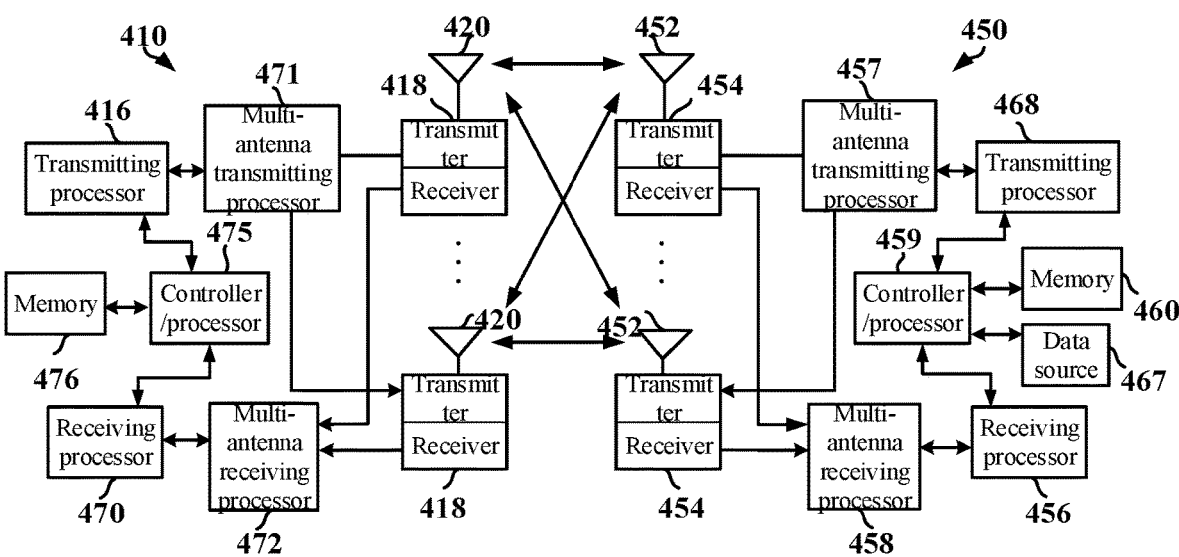
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least determines that a physical-layer problem occurs in a first serving cell; as a response to determining that the physical-layer problem occurs in the first serving cell, starts a first timer; determines that a first condition set is satisfied; as a response to the first condition set being satisfied, transmits a first signaling; as a response to the first condition set being satisfied, starts a second timer and stops the first timer; when the second timer is in a running state, monitors a second signaling; herein, the first condition set comprises that an RLF occurs in the first serving cell and the second timer is configured; the second timer is associated with the first serving cell; the first signaling is used to initiate a radio connection recovery; the second signaling is used to update a radio connection.

In one embodiment, the first communication device 450 comprises at least one processor and at least one memory. a memory that stores a computer readable instruction program. The computer readable instruction program generates an action when executed by at least one processor. The action includes: determining that a physical-layer problem occurs in a first serving cell; as a response to determining that the physical-layer problem occurs in the first serving cell, starting a first timer; determining that a first condition set is satisfied; as a response to the first condition set being satisfied, transmitting a first signaling; as a response to the first condition set being satisfied, starting a second timer and stopping the first timer; when the second timer is in a running state, monitoring a second signaling; herein, the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: monitors a first signaling; when the first signaling is received, transmits a second signaling; herein, as a response to determining that a physical-layer problem occurs in a first serving cell, a first timer is started; as a response to a first condition set being satisfied, a second timer is started and the first timer is stopped; the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the second communication device 410 comprises a memory that stores a computer readable instruction program. The computer readable instruction program generates an action when executed by at least one processor. The action includes: monitoring a first signaling; when the first signaling is received, transmitting a second signaling; herein, as a response to determining that a physical-layer problem occurs in a first serving cell, a first timer is started; as a response to a first condition set being satisfied, a second timer is started and the first timer is stopped; the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least determines that a physical-layer problem occurs in a first serving cell; as a response to the phrase of determining that a physical-layer problem occurs in a first serving cell, starts a first serving cell; transmits a first signal; as a response to the first signal being triggered, starts a second timer; when the second timer is running, monitors a second signal, and when the first timer is expired, maintains a radio connection and the second timer continues timing; herein, the first signal is used to trigger the second signal; and the second timer is related to a parameter of a maintenance base station of the first serving cell.

In one embodiment, the first communication device 450 comprises at least one processor and at least one memory. a memory that stores a computer readable instruction program. The computer readable instruction program generates an action when executed by at least one processor. The action includes: determining that a physical-layer problem occurs in a first serving cell; as a response to the phrase of determining that a physical-layer problem occurs in a first serving cell, starting a first serving cell; transmitting a first signal; as a response to the first signal being triggered, starting a second timer; when the second timer is running, monitoring a second signal, when the first timer is expired, maintaining a radio connection and the second timer continuing timing; herein, the first signal is used to trigger the second signal; and the second timer is related to a parameter of a maintenance base station of the first serving cell.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a first signal; and as a response to the first signal being received, transmits a second signal; herein, as a response to determining that a physical-layer problem occurs in a first serving cell, a first timer is started; as a response to the first signal being triggered, a second timer is started; when the second timer is running, the second signal is monitored, and when the first timer is expired, a radio connection is maintained and the second timer continues timing; the first signal is used to trigger the second signal; and the second timer is related to a parameter of a maintenance base station of the first serving cell.

In one embodiment, the second communication device 410 comprises a memory that stores a computer readable instruction program. The computer readable instruction program generates an action when executed by at least one processor. The action includes: receiving a first signal; and as a response to the first signal being received, transmitting a second signal; herein, as a response to determining that a physical-layer problem occurs in a first serving cell, a first timer is started; as a response to the first signal being triggered, a second timer is started; when the second timer is running, the second signal is monitored, and when the first timer is expired, a radio connection is maintained and the second timer continues timing; the first signal is used to trigger the second signal; and the second timer is related to a parameter of a maintenance base station of the first serving cell.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least receives a first signaling; starts a first timer; when a second timer is expired, updates a first counter; and when the first timer is running and when the first counter reaches a first value, determines that an RLF occurs in a first serving cell; herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; and the first counter is valid when the first timer is running; the first timer is related to a parameter of a maintenance base station of the first serving cell.

In one embodiment, the first communication device 450 comprises at least one processor and at least one memory. a memory that stores a computer readable instruction program. The computer readable instruction program generates an action when executed by at least one processor. The action includes: receiving a first signaling; starting a first timer; when a second timer is expired, updating a first counter; and when the first timer is running and when the first counter reaches a first value, determining that an RLF occurs in a first serving cell; herein, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling; herein, a first timer is started; when a second timer is expired, the first counter is updated; when the first timer is running and the first counter reaches a first value, an occurrence of an RLF is determined in a first serving cell; the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, the second communication device 410 comprises a memory that stores a computer readable instruction program. The computer readable instruction program generates an action when executed by at least one processor. The action includes: transmitting a first signaling; herein, a first timer is started; when a second timer is expired, the first counter is updated; when the first timer is running and the first counter reaches a first value, an occurrence of an RLF is determined in a first serving cell; the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, the antenna 452, the transmitter 454, the transmitting processor 468, and the controller/processor 459 are used to transmit a first signaling; at least one of the antenna 420, the receiver 418, the receiving processor 470, or the controller/processor 475 is used to receive a first signaling.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the transmitter 454, the transmitting processor 468 and the controller/processor 459 are used to transmit a third signaling; at least one of the antenna 420, the receiver 418, the receiving processor 470 or the controller/processor 475 is used to receive a third signaling.

In one embodiment, the antenna 452, the transmitter 454, the transmitting processor 468, and the controller/processor 459 are used to transmit a fourth signaling; at least one of the antenna 420, the receiver 418, the receiving processor 470, or the controller/processor 475 is used to receive a fourth signaling.

In one embodiment, the antenna 452, the receiver 454, the receiving processor 456, and the controller/processor 459 are used to receive a fifth signaling; at least one of the antenna 420, the transmitter 418, the transmitting processor 416, or the controller/processor 475 is used to transmit a fifth signaling.

In one embodiment, the antenna 452, the transmitter 454, the transmitting processor 468, and the controller/processor 459 are used to transmit a first signal; at least one of the antenna 420, the receiver 418, the receiving processor 470, or the controller/processor 475 is used to receive a first signal.

In one embodiment, the antenna 452, the receiver 454, the receiving processor 456, and the controller/processor 459 are used to receive a second signal; at least one of the antenna 420, the transmitter 418, the transmitting processor 416, or the controller/processor 475 is used to transmit a second signal.

In one embodiment, the antenna 452, the receiver 454, the receiving processor 456, the controller/processor 459 are used to receive a first signaling; at least one of the antenna 420, the transmitter 418, the transmitting processor 416, or the controller/processor 475 is used to transmit a first signaling.

In one embodiment, the first communication device 450 corresponds to a first node in the present disclosure.

In one embodiment, the second communication device 410 corresponds to a second node in the present disclosure.

In one embodiment, the second communication device 410 corresponds to a third node in the present disclosure.

In one embodiment, the first communication device 450 is an ender.

In one embodiment, the first communication device 450 is a V2X device.

In one embodiment, the first communication device 450 is an Internet of Things (IoT) device.

In one embodiment, the first communication device 450 supports Sidelink communications.

In one embodiment, the first communication device 450 supports DC communications.

In one embodiment, the first communication device 450 is a UE.

In one embodiment, the first communication device 450 is a UE that supports large delay inequality.

In one embodiment, the first communication device 450 is a UE that supports NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay inequality.

In one embodiment, the second communication device 410 is a base station that supports NTN.

In one embodiment, the second communication device 410 is a satellite equipment.

In one embodiment, the second communication device 410 is flying platform equipment.

In one embodiment, the second communication device 410 is a base station that supports TN.

In one embodiment, the second communication device 410 is an Ender.

In one embodiment, the second communication device 410 is a V2X device.

In one embodiment, the second communication device 410 is an IoT device.

In one embodiment, the second communication device 410 supports DC communications.

In one embodiment, the second communication device 410 is a UE.

Embodiment 5A

Figure 5A:
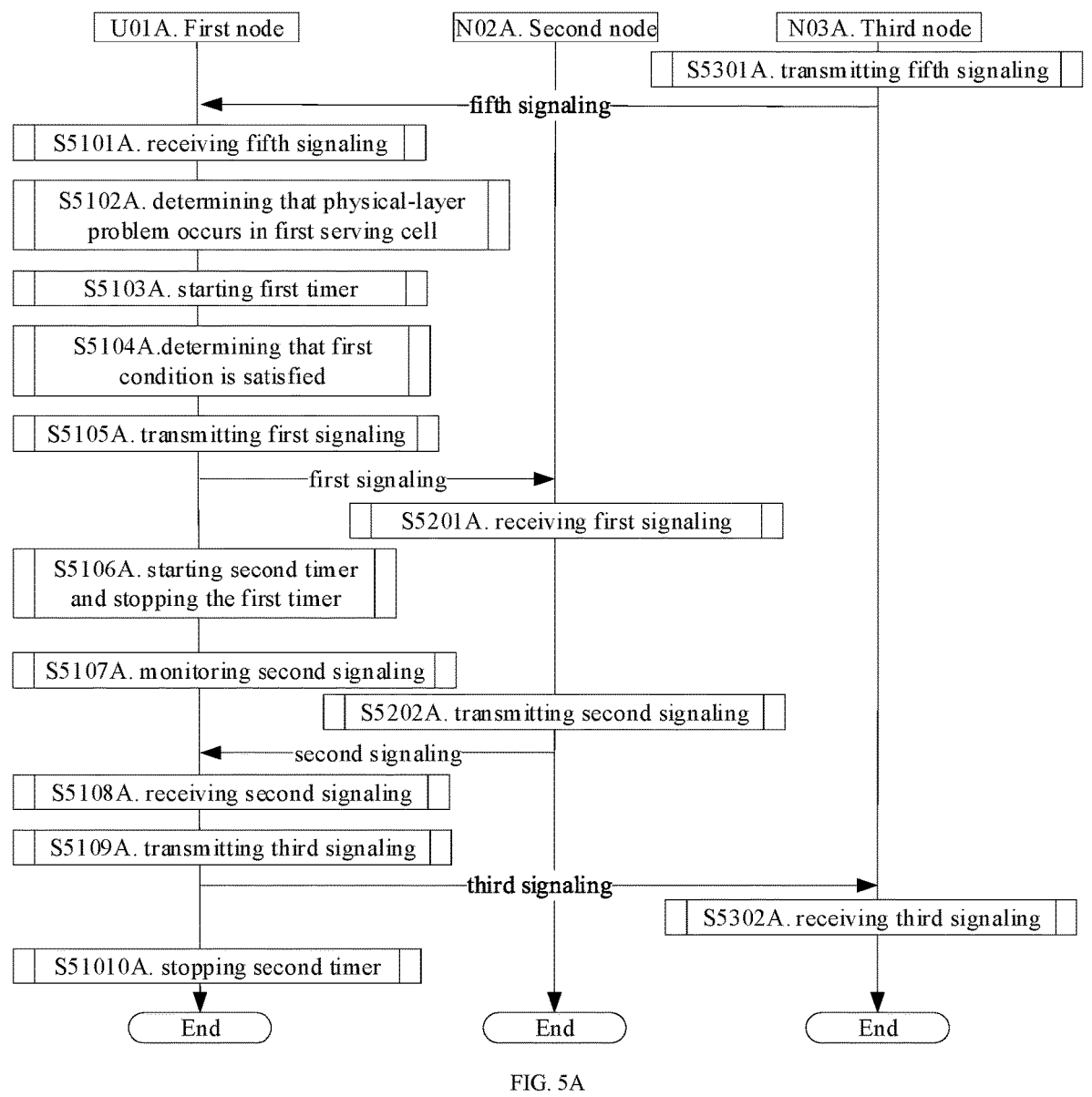
FIG. 5A illustrates a flowchart of radio signal transmission according to one embodiment of the present disclosure.
Figure 5B:
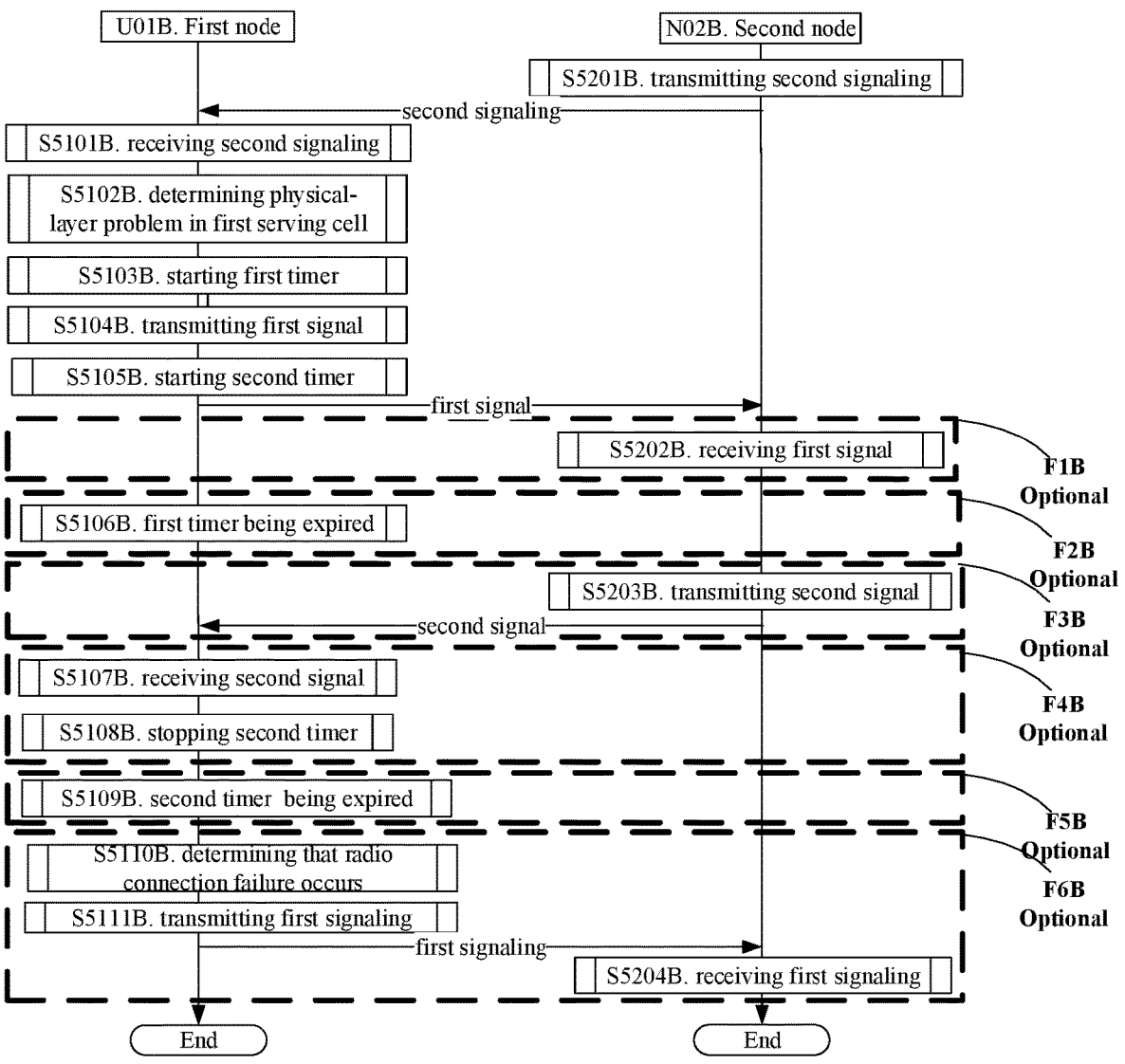
FIG. 5B illustrates a flowchart of radio signal transmission according to one embodiment of the present disclosure.
Figure 5C:
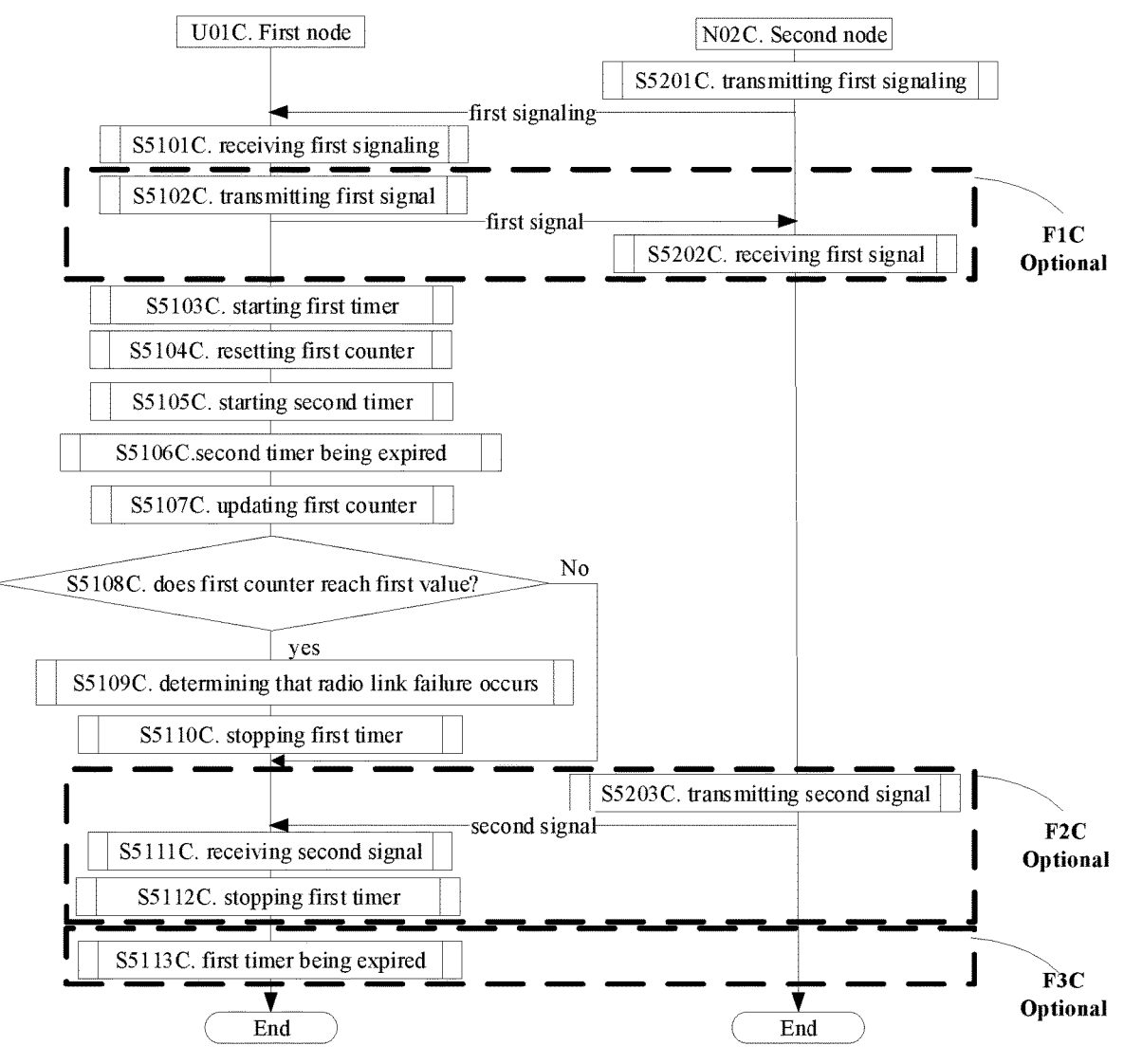
FIG. 5C illustrates a flowchart of radio signal transmission according to one embodiment of the present disclosure.

Embodiment 5A illustrates a flowchart of radio signal transmission according to one embodiment in the present disclosure, as shown in FIG. 5. A first node U01A comprises a UE; a second node N02A comprises a base station; and a third node N03A comprises a base station; it is particularly underlined that the order illustrated in the embodiment does not put constraints over sequences of signal transmissions and implementations.

The first node U01A receives a fifth signaling in step S5101A; determines that a physical-layer problem occurs in a first serving cell in step S5102A; as a response to determining that the physical-layer problem occurs in the first serving cell, starts a first timer in step S5103A; determines that a first condition set is satisfied in step S5104A; as a response to the first condition set being satisfied, transmits a first signaling in step S5105A; as a response to the first condition set being satisfied, starts a second timer and stops the first timer in step S5106A; when the second timer is in a running state, monitors a second signaling in step S5107A; receives the second signaling in step S5108A; as a response to the second signaling being received, transmits a third signaling in step S5109A, and stops the second timer in step S51010A.

The second node N02A receives a first signaling in step S5201A, and transmits a second signaling in step S5202A.

The third node N03A transmits a fifth signaling in step S5301A, and receives a third signaling in step S5302A.

In Embodiment 5A, the fifth signaling is used to indicate an expiration value of the first timer and an expiration value of the second timer; the fifth signaling comprises a first field, and the first field is used to indicate a state of the second timer; the first condition set comprises that an RLF occurs in the first serving cell and the second timer is configured; the second timer is associated with the first serving cell; the first signaling is used to initiate a radio connection recovery; and the second signaling is used for updating a radio connection; the second signaling comprises an RRC connection reconfiguration message; the third signaling is used to confirm the RRC connection reconfiguration message.

In one embodiment, a second node N02A comprises a maintenance base station of a second serving cell.

In one embodiment, a third node N03A comprises a maintenance base station of a first serving cell.

In one embodiment, a third node N03A comprises a maintenance base station of a target cell.

In one embodiment, a transmitter of the fifth signaling comprises a maintenance base station of the first serving cell.

In one embodiment, a transmitter of the fifth signaling comprises a maintenance base station of the second serving cell.

In one embodiment, the fifth signaling is transmitted via an air interface.

In one embodiment, the fifth signaling is transmitted via a radio interface.

In one embodiment, the fifth signaling is transmitted via a high-layer signaling.

In one embodiment, the fifth signaling comprises a higher-layer signaling.

In one embodiment, the fifth signaling comprises all or part of a high-layer signaling.

In one embodiment, the fifth signaling comprises an RRC message.

In one embodiment, the fifth signaling comprises all or part of IEs of an RRC message.

In one embodiment, the fifth signaling comprises all or part of fields in an IE in an RRC message.

In one embodiment, the fifth signaling comprises a UL signaling.

In one embodiment, an SRB of the fifth signaling comprises an SRB1.

In one embodiment, an SRB of the fifth signaling comprises an SRB3.

In one embodiment, an SRB of the fifth signaling comprises a Sidelink SRB.

In one embodiment, a logical channel bearing the fifth signaling comprises a DCCH.

In one embodiment, a logical channel bearing the fifth signaling comprises an SCCH.

In one embodiment, the fifth signaling is used for an RRC connection reconfiguration.

In one embodiment, the fifth signaling is used for an RRC connection release.

In one embodiment, the fifth signaling comprises an RRCReconfiguration message.

In one embodiment, the fifth signaling comprises an RRCConnectionReconfiguration message.

In one embodiment, the fifth signaling comprises an RRCRelease message.

In one embodiment, the fifth signaling comprises a RRC-ConnectionRelease message.

In one embodiment, the fifth signaling comprises a DLInformationTransferMRDC message.

In one embodiment, the fifth signaling comprises an RRCReconfigurationSidelink.

In one embodiment, the fifth signaling comprises an RRCConnectionReconfigurationSidelink.

In one embodiment, the fifth signaling comprises an RRCReconfiguration.

In one embodiment, the fifth signaling comprises a Cell-GroupConfi IE.

In one embodiment, the fifth signaling comprises an RLF-TimersAndConstants IE.

In one embodiment, the fifth signaling comprises a configuration of the first timer.

In one embodiment, the fifth signaling comprises a configuration of the second timer.

In one embodiment, the first field is one field in the fifth signaling.

In one embodiment, the first field is used to configure the second timer.

In one embodiment, the first field is conditional.

In one embodiment, the first field is optional.

In one embodiment, the first field is mandatory.

In one embodiment, when the first serving cell belongs to an MCG, the first field exists.

In one embodiment, when the first serving cell belongs to an SCG, the first field exists.

In one embodiment, when the first serving cell belongs to an SCG, the first field does not exist.

In one embodiment, when the first node U01A is configured with a split SRB1 or an SRB3, the first field exists.

In one embodiment, the first field comprises a t316.

In one embodiment, the first field comprises a t316-r16.

In one embodiment, the phrase that the first field is used to indicate a state of the second timer includes: the first field is used to indicate that the second timer is setup.

In one embodiment, the phrase that the first field is used to indicate a state of the second timer includes: the first field is used to indicate that the second timer is released.

In one embodiment, the phrase that the first field is used to indicate a state of the second timer includes: the first field is used to indicate whether the second timer is configured.

In one subembodiment of the above embodiment, when the first field is set as setup, the first node U01A is configured with the second timer.

In one subembodiment of the above embodiment, when the first field is set as release, the first node U01A is not configured with the second timer.

In one embodiment, the phrase that as a response to the second signaling being received includes when the second signaling is received.

In one embodiment, the phrase that as a response to the second signaling being received includes as a next step that the second signaling is received.

In one embodiment, the phrase that as a response to the second signaling being received includes as a feedback that the second signaling is received.

In one embodiment, the phrase that as a response to the second signaling being received includes when the second signaling is received.

In one embodiment, the phrase that as a response to the second signaling being received includes if the second signaling is received.

In one embodiment, the phrase that the second signaling comprises an RRC connection re-configuration message includes: the second signaling is the RRC connection reconfiguration message.

In one embodiment, the phrase that the second signaling comprises an RRC connection re-configuration message includes: the RRC connection reconfiguration message is an IE in the second signaling.

In one embodiment, the phrase that the second signaling comprises an RRC connection re-configuration message includes: the RRC connection reconfiguration message is a field in the second signaling.

In one embodiment, the second signaling is an RRCReconfiguration message, and the RRC connection release message comprises an RRCReconfiguration IE.

In one embodiment, the second signaling is an RRCConnectionReconfiguration message, and the RRC connection release message comprises an RRCConnectionReconfiguration IE.

In one embodiment, the second signaling is a DLInformationTransferMRDC message, and the RRC connection release message comprises an RRCReconfiguration IE.

In one embodiment, the second signaling is a DLInformationTransferMRDC message, and the RRC connection release message comprises an RRCConnectionReconfiguration IE.

In one embodiment, stopping the second timer includes suspending the second timer.

In one embodiment, stopping the second timer includes clearing the second timer.

In one embodiment, stopping the second timer includes keeping the second timer.

In one embodiment, stopping the second timer includes resetting the second timer.

In one embodiment, stopping the second timer includes ending the second timer.

In one embodiment, stopping the second timer includes pausing the second timer.

In one embodiment, stopping the second timer includes that the second timer does not continue timing.

In one embodiment, stopping the second timer includes stopping the radio connection recovery procedure.

In one embodiment, stopping the second timer includes stopping the MCG failure information procedure.

In one embodiment, a receiver of the third signaling comprises a maintenance base station of the first serving cell.

In one embodiment, a receiver of the third signaling comprises a maintenance base station of a target cell.

In one embodiment, the target cell is determined by the third node N03A.

In one embodiment, the target cell is determined by a maintenance base station of the first serving cell.

In one embodiment, the third signaling is transmitted via an air interface.

In one embodiment, the third signaling is transmitted via a radio interface.

In one embodiment, the third signaling is transmitted via a high-layer signaling.

In one embodiment, the third signaling comprises a higher-layer signaling.

In one embodiment, the third signaling comprises all or part of a higher-layer signaling.

In one embodiment, the third signaling comprises an RRC message.

In one embodiment, the third signaling comprises all or part of IEs of an RRC message.

In one embodiment, the third signaling comprises all or part of fields in an IE in an RRC message.

In one embodiment, the third signaling comprises a UL signaling.

In one embodiment, an SRB of the third signaling comprises an SRB0.

In one embodiment, an SRB of the third signaling comprises an SRB1.

In one embodiment, an SRB of the third signaling includes an SRB3.

In one embodiment, an SRB of the third signaling comprises a Sidelink SRB.

In one embodiment, a logical channel bearing the third signaling comprises a DCCH.

In one embodiment, a logical channel bearing the third signaling comprises an SCCH.

In one embodiment, the third signaling comprises an RRCReconfigurationComplete message.

In one embodiment, the third signaling comprises an RRCConnectionReconfigurationComplete message.

In one embodiment, the third signaling comprises an RRCReconfigurationCompleteSidelink message.

Embodiment 5B

Embodiment 5B illustrates a flowchart of radio signal transmission according to one embodiment in the present disclosure, as shown in FIG. 5. A first node U01B is a terminal; and a second node N02B is a maintenance base station of a serving cell of the first node U01B; it is particularly underlined that the order illustrated in the embodiment does not put constraints over sequences of signal transmissions and implementations.

The first node U01B receives a second signaling in step S5101B; determines that a physical-layer problem occurs in a first serving cell in step S5102B; as a response to the phrase of determining that a physical-layer problem occurs in a first serving cell, starts a first timer in step S5103B; transmits a first signal in step S5104B; as a response to the first signal being triggered, starts a second timer in step S5105B; a first timer is expired in step S5106B; receives a second signal in step S5107B; as a response to receiving the second signal, stops a second timer in step S5108B; a second timer is expired in step S5109B; after a first event occurs and when the second timer is expired, determines that an RLF occurs in step S5110B; and as a response to the behavior of determining that an RLF occurs, transmits a first signaling in step S5111B.

The second node N02B transmits a second signaling in step S5201B, receives a first signal in step S5202B, transmits a second signal in step S5203B, and receives a first signaling in step S5204B.

In Embodiment 5B, when the second timer is running, a second signal is monitored, when the first timer is expired, a radio connection is maintained and the second timer continues timing; the first signal is used to trigger the second signal; and the second timer is related to a parameter of a maintenance base station of the first serving cell; the first signaling is used to request updating a radio connection, and the first event comprises that the second timer is running and the first timer is expired; the second signaling is used to indicate a first parameter set of the second timer; the first parameter set comprises a first expiration value and a first offset, and a sum of the first expiration value and the first offset is used to determine an end time of the second timer.

In one embodiment, a transmitter of the second signaling comprises a maintenance base station of the first serving cell.

In one embodiment, the second signaling is transmitted via an air interface.

In one embodiment, the second signaling is transmitted via a radio interface.

In one embodiment, the second signaling is transmitted via a high-layer signaling.

In one embodiment, the second signaling comprises a higher-layer signaling.

In one embodiment, the second signaling comprises all or part of a high-layer signaling.

In one embodiment, the second signaling comprises an RRC message.

In one embodiment, the second signaling comprises all of IEs in an RRC message.

In one embodiment, the second signaling comprises part of IEs in an RRC message.

In one embodiment, the second signaling comprises all of fields in an IE in an RRC message.

In one embodiment, the second signaling comprises part of fields in an IE in an RRC message.

In one embodiment, the first signaling comprises a DL signaling.

In one embodiment, an SRB of the second signaling includes an SRB1.

In one embodiment, an SRB of the second signaling includes an SRB3.

In one embodiment, an SRB of the second signaling comprises a Sidelink SRB.

In one embodiment, a logical channel bearing the second signaling includes a DCCH.

In one embodiment, a logical channel bearing the second signaling comprises an SCCH.

In one embodiment, a logical channel bearing the second signaling comprises a BCCH.

In one embodiment, a logical channel bearing the second signaling comprises a BR-BCCH.

In one embodiment, the second signaling is used for an RRC connection reconfiguration.

In one embodiment, the second signaling is used for an RRC connection release.

In one embodiment, the second signaling is used for an RRC connection recovery.

In one embodiment, the second signaling is used for an RRC Connection Reconfiguration.

In one embodiment, the second signaling is used for an RRC connection establishment.

In one embodiment, the second signaling is used for broadcast system information.

In one embodiment, the second signaling is used for configuring the second timer.

In one embodiment, the second signaling is used for configuring the first timer.

In one embodiment, the second signaling comprises an RRCResume message.

In one embodiment, the second signaling comprises an RRCConnectionResume message.

In one embodiment, the second signaling comprises an RRCReconfiguration message.

In one embodiment, the second signaling comprises an RRCConnectionReconfiguration message.

In one embodiment, the second signaling comprises an RRCSetup message.

In one embodiment, the second signaling comprises an RRCConnectionSetup message.

In one embodiment, the second signaling comprises an SIB1.

In one embodiment, the second signaling comprises an RNReconfiguration message.

In one embodiment, the second signaling comprises a SystemInformation message.

In one embodiment, the second signaling comprises a SystemInformationBlockType1 message.

In one embodiment, the second signaling comprises a SystemInformationBlockType2.

In one embodiment, the second signaling comprises an RadioResourceConfigDedicated IE.

In one embodiment, the second signaling comprises an SL-CommResourcePool IE.

In one embodiment, the second signaling comprises a RACH-ConfigCommon IE.

In one embodiment, the second signaling comprises an RLF-TimersAndConstants IE.

In one embodiment, the second signaling comprises a UE-TimersAndConstants IE.

In one embodiment, the second signaling comprises a MeasObjectNR IE.

In one embodiment, the second signaling comprises a MeasObjectEUTRA IE.

In one embodiment, the second signaling comprises a MeasObjectToAddModList IE.

In one embodiment, the second signaling comprises a MeasConfig IE.

In one embodiment, the second signaling comprises a MeasScaleFactor IE.

In one embodiment, the second signaling comprises a MeasIdleConfig IE.

In one embodiment, the phrase that the second signaling is used to indicate a first parameter set of the second timer includes: the second signaling comprises the first parameter set of the second timer.

In one embodiment, the phrase that the second signaling is used to indicate a first parameter set of the second timer includes: the first parameter set is one or more IEs in the second signaling.

In one embodiment, the phrase that the second signaling is used to indicate a first parameter set of the second timer includes: the first parameter set is one or more fields in the second signaling.

In one embodiment, the phrase that the first parameter set comprises a first expiration value and a first offset includes: the first expiration value and the first offset are two parameters in the first parameter set.

In one embodiment, the phrase that the first parameter set comprises a first expiration value and a first offset includes: the first expiration value and the first offset are two fields in the first parameter set.

In one embodiment, the phrase that the first parameter set comprises a first expiration value and a first offset includes: the first parameter set is used to indicate the first expiration value and the first offset.

In one embodiment, the phrase that the first parameter set comprises a first expiration value and a first offset includes: the first parameter set is used to determine the first expiration value and the first offset.

In one embodiment, the end time of the second timer comprises an expiration time of the second timer.

In one embodiment, the first expiration value comprises a maximum running time of the second timer.

In one embodiment, the first expiration value comprises a failure time of the second timer.

In one embodiment, the first expiration value comprises a maximum time that the second timer is allowed to run.

In one embodiment, when a running time of the second timer reaches the first expiration value, the second timer is expired.

In one embodiment, the first expiration value comprises K1 slot(s).

In one subembodiment of the above embodiment, the slot comprises a slot.

In one subembodiment of the above embodiment, the slot comprises a symbol.

In one subembodiment of the above embodiment, the slot comprises a subframe.

In one subembodiment of the above embodiment, the slot comprises a radio frame.

In one subembodiment of the above embodiment, a unit for measurement of the slot comprises ms.

In one subembodiment of the above embodiment, the slot comprises a predefined time length.

In one subembodiment of the above embodiment, a unit for measurement of the slot comprises m.

In one embodiment, the first offset comprises K2 slot(s).

In one embodiment, a (K1+K2)-th slot is used to determine an expiration time of the second timer after the first signal is triggered.

In one embodiment, when the first signal is triggered, the second timer is not started immediately, after a first offset is delayed, the second timer is started again, and a maximum running time of the second timer comprises the first expiration time.

In one embodiment, when the first signal is triggered, the second timer is started immediately, and a maximum running time of the second timer comprises a sum of the first offset and the first expiration value.

In one embodiment, a first offset is used to determine a time length that a second timer is prolonged to run.

In one embodiment, a first offset is used to determine a time length that a second timer is delayed to be started.

In one embodiment, the first offset is used to delay a start time and an expiration time of the second timer.

In one embodiment, the first offset is used to prolong a running time of the second timer.

In one embodiment, the first offset is related to a parameter of a maintenance base station of the first serving cell.

In one embodiment, the first offset is related to a type of the first signal.

In one embodiment, the first offset is related to retransmission times of the first signal.

In one embodiment, the first offset comprises a time length that the first timer is prolonged to run.

In one embodiment, a maximum value that the second timer is allowed to run comprises the first expiration value.

In one embodiment, a maximum value that the second timer is allowed to run comprises a sum of the first expiration value and the first offset.

In one embodiment, the phrase that the first timer is expired includes: a timing of the first timer reaches a maximum value.

In one embodiment, the phrase that the first timer is expired includes: the first timer is expired.

In one embodiment, the phrase that the first timer is expired includes: the first timer is no longer valid.

In one embodiment, the second signal is received.

In one embodiment, the second signal is not received.

In one embodiment, the phrase of "as a response to receiving the second signal, stopping the second timer" includes when the second signal is received, stopping the second timer.

In one embodiment, the phrase of "as a response to receiving the second signal, stopping the second timer" includes receiving the second signal is used to determine to stop the second timer.

In one embodiment, the phrase of "as a response to receiving the second signal, stopping the second timer" includes receiving the second signal is used to trigger stopping the second timer.

In one embodiment, the phrase of "as a response to receiving the second signal, stopping the second timer" includes receiving the second signal is a condition for stopping the second timer.

In one embodiment, the phrase of "as a response to receiving the second signal, stopping the second timer" includes when the second signal is received for a certain time interval, stopping the second timer.

In one embodiment, the phrase of "as a response to receiving the second signal, stopping the second timer" includes the condition for stopping the second timer includes that the second signal is received.

In one embodiment, the second signal being received includes completing an RA of a target cell.

In one embodiment, the second signal being received includes receiving the second signal.

In one embodiment, when the first node U01B completes an RA of a target serving cell, stopping the second timer.

In one embodiment, the phrase of "after a first event occurs and when the second timer is expired, determining that an RLF occurs" includes an occurrence of the first event and an expiration of the second timer are used together to determine an occurrence of the radio connection failure.

In one embodiment, the phrase of "after a first event occurs and when the second timer is expired, determining that an RLF occurs" includes an occurrence of the first event and an expiration of the second timer are used together to trigger the radio connection failure.

In one embodiment, the phrase of "after a first event occurs and when the second timer is expired, determining that an RLF occurs" includes when a first event occurs and a second timer is expired, determining that the radio connection failure occurs.

In one embodiment, the phrase that after a first event occurs includes: the first event has occurred.

In one embodiment, the phrase that after a first event occurs includes: the first event is occurring.

In one embodiment, an occurrence of the first event is used to determine an occurrence of the radio connection failure.

In one embodiment, an expiration of the second timer is used to determine an occurrence of radio connection failure.

In one embodiment, the first event occurs when the second timer is running.

In one embodiment, the first event includes that when the first timer is expired, the second timer is running.

In one embodiment, the first event includes that when the second timer is running, the first timer is expired.

In one embodiment, the first event occurs before the second timer is expired.

In one embodiment, the first event includes that the second timer is running.

In one embodiment, the first event includes that the first timer is expired.

In one embodiment, the phrase that "the first event includes that the second timer is running and the first timer is expired" includes: the second timer being running and the first timer being expired are used together to determine the first event.

In one embodiment, the phrase that "the first event includes that the second timer is running and the first timer is expired" includes: the first event includes that when the second timer is running, the first timer is expired.

In one embodiment, when the first event occurs, a first indicator is generated, and when the second timer is expired and the first indicator exits, an occurrence of a radio connection failure is determined.

In one embodiment, the phrase that the second timer is expired includes a timing of the second timer reaching a maximum value.

In one embodiment, the phrase that the second timer is expired includes the second timer being expired.

In one embodiment, the phrase that the second timer is expired includes the second timer is no longer valid.

In one embodiment, the radio connection failure comprises an RLF.

In one embodiment, the radio connection failure comprises an HOF.

In one embodiment, the radio connection failure comprises an MCG link failure.

In one embodiment, the radio connection failure comprises an SCG link failure.

In one embodiment, the radio connection failure comprises a Sidelink failure.

In one embodiment, when the second timer is expired and the first event does not occur, a current radio connection is kept.

In one embodiment, when the second timer is expired and the first event does not occur, updating a radio connection is not requested.

In one embodiment, when the second timer is expired and the first event does not occur, whether a CHO condition being satisfied is judged.

In one embodiment, when the second timer is expired and the first event does not occur, whether a CPC condition being satisfied is judged.

In one embodiment, when the second timer is expired and the first event does not occur, an RRM measurement is executed.

In one embodiment, when the second timer is expired and the first sign does not exist, and if a candidate cell satisfying a CHO exists, a CHO is executed.

In one embodiment, the phrase of "as a response to the behavior of determining that a radio connection failure occurs, transmitting a first signaling" includes when the radio connection failure occurs, transmitting the first signaling.

In one embodiment, the phrase of "as a response to the behavior of determining that a radio connection failure occurs, transmitting a first signaling" includes as a subsequent behavior of determining that the radio connection failure occurs, transmitting the first signaling.

In one embodiment, the phrase of "as a response to the behavior of determining that a radio connection failure occurs, transmitting a first signaling" includes as a next step of determining that the radio connection failure occurs, transmitting the first signaling.

In one embodiment, the phrase of "as a response to the behavior of determining that a radio connection failure occurs, transmitting a first signaling" includes that the behavior of determining an occurrence of a radio connection failure triggers transmitting the first signaling.

In one embodiment, the phrase that the first signaling is used to request updating a radio connection includes the first signaling is used to request changing a radio connection state.

In one embodiment, the phrase that the first signaling is used to request updating a radio connection includes the first signaling is used to request an RRC connection reconfiguration.

In one embodiment, the phrase that the first signaling is used to request updating a radio connection includes the first signaling is used to request an RRC connection release.

In one embodiment, the phrase that the first signaling is used to request updating a radio connection includes the first signaling is used to request an RRC connection reestablishment.

In one embodiment, the phrase that the first signaling is used to request updating a radio connection includes the first signaling is used to request a configuration for handover.

In one embodiment, the phrase that the first signaling is used to request updating a radio connection includes the first signaling is used to request a configuration for UL and DL resources.

In one embodiment, the phrase that the first signaling is used to request updating a radio connection includes the first signaling is used to request a configuration for an RA.

In one embodiment, the phrase that the first signaling is used to request updating a radio connection includes the first signaling is used to request a configuration for handover.

In one embodiment, a receiver of the first signaling comprises a maintenance base station of the first serving cell.

In one embodiment, a receiver of the first signaling comprises a maintenance base station of the second serving cell.

In one subembodiment of the above embodiment, the second serving cell comprises the first serving cell.

In one subembodiment of the above embodiment, the second serving cell comprises a target cell.

In one subembodiment of the above embodiment, the second serving cell comprises a CHO candidate cell.

In one subembodiment of the above embodiment, the second serving cell comprises a target cell.

In one subembodiment of the above embodiment, the second serving cell comprises a cell determined through cell selection.

In one subembodiment of the above embodiment, the second serving cell comprises a maintenance base station of an MCG.

In one subembodiment of the above embodiment, the second serving cell comprises a maintenance base station of an SCG.

In one embodiment, the first signaling is transmitted via an air interface.

In one embodiment, the first signaling is transmitted via a radio interface.

In one embodiment, the first signaling is transmitted via a high-layer signaling.

In one embodiment, the first signaling comprises a higher-layer signaling.

In one embodiment, the first signaling comprises all or part of a higher-layer signaling.

In one embodiment, the first signaling comprises an RRC message.

In one embodiment, the first signaling comprises all of IEs in an RRC message.

In one embodiment, the first signaling comprises part of IEs in an RRC message.

In one embodiment, the first signaling comprises all of fields in an IE in an RRC message.

In one embodiment, the first signaling comprises part of fields in an IE in an RRC message.

In one embodiment, the second signaling comprises a UL signaling.

In one embodiment, an SRB of the first signaling comprises an SRB0.

In one embodiment, an SRB of the first signaling comprises an SRB1.

In one embodiment, an SRB of the first signaling comprises an SRB3.

In one embodiment, an SRB of the first signaling comprises a Sidelink SRB.

In one embodiment, a logical channel bearing the first signaling includes a DCCH.

In one embodiment, a logical channel bearing the first signaling comprises an SCCH.

In one embodiment, the first signaling is used to request an RRC connection recovery.

In one embodiment, the first signaling is used to request an RRC connection reconfiguration.

In one embodiment, the first signaling is used to request an RRC connection reestablishment.

In one embodiment, the first signaling comprises a RRCReestablishmentRequest.

In one embodiment, the first signaling comprises a RRC-ConnectionReestablishmentRequest.

In one embodiment, the first signaling comprises MCGFailureInformation.

In one embodiment, the first signaling comprises SCGFailureInformation.

In one embodiment, the first signaling comprises SidelinkUEInformationNR.

In one embodiment, the first signaling comprises SidelinkUEInformationEUTRA.

In one embodiment, the first signaling comprises a UEAssistanceInformation.

In one embodiment, the first signaling comprises a UEAssistanceInformationEUTRA.

In one embodiment, the first signaling comprises ULInformationTransferMRDC.

In one embodiment, stopping the second timer includes that the second timer does not continue timing.

In one embodiment, stopping the second timer includes that a remaining time of the second timer is invalid.

In one embodiment, stopping the second timer includes that the second timer does not continue running.

In one embodiment, step S5102B is taken before step S5104B.

In one embodiment, step S5102B is taken after step S5104B.

In one embodiment, step S5102B and step S5104B occur simultaneously.

In one embodiment, step S5103B is taken before step S5104B.

In one embodiment, step S5103B is taken after step S5104B.

In one embodiment, step S5103B and step S5104B occur simultaneously.

In one embodiment, step S5102B is taken before step S5105B.

In one embodiment, step S5102B is taken after step S5105B.

In one embodiment, step S5102B and step S5105B occur simultaneously.

In one embodiment, step S5103B is taken before step S5105B.

In one embodiment, step S5103B is taken after step S5105B.

In one embodiment, step S5103B and step S5105B occur simultaneously.

In one embodiment, the box F1B framed with dotted lines is optional.

In one embodiment, the box F2B framed with dotted lines is optional.

In one embodiment, the box F3B framed with dotted lines is optional.

In one embodiment, the box F4B framed with dotted lines is optional.

In one embodiment, the box F5B framed with dotted lines is optional.

In one embodiment, the box F6B framed with dotted lines is optional.

In one embodiment, the box F1B framed with dotted lines exists.

In one embodiment, the box F1B framed with dotted lines does not exist.

In one embodiment, the box F2B framed with dotted lines exists.

In one embodiment, the box F2B framed with dotted lines does not exist.

In one embodiment, the box F3B framed with dotted lines exists.

In one embodiment, the box F3B framed with dotted lines does not exist.

In one embodiment, the box F4B framed with dotted lines exists.

In one embodiment, the box F4B framed with dotted lines does not exist.

In one embodiment, the box F5B framed with dotted lines exists.

In one embodiment, the box F5B framed with dotted lines does not exist.

In one embodiment, the box F6B framed with dotted lines exists.

In one embodiment, the box F6B framed with dotted lines does not exist.

In one embodiment, one of the box F4B framed with dotted lines or the box F5B framed with dotted lines exists.

In one embodiment, when the box F5B framed with dotted lines does not exist, the box F6B framed with dotted lines does not exist.

In one embodiment, when the box F5B framed with dotted lines exists, the box F6B framed with dotted lines exists.

In one embodiment, when the box F5B framed with dotted lines exists, the box F6B framed with dotted lines does not exist.

In one embodiment, the box F1B framed with dotted lines does not exist, the box F2B framed with dotted lines does not exist, the box F3B framed with dotted lines does not exist, the box F4B framed with dotted lines does not exist, the box F5B framed with dotted lines exists, and the box F6B framed with dotted lines exists.

In one embodiment, the box F1B framed with dotted lines does not exist, the box F2B framed with dotted lines does not exist, the box F3B framed with dotted lines does not exist, the box F4B framed with dotted lines does not exist, the box F5B framed with dotted lines exists, and the box F6B framed with dotted lines does not exist.

In one embodiment, the box F1B framed with dotted lines does not exist, the box F2B framed with dotted lines exists, the box F3B framed with dotted lines does not exist, the box F4B framed with dotted lines does not exist, the box F5B framed with dotted lines exists, and the box F6B framed with dotted lines exists.

In one embodiment, the box F1B framed with dotted lines does not exist, the box F2B framed with dotted lines exists, the box F3B framed with dotted lines does not exist, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines does not exist, the box F3B framed with dotted lines does not exist, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines does not exist, the box F3B framed with dotted lines does not exist, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines does not exist, the box F3B framed with dotted lines exists, the box F4B framed with dotted lines does not exist, the box F5B framed with dotted lines exists, and the box F6B framed with dotted lines exists.

In one embodiment, the box F1B framed with dotted lines exists, the box F2B framed with dotted lines does not exist, the box F3B framed with dotted lines exists, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines does not exist, the box F3B framed with dotted lines exists, the box F4B framed with dotted lines exists, the box F5B framed with dotted lines does not exist, and the box F6B framed with dotted lines does not exist.

In one embodiment, the box F1B framed with dotted lines exists, the box F2B framed with dotted lines exists, the box F3B framed with dotted lines does not exist, the box F4B framed with dotted lines does not exist, the box F5B framed with dotted lines exists, and the box F6B framed with dotted lines exists.

In one embodiment, the box F1B framed with dotted lines exists, the box F2B framed with dotted lines exists, the box F3B framed with dotted lines does not exist, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines exists, the box F3B framed with dotted lines exists, the box F4B framed with dotted lines does not exist, the box F5B framed with dotted lines exists, and the box F6B framed with dotted lines exists.

In one embodiment, the box F1B framed with dotted lines exists, the box F2B framed with dotted lines exists, the box F3B framed with dotted lines exists, the box F4B framed with dotted lines does not exist, the box F5B framed with dotted lines exists, and the box F6B framed with dotted lines does not exist.

In one embodiment, the box F1B framed with dotted lines exists, the box F2B framed with dotted lines exists, the box F3B framed with dotted lines exists, the box F4B framed with dotted lines exists, the box F5B framed with dotted lines does not exist, and the box F6B framed with dotted lines does not exist.

In one embodiment, the step S5104B is taken before the step S5105B.

In one embodiment, the step S5104B is taken after the step S5105B.

Embodiment 5C

Embodiment 5C illustrates a flowchart of radio signal transmission according to one embodiment in the present disclosure, as shown in FIG. 5. A first node U01C is a terminal; and a second node N02C is a maintenance base station of a serving cell of the first node U01C; it is particularly underlined that the order illustrated in the embodiment does not put constraints over sequences of signal transmissions and implementations.

The first node U01C receives a first signaling in step S5101C, and transmits a first signal in step S5102C; in step S5103C, when a first condition set is satisfied, starts the first timer after waiting for a third time length; in step S5104C, when the first timer is started, resets a first counter; starts a second timer in step S5105C; the second timer is expired in step S5106C; in step S5107C, when the second timer is expired, updates the first counter; in step S5108C, when the first timer is running, judges whether the first counter reaches a first value; in step S5109C, when the first counter reaches the first value, determines that a radio link failure occurs in a first serving cell; stops the first timer in step S5110C; when the first counter does not reach the first value, does not trigger an RLF; receives a second signal in step S5111C; in step S5112C, when the second signal is received, stops the first timer; and the first timer is expired in step S5113C.

The second node N02C transmits a first signaling in step S5201C; receives a first signal in step S5202C; and transmits a second signal in step S5203C.

In Embodiment 5C, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; the first timer is related to a parameter of a maintenance base station of the first serving cell; the first condition set comprises determining that a physical-layer problem occurs in the first serving cell, or the first condition set comprises that the first signal is transmitted; the first signal comprises a measurement report, and the second signal comprises a response for the first signal; when the physical-layer problem occurs in a first serving cell, the second timer is started; and when the physical-layer problem of the first serving cell is recovered, the second timer is stopped.

In one embodiment, a receiver of the first signal comprises a maintenance base station of the first serving cell.

In one embodiment, a receiver of the first signal comprises a maintenance base station of an SPCell.

In one embodiment, a receiver of the first signal is the same as a transmitter of the first signaling.

In one embodiment, a receiver of the first signal is different from a transmitter of the first signaling.

In one embodiment, the first signal is transmitted via an air interface.

In one embodiment, the first signal is transmitted via a radio interface.

In one embodiment, the first signal is transmitted via a wired interface.

In one embodiment, the first signal is transmitted via a high-layer signaling.

In one embodiment, the first signal is transmitted via a physical-layer signaling.

In one embodiment, the first signal is used for an RRC connection reestablishment request.

In one embodiment, the first signal is used for a measurement report reporting.

In one embodiment, the first signal is used to initiate an RRC connection recovery.

In one embodiment, the first signal is used to initiate an RA.

In one subembodiment, the RA comprises 2-step RA.

In one subembodiment, the RA comprises 4-step RA.

In one embodiment, the first signal is used to request UL resources.

In one embodiment, the first signal comprises a higher-layer signaling.

In one embodiment, the first signal comprises all or part of a higher-layer signaling.

In one embodiment, the first signal comprises a radio signal.

In one embodiment, the first signal comprises a baseband signal.

In one embodiment, the first signal comprises a reference signal.

In one embodiment, the first signal comprises a PHY signal.

In one embodiment, the first signal comprises an RRC message.

In one embodiment, the first signal comprises all of IEs in an RRC message.

In one embodiment, the first signal comprises part of IEs in an RRC message.

In one embodiment, the first signal comprises all of fields in an IE in an RRC message.

In one embodiment, the first signal comprises part of fields in an IE in an RRC message.

In one embodiment, the first signal comprises a DL signaling.

In one embodiment, the second signal is transmitted through a Physical Uplink Control Channel (PUCCH).

In one embodiment, the second signal comprises Uplink Control Information (UCI).

In one embodiment, an SRB of the first signal comprises an SRB1.

In one embodiment, an SRB of the first signal comprises an SRB3.

In one embodiment, an SRB of the first signal comprises a Sidelink SRB.

In one embodiment, a logical channel bearing the first signal includes a DCCH.

In one embodiment, a logical channel bearing the first signal comprises an SCCH.

In one embodiment, a logical channel bearing the first signal comprises a BCCH.

In one embodiment, a logical channel bearing the first signal comprises a BR-BCCH.

In one embodiment, the first signal comprises a MeasurementReport message.

In one embodiment, the first signal comprises a MCGFailureInformation message.

In one embodiment, the first signal comprises a ULInformationTransferMRDC message.

In one embodiment, the first signal comprises a MeasurementReport message.

In one embodiment, the first signal comprises a MCGFailureInformation message.

In one embodiment, the first signal comprises a ULInformationTransferMRDC message.

In one embodiment, the first signal comprises an RRCConnectionSetupRequest message.

In one embodiment, the first signal comprises an RRCConnectionReestabilshmentRequest message.

In one embodiment, the first signal comprises an RRCConnectionResumeRequest message.

In one embodiment, the first signal comprises an RRCConnectionResumeRequest1 message.

In one embodiment, the first signal comprises an RRCSetupRequest message.

In one embodiment, the first signal comprises an RRCReestabilshmentRequest message.

In one embodiment, the first signal comprises an RRCResumeRequest message.

In one embodiment, the first signal comprises an RRCResumeRequest1 message.

In one embodiment, the second radio signal carries a Preamble.

In one embodiment, the first signal comprises a payload.

In one embodiment, the first signal comprises a Msg1.

In one embodiment, the first signal comprises a Msg3.

In one embodiment, the first signal comprises a MsgA.

In one embodiment, the first signal comprises a Scheduling Request (SR).

In one embodiment, the first signal comprises a Buffer Status Report (BSR).

In one embodiment, the phrase that the first signal comprises a measurement report includes: the first signal is used to carry the measurement report.

In one embodiment, the phrase that the first signal comprises a measurement report includes: the first signal is the measurement report.

In one embodiment, the phrase that the first signal comprises a measurement report includes: the measurement report is all of the first signal.

In one embodiment, the phrase that the first signal comprises a measurement report includes: the measurement report is part of the first signal.

In one embodiment, the measurement report comprises an intra-frequency measurement result.

In one embodiment, the measurement report comprises an inter-frequency measurement result.

In one embodiment, the measurement report comprises an intra-system measurement result.

In one embodiment, the measurement report comprises an inter-system measurement result.

In one embodiment, the measurement report comprises a measurement result of LIE.

In one embodiment, the measurement report comprises a measurement result of NR.

In one embodiment, the measurement report comprises a measurement result of Bluetooth (BT).

In one embodiment, the measurement report comprises a measurement result of a Wireless Local Area Network (WLAN).

In one embodiment, the measurement report comprises a measurement result of TN.

In one embodiment, the measurement report comprises a measurement result of NTN.

In one embodiment, the measurement report comprises Reference Signal Received Power (RSRP).

In one embodiment, the measurement report comprises Reference Signal Received Quality (RSRQ).

In one embodiment, the measurement report comprises a Received Signal Strength Indicator (RSSI).

In one embodiment, the measurement result comprises a Signal to Noise and Interference Ratio (SINR).

In one embodiment, the measurement result comprises a Channel Status Information reference signal resource indicator (CRI).

In one embodiment, the measurement result comprises a time.

In one embodiment, the measurement result comprises a height.

In one embodiment, the measurement result comprises an altitude.

In one embodiment, the measurement result comprises a PLMN.

In one embodiment, the phrase of as a response to the first signal being transmitted includes when the first signal is transmitted.

In one embodiment, the phrase of as a response to the first signal being transmitted includes as a next step that the first signal is transmitted.

In one embodiment, the phrase of starting the first timer after waiting for a third time length includes delaying the third time length, and starting the first timer.

In one embodiment, the phrase of starting the first timer after waiting for a third time length includes: the first timer is delayed to be started, and a delayed time length is equal to the third timer length.

In one embodiment, a receiver of the second signal comprises a maintenance base station of the first serving cell.

In one embodiment, a receiver of the second signal comprises a maintenance base station of an SPCell.

In one embodiment, the second signal is transmitted via an air interface.

In one embodiment, the second signal is transmitted via a radio interface.

In one embodiment, the second signal is transmitted via a wired interface.

In one embodiment, the second signal is transmitted via a high-layer signaling.

In one embodiment, the second signal is transmitted via a physical-layer signaling.

In one embodiment, the second signal is used for an RRC connection reestablishment.

In one embodiment, the second signal is used for an RRC Connection Reconfiguration.

In one embodiment, the second signal is used for an RRC connection release.

In one embodiment, the second signal is used for an RRC connection establishment.

In one embodiment, the second signal is used for an RA.

In one embodiment, the second signal comprises a higher-layer signaling.

In one embodiment, the second signal comprises all or part of a high-layer signaling.

In one embodiment, the second signal comprises an RRC message.

In one embodiment, the second signal comprises all of IEs in an RRC message.

In one embodiment, the second signal comprises part of IEs in an RRC message.

In one embodiment, the second signal comprises all of fields in an IE in an RRC message.

In one embodiment, the second signal comprises part of fields in an IE in an RRC message.

In one embodiment, the second signal comprises all or part of a MAC Control Element (CE).

In one embodiment, the second signal comprises all or part of an MAC Random Access Response (RAR).

In one embodiment, the second signal comprises a DL signaling.

In one embodiment, the second signal is transmitted through a PDCCH.

In one embodiment, the second signal comprises Downlink Control Information (DCI).

In one embodiment, the second signal comprises a Hybrid automatic request retransmission (HARQ) acknowledgment (ACK)/Negative Acknowledgment (NACK).

In one embodiment, an SRB of the second signal comprises an SRB0.

In one embodiment, an SRB of the second signal includes an SRB1.

In one embodiment, an SRB of the second signal includes an SRB2.

In one embodiment, an SRB of the second signal includes an SRB3.

In one embodiment, an SRB of the second signal comprises a Sidelink SRB.

In one embodiment, a logical channel bearing the second signal includes a DCCH.

In one embodiment, a logical channel bearing the second signal comprises an SCCH.

In one embodiment, a logical channel bearing the second signal comprises a BCCH.

In one embodiment, a logical channel bearing the second signal comprises a BR-BCCH.

In one embodiment, the second signal comprises an RRCReconfiguration message.

In one embodiment, the second signal comprises an RRCReconfiguration message carrying a reconfiguration-WithSync.

In one embodiment, the second signal comprises an RRCConnectionReconfiguration message.

In one embodiment, the second signal comprises an RRCRelease message.

In one embodiment, the second signal comprises a RRC-ConnectionRelease message.

In one embodiment, the second signal comprises a DLInformationTransferMRDC message.

In one embodiment, the first signal comprises an RRC-ConnectionSetup message.

In one embodiment, the first signal comprises a RRCConnectionReestablishment message.

In one embodiment, the first signal comprises an RRC-ConnectionResume message.

In one embodiment, the first signal comprises an RRC-ConnectionResume1 message.

In one embodiment, the first signal comprises an RRC-Setup message.

In one embodiment, the first signal comprises an RRCReestablishment message.

In one embodiment, the first signal comprises an RRCResume message.

In one embodiment, the first signal comprises an RRCResume1 message.

In one embodiment, the second signal comprises a Msg 2.

In one embodiment, the second signal comprises a Msg 4.

In one embodiment, the second signal comprises a Msg B.

In one embodiment, the second signal is received.

In one embodiment, the second signal is not received.

In one embodiment, the phrase that the second signal comprises a response for the first signal includes: the second signal is used for acknowledging for the first signal.

In one embodiment, the phrase that the second signal comprises a response for the first signal includes after the first signal is transmitted, waiting for receiving the second signal.

In one embodiment, the phrase that the second signal comprises a response for the first signal includes the first signal is used to trigger the second signal.

In one embodiment, the phrase that as a response to the second signal being received includes when the second signal is received.

In one embodiment, the phrase that as a response to the second signal being received includes as a next step that the second signal is received.

In one embodiment, the phrase of stopping the first timer includes the first timer stops timing.

In one embodiment, the phrase of stopping the first timer includes the first timer being suspended.

In one embodiment, the phrase of stopping the first timer includes: the first timer does not continue timing.

In one embodiment, the phrase of "when a first condition set is satisfied, starting the first timer after waiting for a third time length" includes as a response to the first condition being satisfied, starting the first timer after waiting for the third time length.

In one embodiment, the phrase of "when a first condition set is satisfied, starting the first timer after waiting for a third time length" includes the first condition set being satisfied is used to determine to start the first timer after waiting for the third time length.

In one embodiment, the third time length comprises a time offset.

In one embodiment, the third time length is equal to 0, and when the first condition set is satisfied, the first timer is started immediately.

In one embodiment, the third time length is greater 0, and when the first condition set is satisfied, the first timer is started after delaying the third time length.

In one embodiment, the first condition set is used to determine to start the first timer.

In one embodiment, the first condition set is a condition for the first timer being started.

In one embodiment, the first condition set being satisfied is used to trigger starting the first timer.

In one embodiment, the first condition set comprises determining that a physical-layer problem occurs in the first serving cell.

In one subembodiment of the above embodiment, when an occurrence of the physical-layer problem in the first serving cell is determined, the first timer is started after waiting for the third time length.

In one subembodiment of the above embodiment, the phrase of determining that a physical layer problem occurs in the first serving cell includes detecting that the physical-layer problem occurs in the first serving cell.

In one subembodiment of the above embodiment, the phrase of determining that a physical layer problem occurs in the first serving cell includes indicating that the physical-layer problem occurs in the first serving cell.

In one subembodiment of the above embodiment, the physical-layer problem occurring in the first serving cell is determined through an RLM.

In one subembodiment of the above embodiment, the physical-layer problem includes receiving N310 consecutive out-of-sync indications from a lower layer.

In one subembodiment of the above embodiment, the physical-layer problem includes receiving N313 consecutive out-of-sync indications from a lower layer.

In one subembodiment of the above embodiment, the physical-layer problem includes the physical-layer being out-of-sync.

In one subembodiment of the above embodiment, the physical-layer problem includes that the physical layer does not receive an HARQ feedback.

In one subembodiment of the above embodiment, the physical-layer problem includes an occurrence of a link failure in the physical layer.

In one subembodiment of the above embodiment, the physical-layer problem includes receiving P1 out-of-sync indication(s) from a lower layer, the P1 being a positive integer.

In one subsidiary embodiment of the above embodiment, P1 is a counter.

In one subsidiary embodiment of the subembodiment, P1 is different from N310 and N313.

In one subsidiary embodiment of the subembodiment, when a measurement result is less than a first threshold, an out-of-sync indication is transmitted to a higher layer, the counter P1 is increased by 1, and the first threshold is related to NTN.

In one embodiment, the first condition set comprises that the first signal is transmitted.

In one subembodiment of the above embodiment, when the first signal is transmitted, the first timer is started after waiting for the third time length.

In one subembodiment of the above embodiment, the first signal comprises an RRC signal.

In one subembodiment of the above embodiment, the first signal comprises a MAC layer signal.

In one subembodiment of the above embodiment, the first signal comprises a PHY signal.

In one embodiment, the phrase of "when the first timer is started, resetting a first counter" includes: the first timer being started is used to determine to reset the first counter.

In one embodiment, the phrase of "when the first timer is started, resetting a first counter" includes: the first timer being started is a condition for resetting the first counter.

In one embodiment, the phrase of resetting the first counter includes setting the first counter to 0.

In one embodiment, the phrase of resetting the first counter includes setting the first counter to an initial value.

In one embodiment, the phrase of resetting the first counter includes the first counter restarts counting.

In one embodiment, the phrase of "when a first counter does not reach a first value, not triggering an RLF" includes: when a first counter does not reach a first value, the first timer continues timing.

In one embodiment, the phrase of "when a first counter does not reach a first value, not triggering an RLF" includes: when the first counter does not reach a first value, the first counter continues counting.

In one embodiment, the phrase of "when a first counter does not reach a first value, not triggering an RLF" includes when a first counter does not reach a first value, continuing a current RRC connection.

In one embodiment, the phrase of "when a first counter does not reach a first value, not triggering an RLF" includes when a first counter does not reach a first value, not triggering an update of an RRC procedure.

In one embodiment, the phrase of "when the second signal is received, stopping a first timer" includes as a response to the second signal being received, stopping the first timer.

In one embodiment, the phrase of "when the second signal is received, stopping a first timer" includes the second signal being received is a condition for the first timer to be stopped.

In one embodiment, the phrase of "when a physical-layer problem occurs in a first serving cell, starting the second timer" includes: an occurrence of the physical-layer problem in the first serving cell is a condition for the second timer to be started.

In one embodiment, the phrase of "when a physical-layer problem occurs in a first serving cell, starting the second timer" includes: an occurrence of the physical-layer problem in the first serving cell is used to determine to start the second timer.

In one embodiment, the phrase of "when the physical-layer problem of the first serving cell is recovered, stopping the second timer" includes: the physical-layer problem of the first serving cell being recovered is a condition for the second timer to be stopped.

In one embodiment, the phrase of "when the physical-layer problem of the first serving cell is recovered, stopping the second timer" includes: the physical-layer problem of the first serving cell being recovered is used to determine to stop the second timer.

In one embodiment, the phrase of the physical-layer problem being recovered includes a counter N311 reaching a maximum value.

In one embodiment, the phrase of the physical-layer problem being recovered includes receiving N311 consecutive in-sync indications from a lower layer.

In one embodiment, the phrase of the physical-layer problem being recovered includes receiving N314 consecutive in-sync indications from a lower layer.

In one embodiment, the phrase of the physical-layer problem being recovered includes the physical recovers synchronization.

In one embodiment, the phrase of the physical-layer problem being recovered includes receiving P2 in-sync indication(s) from a lower layer, the P2 is a positive integer.

In one subsidiary embodiment of the above embodiment, P2 is a counter.

In one subsidiary embodiment of the subembodiment, P2 is different from N311 and N314.

In one subsidiary embodiment of the subembodiment, when a measurement result is greater than a second threshold, an in-sync indication is transmitted to a higher layer, the counter P1 is increased by 1, and the first threshold is related to NTN.

In one embodiment, the starting a second timer includes that the second timer starts timing.

In one embodiment, the starting a second timer includes starting the second timer.

In one embodiment, the starting a second timer includes that the second timer starts running.

In one embodiment, the stopping a second timer includes that the second timer stops timing.

In one embodiment, the stopping a second timer includes that the second timer does not continue timing.

In one embodiment, the stopping a second timer includes that the second timer is suspended.

In one embodiment, the second timer being expired is different from the second timer being stopped.

In one embodiment, the box F1C framed with dotted lines is optional.

In one embodiment, the box F2C framed with dotted lines is optional.

In one embodiment, the box F3C framed with dotted lines is optional.

In one embodiment, the box F1C framed with dotted lines exists.

In one embodiment, the box F1C framed with dotted lines does not exist.

In one embodiment, the box F2C framed with dotted lines exists.

In one embodiment, the box F2C framed with dotted lines does not exist.

In one embodiment, the box F3C framed with dotted lines exists.

In one embodiment, the box F3C framed with dotted lines does not exist.

Embodiment 6A

Figures 6A, 6B:
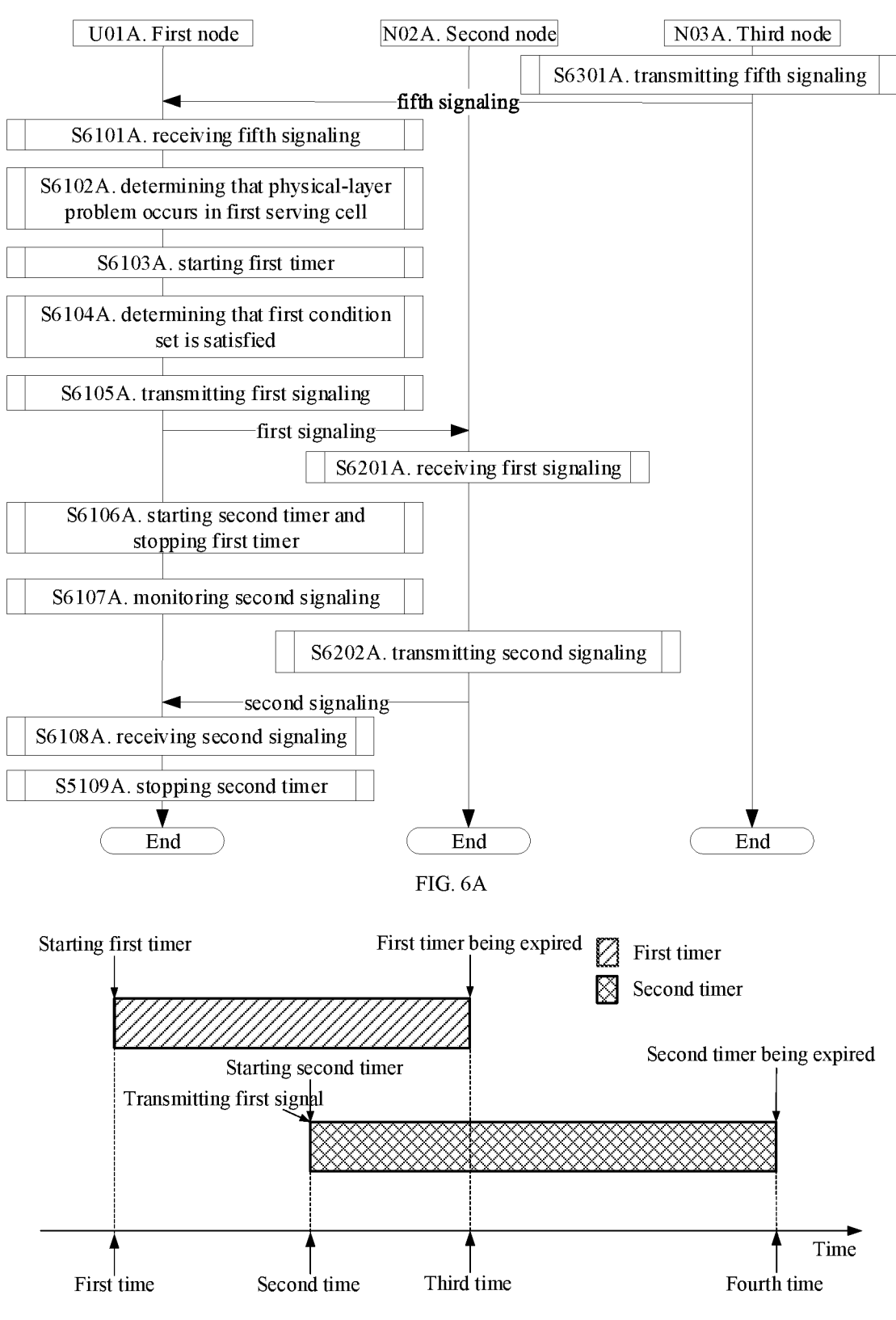
FIG. 6A illustrates a flowchart of radio signal transmission according to another embodiment of the present disclosure.
FIG. 6B illustrates a schematic diagram of a first timer being running when a second timer is started according to one embodiment of the present disclosure.

Embodiment 6A illustrates a flowchart of radio signal transmission according to another embodiment of the present disclosure, as shown in FIG. 6A. A first node U01A comprises a UE; a second node N02A comprises a base station; and a third node N03A comprises a base station; it is particularly underlined that the order illustrated in the embodiment does not put constraints over sequences of signal transmissions and implementations.

The first node U01A receives a fifth signaling in step S6101A; determines that a physical-layer problem occurs in a first serving cell in step S6102A; as a response to determining that the physical-layer problem occurs in the first serving cell, starts a first timer in step S6103A; determines that a first condition set is satisfied in step S6104A; as a response to the first condition set being satisfied, transmits a first signaling in step S6105A; as a response to the first condition set being satisfied, starts a second timer and stops the first timer in step S6106A; when the second timer is in a running state, monitors a second signaling in step S6107A; receives the second signaling in step S6108A; and as a response to the second signaling being received, stops the second timer in step S6109A.

The second node N02A receives the first signaling in step S6201A, and transmits the second signaling in step S6202A.

The third node N03A transmits the fifth signaling in step S6301A.

In Embodiment 6A, the fifth signaling is used to indicate an expiration value of the first timer and an expiration value of the second timer; the fifth signaling comprises a first field, and the first field is used to indicate a state of the second timer; the first condition set comprises that an RLF occurs in the first serving cell and the second timer is configured; the second timer is associated with the first serving cell; the first signaling is used to initiate a radio connection recovery; and the second signaling is used for updating a radio connection; the second signaling comprises an RRC connection release message.

In one embodiment, the phrase that the second signaling comprises an RRC connection release message includes: the second signaling is an RRC connection release message.

In one embodiment, the phrase that the second signaling comprises an RRC connection release message includes: the RRC connection release message is an IE in the second signaling.

In one embodiment, the phrase that the second signaling comprises an RRC connection release message includes: the RRC connection release message is a field in the second signaling.

In one embodiment, the second signaling is an RRCRelease message, and the RRC connection release message comprises an RRCRelease IE.

In one embodiment, the second signaling is an RRCConnectionRelease message, and the RRC connection release message comprises an RRCConnectionRelease IE.

In one embodiment, the second signaling is a DLInformationTransferMRDC message, and the RRC connection release message comprises an RRCConnectionRelease IE.

In one embodiment, the second signaling is a DLInformationTransferMRDC message, and the RRC connection release message comprises an RRCConnectionRelease IE.

In one embodiment, when the second signaling is received, and the second signaling is used for an RRC connection release, the second timer is stopped.

In one embodiment, when the second signaling is received, and the second signaling is used for an RRC connection release, the MCG failure information procedure is stopped.

Embodiment 6B

Embodiment 6B illustrates a schematic diagram of a first timer being running when a second timer is started according to one embodiment of the present disclosure. In FIG. 6B, a slash-filled solid-line-framed box represents a first timer; a diamond-filled solid-line-framed box represents a second timer; a first time, a second time, a third time and a fourth time are four times increasing progressively in time.

In embodiment 6B, a first node determines that a physical-layer problem occurs in a first serving cell; as a response to the phrase of determining that a physical-layer problem occurs in a first serving cell, starts a first serving cell; transmits a first signal; the first signal is transmitted when the first timer is running; as a response to the first signal being triggered, starts a second timer at a second time, when the second timer is running, monitors a second signal; a first timer is expired at a third time, when the first timer is expired, maintains a radio connection and the second timer continue timing; the second timer is expired at a fourth time; as a response to receiving the second signal, stops the second timer.

In one embodiment, the phrase that a second timer is started when a first timer is running includes: the first timer being running is a condition for the second timer to be started.

In one embodiment, the phrase that a second timer is started when a first timer is running includes when the first timer is running, and the first signal is triggered, starting the second timer.

In one embodiment, after a first event occurs and when the second timer is expired, an occurrence of a radio connection failure is determined; as a response to the behavior of determining that an RLF occurs, a first signaling is transmitted; herein, the first signaling is used to request updating a radio connection, and the first event comprises that the second timer is running and the first timer is expired.

In one embodiment, the phrase that the first signal is transmitted when the first timer is running includes: when the first timer is running, the first signal is transmitted.

In one embodiment, the phrase that the first signal is transmitted when the first timer is running includes: when the first timer is running, the first signal is triggered.

In one embodiment, the phrase that the first signal is transmitted when the first timer is running includes: when the first timer is running, the first signal is not transmitted.

In one embodiment, the phrase that the first signal is transmitted when the first timer is running includes: when the first timer is running, only the first signal being triggered can be used to trigger starting the second timer.

In one embodiment, the phrase that the first signal is transmitted when the first timer is running includes:

the first signal being transmitted when the first timer is running is a condition for the second timer to be started.

In one embodiment, the first signal is transmitted at the second time.

In one embodiment, when the first signal is triggered, the first timer is running.

In one embodiment, the first signal is transmitted when the first timer is running.

In one embodiment, the first signal being triggered when the first timer is running is used to trigger starting the second timer.

In one embodiment, a difference value between a third time and a first timer is equal to a maximum running time of the first timer.

In one embodiment, a difference value between a fourth time and a second timer is equal to a maximum running time of the second timer.

In one embodiment, the first timer is expired when the second timer is running.

In one embodiment, the first timer is not expired when the second timer is running.

In one embodiment, when the second timer is running, the first timer is started.

In one embodiment, when the second timer is running, the first timer is not started.

In one embodiment, the first timer stopping timing includes the first timer being expired.

In one embodiment, the first timer stopping timing includes stopping the first timer.

In one embodiment, the second timer stopping timing includes the second timer being expired.

In one embodiment, the second timer stopping timing includes stopping the second timer.

In one embodiment, the first timer comprises a timer T310.

In one embodiment, the first timer comprises a timer T312.

In one embodiment, the second timer comprises a timer T312.

In one embodiment, the second timer comprises a timer T316.

In one embodiment, the second timer comprises an NTN-specific timer.

In one embodiment, the second timer comprises a timer used to determine a radio connection failure.

In one embodiment, the first timer comprises a timer T310, and the second timer comprises a timer T312.

In one embodiment, the first timer comprises a timer T312, and the second timer comprises a timer T316.

Embodiment 6C

Figure 6C:
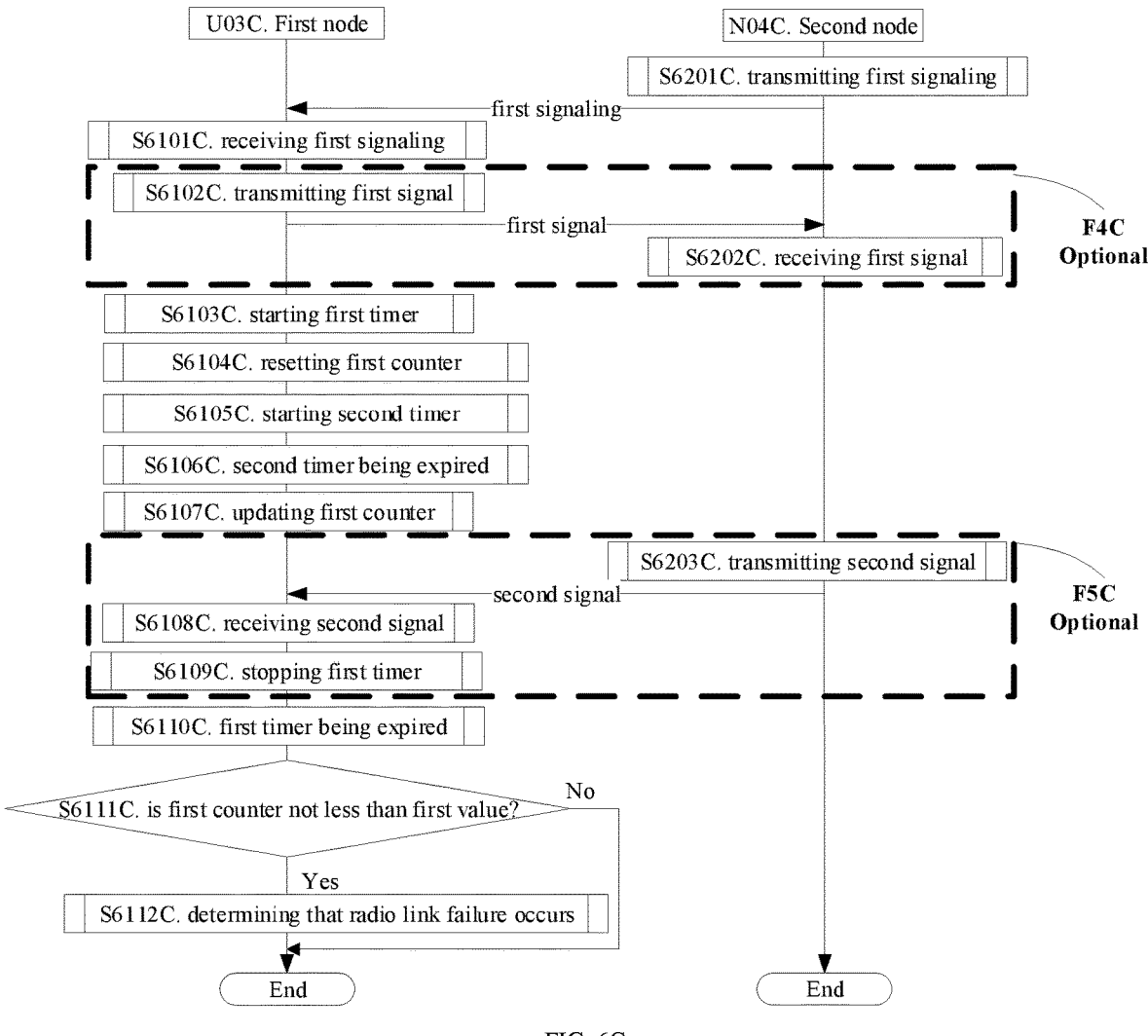
FIG. 6C illustrates a flowchart of radio signal transmission according to another embodiment of the present disclosure.

Embodiment 6C illustrates a flowchart of radio signal transmission according to another embodiment of the present disclosure, as shown in FIG. 6C. A first node U03C is a terminal; and a second node N04C is a maintenance base station of a serving cell of the first node U03C; it is particularly underlined that the order illustrated in the embodiment does not put constraints over sequences of signal transmissions and implementations.

The first node U03C receives a first signaling in step S6101C, transmits a first signal in step S6102C; in step S6103C, when a first condition set is satisfied, starts a first timer after waiting for a third time length; in step S6104C, when the first timer is started, resets a first counter; starts a second timer in step S6105C; the second timer is expired in step S6106C; in step S6107C, when the second timer is expired, updates the first counter; receives a second signal in step S6108C; stops the first timer in step S6109C; the first timer is expired in step S6110C; judges whether the first counter is not less than a first value in step S6111C; when the first counter is not less than the first value, determines that an RLF occurs in step S6112C; when the first counter is less than the first value, the RLF is not triggered.

The second node N04C transmits the first signaling in step S6201C; receives the first signal in step S6202C; and transmits the second signal in step S6203C;

In Embodiment 6C, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running, the first timer is related to a parameter of a maintenance base station of the first serving cell; the first condition set comprises determining that a physical-layer problem occurs in the first serving cell, or the first condition set comprises that the first signal is transmitted; the first signal comprises a measurement report, and the second signal comprises a response for the first signal; when the physical-layer problem occurs in a first serving cell, the second timer is started; and when the physical-layer problem of the first serving cell is recovered, the second timer is stopped; when a timekeeping of the first timer reaches the first time length, the first counter not being less than a first value is used to determine an occurrence of the RLF.

In one embodiment, the phrase of a timing of the first timer reaching the first time length includes the first timer being expired.

In one embodiment, the phrase of a timing of the first timer reaching the first time length includes a miming time of the first timer reaching a maximum value.

In one embodiment, the phrase of a timing of the first timer reaching the first time length includes a running time of the first timer is equal to a first time length.

In one embodiment, the phrase of the first counter being not less than a first value is used to determine an occurrence of the RLF includes when the first counter is equal to the first value, determining that the RLF occurs.

In one embodiment, the phrase of the first counter being not less than a first value is used to determine an occurrence of the RLF includes when the first counter is greater than the first value, determining that the RLF occurs.

In one embodiment, the phrase of the first counter being not less than a first value is used to determine an occurrence of the RLF includes when a number of times that the first timer is expired is greater than the first value, determining that the RLF occurs.

In one embodiment, the first counter reaching the first value when the first timer is running is used to determine an occurrence of the RLF.

In one embodiment, the first counter reaching the first value when the first timer is running is not used to determine an occurrence of the RLF; and when the first timer is expired, the RLF is declared to occur.

In one embodiment, the phrase of "when a timekeeping of the first timer reaches the first time length, the first counter not being less than a first value is used to determine an occurrence of the RLF" includes: when the first timer is running, an occurrence of the RLF is not determined through the first counter; when the first timer is expired, the first counter reaching the first value is used to determine the RLF.

In one embodiment, the first counter is greater than the first value.

In one embodiment, the first counter is less than the first value.

In one embodiment, the first counter is equal to the first value.

In one embodiment, the box F4 framed with dotted lines is optional.

In one embodiment, the box F5 framed with dotted lines is optional.

In one embodiment, the box F4 framed with dotted lines exists.

In one embodiment, the box F4 framed with dotted lines does not exist.

In one embodiment, the box F5 framed with dotted lines exists.

In one embodiment, the box F5 framed with dotted lines does not exist.

Embodiment 7A

Figures 7A, 7B:
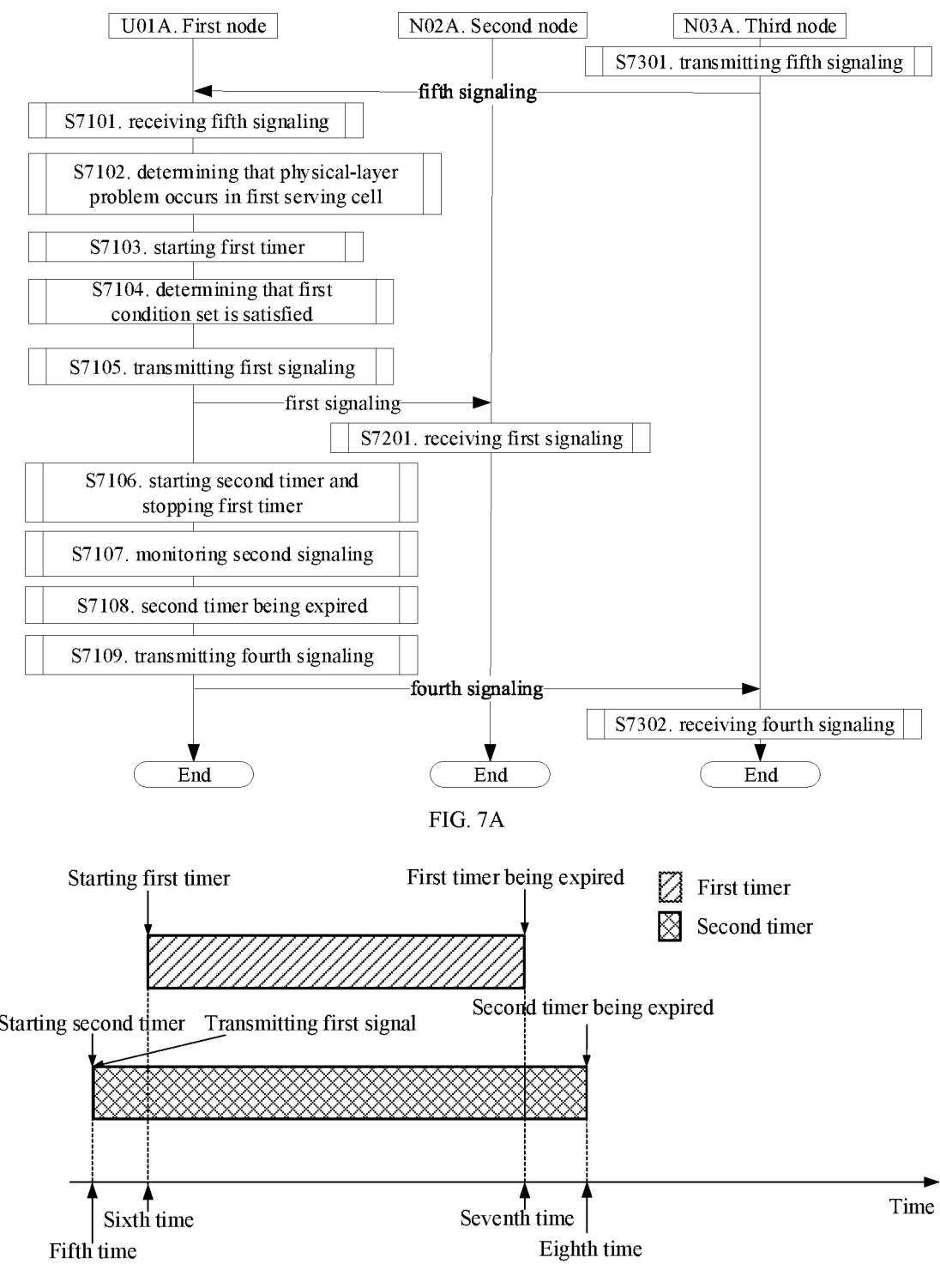
FIG. 7A illustrates a flowchart of radio signal transmission according to another embodiment of the present disclosure.
FIG. 7B illustrates a schematic diagram of a first timer not being running when a second timer is started according to one embodiment of the present disclosure.

Embodiment 7A illustrates a flowchart of radio signal transmission according to another embodiment in the present disclosure, as shown in FIG. 7A. A first node U01A comprises a UE; a second node N02A comprises a base station; and a third node N03A comprises a base station; it is particularly underlined that the order illustrated in the embodiment does not put constraints over sequences of signal transmissions and implementations.

The first node U01A receives a fifth signaling in step S7101; determines that a physical-layer problem occurs in a first serving cell in step S7102; as a response to determining that the physical-layer problem occurs in the first serving cell, starts a first timer in step S7103; determines that a first condition set is satisfied in step S7104; as a response to the first condition set being satisfied, transmits a first signaling in step S7105; as a response to the first condition set being satisfied, starts a second timer and stops the first timer in step S7106; when the second timer is in a running state, monitors a second signaling in step S7107; the second timer is expired in step S7108; and the fourth signaling is transmitted in step S7109.

The second node N02A receives the first signaling in step S7201.

The third node N03A transmits the fifth signaling in step S7301, and receives the fourth signaling in step S7302.

In Embodiment 7A, the fifth signaling is used to indicate an expiration value of the first timer and an expiration value of the second timer; the fifth signaling comprises a first field, and the first field is used to indicate a state of the second timer; the first condition set comprises that an RLF occurs in the first serving cell and the second timer is configured; the second timer is associated with the first serving cell; the first signaling is used to initiate a radio connection recovery; and the second signaling is used for updating a radio connection; the fourth signaling is used to request an RRC connection reestablishment.

In one embodiment, the second signaling is not received.

In one embodiment, the second signaling is received, and an RRC connection reconfiguration fails.

In one embodiment, the phrase of "when the second timer is expired, transmitting a fourth signaling" includes an expiration of the second timer being used to trigger a transmission of the fourth signaling.

In one embodiment, the phrase of "when the second timer is expired, transmitting a fourth signaling" includes when the second timer is expired, executing an RRC connection reestablishment procedure, and transmitting a fourth signaling.

In one embodiment, the phrase of "when the second timer is expired, transmitting a fourth signaling" includes an expiration of the second timer is one of multiple conditions for transmitting the fourth signaling.

In one embodiment, the phrase of "when the second timer is expired, transmitting a fourth signaling" includes an expiration of the second timer is one of multiple conditions for executing an RRC connection reestablishment procedure.

In one subembodiment of the above embodiment, the multiple conditions also comprises detecting an MCG RLF and a timer T316 is not configured.

In one subembodiment of the above embodiment, the multiple conditions also comprises an MCG synchronization reconfiguration failure.

In one subembodiment of the above embodiment, the multiple conditions also comprises a mobility failure from NR.

In one subembodiment of the above embodiment, the multiple conditions also comprises a time when receiving lower-layer integrity verification failure indication on SRB1 or SRB2, and a time when an integrity verification failure is not detected in an RRCReestablishment message.

In one subembodiment of the above embodiment, the multiple conditions also comprise an RRC connection reconfiguration failure.

In one subembodiment of the above embodiment, the multiple conditions also comprise detecting an SCG RLF when an MCG transmission is suspended.

In one subembodiment of the above embodiment, the multiple conditions also comprises that a synchronization reconfiguration failure occurs in an SCG when an MCG transmission is suspended.

In one subembodiment of the above embodiment, the multiple conditions also comprises that a modification failure occurs in an SCG when an MCG transmission is suspended.

In one subembodiment of the above embodiment, the multiple conditions also comprises that a configuration failure occurs in an SCG when an MCG transmission is suspended.

In one subembodiment of the above embodiment, the multiple conditions also comprises an occurrence of a lower-layer integrity check failure indication related to an SRB3 when an MCG transmission is suspended.

In one subembodiment of the above embodiment, the multiple conditions also comprises that a timer T316 is expired.

In one subembodiment of the above embodiment, the multiple conditions also comprises that an RLF occurs in an MCG when an SCG transmission is suspended.

In one subembodiment of the above embodiment, the multiple conditions also comprises that an HOF occurs in an MCG when an SCG transmission is suspended.

In one subembodiment of the above embodiment, the multiple conditions also comprises that an RLF occurs in an MCG when an RLF occurs in an SCG.

In one subembodiment of the above embodiment, the multiple conditions also comprises that an HOF occurs in an MCG when an RLF occurs in an SCG.

In one embodiment, the phrase that the second signaling is not detected includes: the second signaling is not received.

In one embodiment, the phrase that the second signaling is not detected includes: the second signaling is not received by the first node U01A.

In one embodiment, the phrase that the second signaling is not detected includes: the first signaling is not successfully transmitted, resulting in that the second signaling is not transmitted.

In one embodiment, the phrase that the second signaling is not detected includes: the first signaling is successfully transmitted, and the second signaling is not successfully received.

In one embodiment, the phrase that the second timer is expired includes a timing of the second timer reaching a maximum value.

In one embodiment, the phrase that the second timer is expired includes the second timer being expired.

In one embodiment, the phrase that the second timer is expired includes the second timer no longer being valid.

In one embodiment, when the second timer is expired, the second signaling is detected.

In one embodiment, when the second timer is expired, the second signaling is not detected.

In one embodiment, when the second timer is expired, the second signaling is detected, the second signaling comprises the RRC connection reconfiguration message, and the RRC connection reconfiguration fails.

In one subembodiment of the above embodiment, the RRC connection reconfiguration failure comprises a synchronization failure.

In one subembodiment of the above embodiment, the RRC connection reconfiguration failure comprises an RA failure of a target base station.

In one embodiment, the phrase that the fourth signaling is used to request an RRC connection reestablishment includes the fourth signaling being used to initiate an RRC connection reestablishment.

In one embodiment, the phrase that the fourth signaling is used to request an RRC connection reestablishment includes the fourth signaling comprises a first message in RRC connection reestablishment procedure.

In one embodiment, the phrase that the fourth signaling is used to request an RRC connection reestablishment includes the fourth signaling comprises an RRC connection reestablishment message.

In one embodiment, a receiver of the fourth signaling comprises a maintenance base station of the first target cell.

In one embodiment, a receiver of the fourth signaling comprises a cell determined through cell selection.

In one subembodiment of the above embodiment, the cell selection comprises a procedure of determining a cell through a measurement result.

In one subembodiment of the above embodiment, the cell selection comprises a procedure of determining a cell through system information.

In one subembodiment of the above embodiment, the cell selection comprises a cell reselection.

In one embodiment, a receiver of the fourth signaling comprises a CHO candidate cell.

In one embodiment, the fourth signaling is transmitted via an air interface.

In one embodiment, the fourth signaling is transmitted via a radio interface.

In one embodiment, the fourth signaling is transmitted via a high-layer signaling.

In one embodiment, the fourth signaling comprises a higher-layer signaling.

In one embodiment, the fourth signaling comprises all or part of a higher layer signaling.

In one embodiment, the fourth signaling comprises an RRC message.

In one embodiment, the fourth signaling comprises all or part of IEs in an RRC message.

In one embodiment, the fourth signaling comprises all or part of fields of an IE in an RRC message.

In one embodiment, an SRB of the fourth signaling includes an SRB0.

In one embodiment, an SRB of the fourth signaling includes an SRB1.

In one embodiment, a logical channel bearing the fourth signaling comprises a Common Control Channel (CCCH).

In one embodiment, a logical channel bearing the fourth signaling comprises a DCCH.

In one embodiment, the fourth signaling comprises an RRCReestablishmentRequest message.

In one embodiment, the fourth signaling comprises an RRCConnectionReestablishmentRequest message.

Embodiment 7B

Embodiment 7B illustrates a schematic diagram of a first timer not being running when a second timer is started according to one embodiment of the present disclosure. In FIG. 7B, a slash-filled solid-line-framed box represents a running time of a first timer; a diamond-filled solid-line-framed box represents a running time of a second timer; a fifth time, a sixth time, a seventh time and an eighth time are four times increasing progressively in time.

In Embodiment 7B, a first signal is transmitted at a fifth time; as a response to the first signal being triggered, a second timer is started; a first node determines that a physical-layer problem occurs in a first serving cell; as a response to the phrase of determining that a physical-layer problem occurs in a first serving cell, starts a first serving cell at the sixth time; a first timer stops timing at the seventh time, when the first timer is expired, maintains a radio connection and the second timer continue timing; the second timer stops timing at the eighth time; and as a response to receiving the second signal, stops the second timer.

In one embodiment, the phrase that a second timer is not started when a first timer is running includes: when the second timer is started, the first timer is not running.

In one embodiment, the phrase that a second timer is not started when a first timer is running includes: whether the second timer is started or not is unrelated to whether the first timer is running.

In one embodiment, the phrase that a second timer is not started when a first timer is running includes: the first timer is unrelated to the second timer.

In one embodiment, the first timer stopping timing comprises the first timer being expired.

In one embodiment, the first timer stopping timing comprises stopping the first timer.

In one embodiment, the second timer stopping timing comprises the second timer being expired.

In one embodiment, the second timer stopping timing comprises stopping the second timer.

In one embodiment, the first signaling is not transmitted when the first timer is running.

In one embodiment, when the first signal is triggered, the first timer is not running.

In one embodiment, when the second timer is running, the first timer is started.

In one embodiment, when the second timer is running, the first timer is expired.

In one embodiment, both the first timer being started and being expired occur when the second timer is running.

In one embodiment, the first timer comprises a timer T310.

In one embodiment, the second timer comprises a timer T312.

In one embodiment, the second timer comprises a timer T316.

In one embodiment, the second timer comprises a timer T300.

In one embodiment, the second timer comprises a timer T301.

In one embodiment, the second timer comprises a timer T304.

In one embodiment, the second timer comprises a timer T311.

In one embodiment, the second timer comprises a timer T319.

Embodiment 7C

Figure 7C:
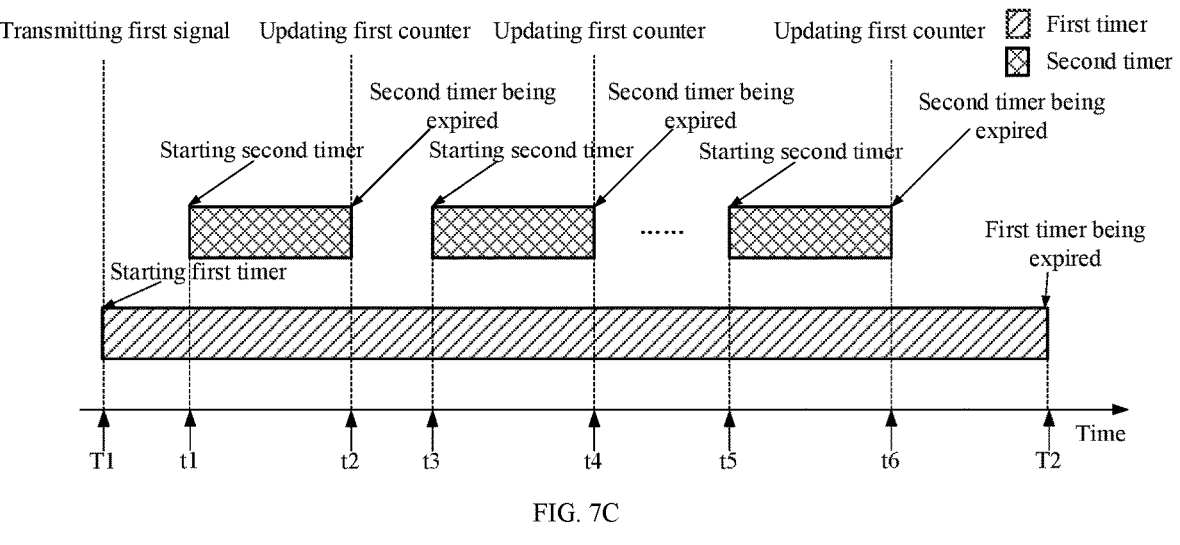
FIG. 7C illustrates a schematic diagram of a relation between a first timer and a second timer according to one embodiment of the present disclosure.

Embodiment 7C illustrates a schematic diagram of a relation between a first timer and a second timer according to one embodiment of the present disclosure. In FIG. 7C, a slash-filled rectangle represents the first timer, a diamond-filled rectangle represents the second timer, T1 and T2 are two times increasing progressively in time, t1, t2, t3, t4, t5 and t6 are six times increasing progressively in time between T3 time and T4 time, a difference value between the T2 time and the T1 time is equal to a first time length, a difference value between the t2 time and t1 time is equal to a second time length, a difference value between the t4 time and the t3 time is equal to the second time length, and a difference value between the t6 time and the t5 time is equal to the second time length.

In Embodiment 7C, the first timer is started at T1 time. the first timer is expired at T2 time; the second timer is started at the t1 time, the t3 time and the t5 time; the second timer is expired at the t2 time, the t4 time and the t6 time; and the first counter is updated at the t2 time, the t4 time and the t6 time.

In one embodiment, the first node transmits the first signal at the T1 time, as a response to the first signal being transmitted, starts the first timer; a physical-layer problem occurs in a first serving cell at the t1 time, as a response to a physical-layer problem occurring in the first serving cell, starts the second timer.

In one embodiment, the phrase of "as a response to the first signal being transmitted, starting the first timer" includes: the first signal being transmitted is used to trigger starting the first timer.

In one embodiment, the phrase of "as a response to the first signal being transmitted, starting the first timer" includes: the first signal being transmitted is used to determine to start the first timer.

In one embodiment, the second timer is started when the first timer is running.

In one embodiment, the second timer is started when the first timer is not miming.

In one embodiment, conditions under which the first timer and the second timer are started are different.

In one embodiment, conditions under which the first timer and the second timer are started are the same.

In one embodiment, when the first counter reaches the first value, the first timer is stopped.

In one embodiment, when the first counter reaches the first value, the first timer is not stopped.

In one embodiment, starting of the second timer is unrelated to the first signaling being transmitted.

In one embodiment, starting of the second timer is related to the first signaling being transmitted.

In one embodiment, when the physical-layer problem of the first serving cell is recovered, the second timer is stopped; and when the second timer is stopped, the first counter is not updated.

Embodiment 8A

Figure 8A:
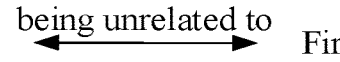
FIG. 8A illustrates a schematic diagram of an occurrence of a radio connection failure being unrelated to a first timer according to one embodiment of the present disclosure.

Embodiment 8A illustrates a schematic diagram of an occurrence of a radio connection failure being unrelated to a first timer according to one embodiment of the present disclosure, as shown in FIG. 8A.

In Embodiment 8A, an occurrence of a radio connection failure is unrelated to the first timer.

In one embodiment, the radio connection failure occurs when the first timer is started and the first timer is not expired.

In one embodiment, the radio connection failure occurs when the first timer is running.

In one embodiment, the radio connection failure refers to a radio connection failure caused by other reasons when the first timer is running.

In one embodiment, the phrase that the occurrence of the radio connection failure is unrelated to the first timer includes: the occurrence of the radio connection failure is not caused by an expiration of the first timer.

In one embodiment, the phrase that the occurrence of the radio connection failure is unrelated to the first timer includes: the occurrence of the radio connection failure is caused by other reasons other than an expiration of the first timer.

In one embodiment, the phrase that the occurrence of the radio connection failure is unrelated to the first timer includes: a cause of the occurrence of the radio connection failure does not includes a t310-Expiry.

In one embodiment, the phrase that the occurrence of the radio connection failure is unrelated to the first timer includes: a cause of the occurrence of the radio connection failure does not includes a t312-Expiry.

In one embodiment, the phrase that the occurrence of the radio connection failure is unrelated to the first timer includes: a cause of the occurrence of the radio connection failure includes a randomAccessProblem.

In one embodiment, the phrase that the occurrence of the radio connection failure is unrelated to the first timer includes: a cause of the occurrence of the radio connection failure includes an rlc-MaxNumRetx.

In one embodiment, the phrase that the occurrence of the radio connection failure is unrelated to the first timer includes: a cause of the occurrence of the radio connection failure includes a beamFailureRecoveryFailure.

Embodiment 8B

Figure 8B:
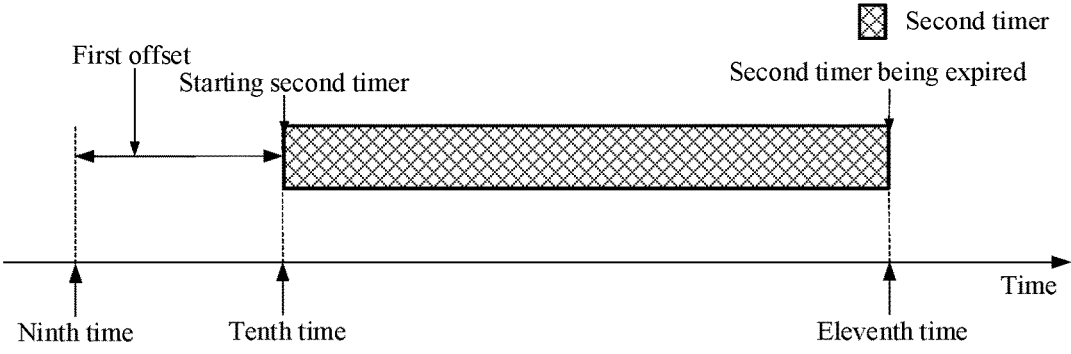
FIG. 8B illustrates a schematic diagram of a first offset being used to determine a time length that a second timer is delayed to be started according to one embodiment of the present disclosure.

Embodiment 8B illustrates a schematic diagram of a first offset being used to determine a time length that a second timer is delayed to be started according to one embodiment of the present disclosure, as shown in FIG. 8B. In FIG. 8B, a diamond-filled solid-line-framed box represents the second timer; a ninth time, a tenth time and an eleventh time are three times increasing progressively in time.

In Embodiment 8B, a first node transmits a first signal at the ninth time; a first offset is used to determine a time length that a second timer is delayed to be started; as a response to the first signal being triggered, starts a second timer at the tenth time; the second timer is expired at the tenth time; monitors a second signal when the second timer is running; and as a response to receiving the second signal, stops the second timer.

In one embodiment, the phrase of a first offset being used to determine a time length that a second timer is delayed to be started includes: the first offset comprises a time length that the second timer is delayed to be started.

In one embodiment, the phrase of a first offset being used to determine a time length that a second timer is delayed to be started includes: when the second timer is determined to be started, it starts timing after delaying for the first offset.

In one embodiment, the phrase of a first offset being used to determine a time length that a second timer is delayed to be started includes: when the second timer is determined to be started, it times after waiting for the first offset.

In one embodiment, the phrase of a first offset being used to determine a time length that a second timer is delayed to be started includes: when the second timer meets a start condition, it is started after delaying for the first offset.

In one subsidiary embodiment of the subembodiment, the start condition includes that the first signal is triggered.

In one subsidiary embodiment of the subembodiment, the start condition includes that the first timer is running and the first signal is triggered.

In one subsidiary embodiment of the subembodiment, the start condition includes that the first timer is running and the first signal is not transmitted.

In one embodiment, the phrase of "when the second timer is running, monitoring a second signal" includes from the tenth time to the eleventh time, monitoring the second signal.

In one embodiment, the first node does not start the first timer from the ninth time to the tenth time.

In one embodiment, the first node does not perform an RLM from the ninth time to the tenth time.

Embodiment 8C

Figure 8C:
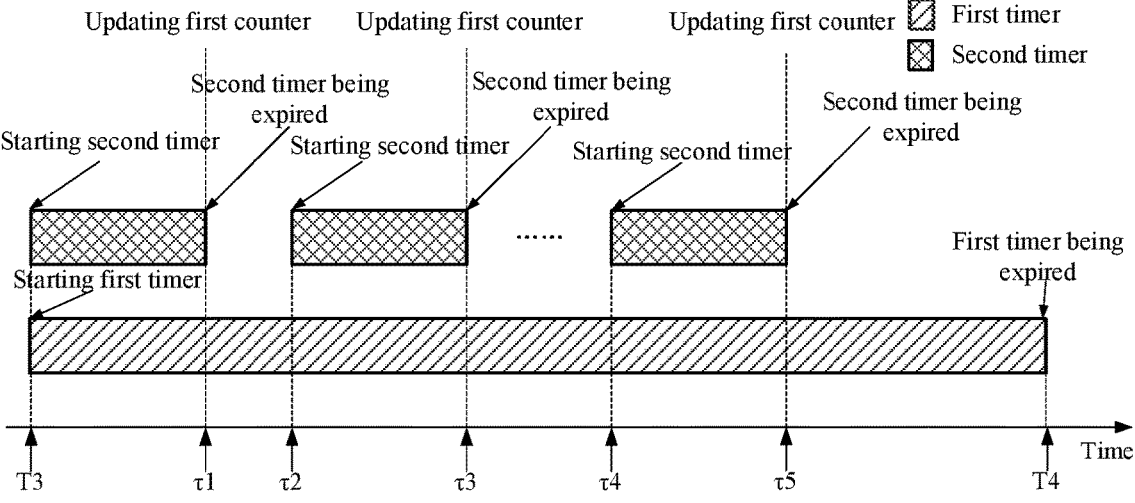
FIG. 8C illustrates a schematic diagram of a relation between a first timer and a second timer according to another embodiment of the present disclosure.

Embodiment 8C illustrates a schematic diagram of a relation between a first timer and a second timer according to another embodiment of the present disclosure, as shown in FIG. 8C. In FIG. 8C, a slash-filled rectangle represents the first timer, a diamond-filled rectangle represents the second timer, T3 and T4 are two times increasing progressively in time, $\tau 1$, $\tau 2$, $\tau 3$, $\tau 4$ and $\tau 5$ are five times increasing progressively in time between the T3 time and the T4 time, a difference value between the T3 time and the T4 time is equal to a first time length, a difference value between the T1 time and T1 time is equal to a second time length, a difference value between the $\tau 2$ time and the $\tau 3$ time is equal to the second time length, and a difference value between the $\tau 4$ time and the $\tau 5$ time is equal to the second time length.

In Embodiment 8C, the first timer is started at T3 time; the first timer is expired at T4 time; the second timer is started at the T3 time, the $\tau 2$ time and the $\tau 4$ time; the second timer is expired at the time of the T1 time, the $\tau 3$ time and the $\tau 5$ time; a first counter is updated at the time of the T1 time, the $\tau 3$ time and the $\tau 5$ time.

In one embodiment, a physical-layer problem occurs in a first serving cell at the T3 time, as a response to a physical-layer problem occurring in the first serving cell, the first timer and the second timer are started.

In one embodiment, the first time length is used to determine an expiration value of the first timer, and the second time length is used to determine an expiration value of the second timer.

In one embodiment, the first timer and the second timer are started simultaneously.

In one embodiment, when a physical-layer problem occurs in a first serving cell when the first timer is running, the second timer is started.

In one embodiment, when a first condition set is satisfied, the first timer is started after waiting for a third time length; and the first condition set comprises determining that a physical-layer problem occurs in the first serving cell.

In one embodiment, when the first timer is running and when the first counter reaches a first value, an occurrence of an RLF is determined in a first serving cell.

In one embodiment, the third time length is equal to zero.

In one embodiment, the third time length is greater than zero.

Embodiment 9A

Embodiment 9A illustrates a schematic diagram of a transmitting behavior of a first signaling does not affect timing of a third timer according to one embodiment of the present disclosure, as shown in FIG. 9A.

In Embodiment 9A, the physical-layer problem occurs in a second serving cell is determined; as a response to determining that the physical-layer problem occurs in the second serving cell, a third timer is started; herein, a transmitting behavior of the first signaling does not affect a timing of the third timer.

In one embodiment, the phrase of determining that the physical layer problem occurs in a second serving cell includes detecting that the physical-layer problem occurs in the second serving cell.

In one embodiment, the phrase of determining that the physical layer problem occurs in a second serving cell includes indicating that the physical-layer problem occurs in the second serving cell.

In one embodiment, an occurrence of the physical-layer problem in the second serving cell is determined through an RLM.

In one embodiment, an occurrence of the physical-layer problem in the second serving cell is determined via a lower-layer indication.

In one embodiment, the second serving cell comprises another serving cell of the first node.

In one embodiment, the second serving cell comprises a PCell.

In one embodiment, the second serving cell comprises a PSCell.

In one embodiment, the second serving cell comprises an SPCell.

In one embodiment, the second serving cell comprises an SCell.

In one embodiment, the second cell comprises an MCG.

In one embodiment, the second cell comprises an SCG.

In one embodiment, the second serving cell comprises a cell of an MCG.

In one embodiment, the second serving cell comprises a cell of an SCG.

In one embodiment, a maintenance base station of the second serving cell comprises an MN.

In one embodiment, a maintenance base station of the second serving cell comprises an SN.

In one embodiment, both the second serving cell and the first serving cell are connected with the first node.

In one embodiment, when the radio connection failure occurs in the first serving cell, the radio connection failure is not occurred in the second serving cell.

In one embodiment, the phrase that "as a response to determining that the physical-layer problem occurs in the second serving cell, starting a third timer" includes when an occurrence of the physical-layer problem in the second serving cell is detected, starting the third timer.

In one embodiment, the phrase that "as a response to determining that the physical-layer problem occurs in the second serving cell, starting a third timer" includes when a number of out-of-sync indications received from a lower-layer of the second serving cell reaches a maximum value of the first counter, starting the third timer.

In one embodiment, the phrase that "as a response to determining that the physical-layer problem occurs in the second serving cell, starting a third timer" includes when the first counter reaches a maximum value, starting the third timer.

In one embodiment, the phrase that "as a response to determining that the physical-layer problem occurs in the second serving cell, starting a third timer" includes when the counter N310 reaches a maximum value, starting the third timer.

In one embodiment, the phrase that "as a response to determining that the physical-layer problem occurs in the second serving cell, starting a third timer" includes when the timer T310 is running, starting the third timer.

In one embodiment, the phrase that "as a response to determining that the physical-layer problem occurs in the second serving cell, starting a third timer" includes when the timer T310 is running, when a measurement report for a measurement ID is triggered and the third timer is configured, starting the third timer.

In one embodiment, the starting the third timer includes that the third timer starts timing.

In one embodiment, the starting the third timer includes starting the third timer.

In one embodiment, the starting the third timer includes that the third timer starts running.

In one embodiment, the third timer comprises a timer T310.

In one embodiment, the third timer comprises a timer T312.

In one embodiment, the third timer is a timer started earlier than the timer T310.

In one embodiment, the third timer is a timer started later than the timer T310.

In one embodiment, the third timer is maintained by an MCG.

In one embodiment, the third timer is maintained by an SCG.

In one embodiment, the phrase that a transmission behavior of the first signaling does not affect timing of the third timer includes: when the first signaling is transmitted, the third timer continues timing.

In one embodiment, the phrase that a transmission behavior of the first signaling does not affect timing of the third timer includes: when the first signaling is transmitted, and if the third timer is running, the third timer is not stopped.

In one embodiment, the phrase that a transmission behavior of the first signaling does not affect timing of the third timer includes: a stopping of the third timer is unrelated to a transmission behavior of the first signaling.

In one embodiment, the phrase that a transmission behavior of the first signaling does not affect timing of the third timer includes: a running of the third timer is unrelated to a transmission behavior of the third signaling.

In one embodiment, the phrase that a transmission behavior of the first signaling does not affect timing of the third timer includes: a transmission of the first signaling does not trigger a starting of the third timer.

In one embodiment, the phrase that a transmission behavior of the first signaling does not affect timing of the third timer includes: a transmission of the first signaling does not trigger a stopping of the third timer.

In one embodiment, the phrase that a transmission behavior of the first signaling does not affect timing of the third timer includes: a transmission of the first signaling does not trigger an expiration of the third timer.

In one embodiment, the phrase that a transmission behavior of the first signaling does not affect timing of the third timer includes: a transmission of the first signaling does not trigger a suspension of the third timer.

Embodiment 9B

Embodiment 9B illustrates a schematic diagram of a first offset being used to determine a time length that a second timer is prolonged to run according to one embodiment of the present disclosure, as shown in FIG. 9B. In FIG. 9B, a diamond-filled dotted-line-framed box represents the first offset part of the second timer; a diamond-filled solid-line-framed box represents a first expiration value part of the second timer; and a ninth time, a tenth time and a eleventh time are three times increasing progressively in time.

In Embodiment 9B, a first node transmits a first signal at the ninth time; as a response to the first signal being triggered, starts a second timer at the ninth time; a first offset is used to determine a time length that a second timer is prolonged to run; the second timer is expired at the tenth time; monitors a second signal when the second timer is running; and as a response to receiving the second signal, stops the second timer.

In one embodiment, the first offset part of the second timer and the first expiration value part of the second timer are used together to determine a maximum running time of the second timer.

In one embodiment, the phrase that a first offset is used to determine a time length that a second timer is prolonged to run includes: the first offset comprises a time length that the first timer is prolonged to run.

In one embodiment, the phrase that a first offset is used to determine a time length that a second timer is prolonged to run includes a running time of the second timer increases the first offset.

In one embodiment, the phrase that a first offset is used to determine a time length that a second timer is prolonged to run includes: an expiration time of the second timer comprises a sum of a first expiration value and the first offset.

In one embodiment, a running time of the second timer comprises a time interval from the ninth time to the eleventh time.

In one embodiment, a difference value between the tenth time and the ninth time is equal to a maximum running time of the second timer.

In one embodiment, a diamond-filled dotted-line-framed box and a diamond-filled solid-line-framed box are used together to determine a maximum miming time of the second timer.

In one embodiment, a maximum running time of the second timer is equal to a sum of the first expiration value and the first offset.

In one embodiment, an expiration time of the second timer comprises a maximum running time after the first signal is triggered.

In one embodiment, the phrase of "when the second timer is running, monitoring a second signal" includes from the ninth time to the tenth time, monitoring the second signal.

In one embodiment, the second timer starts timing from the ninth time and does not stop timing at the tenth time.

Embodiment 9C

Embodiment 9C illustrates a schematic diagram of a starting, a stopping and an expiration of a first timer according to one embodiment of the present disclosure, as shown in FIG. 9C. In FIG. 9C, a slash-filled box represents the first timer, T5, T6 and T7 are times increasing progressively in time, and a difference value between the T7 time and the T5 time is equal to a first time length.

In Embodiment 9C, at T5 time, the first condition set is satisfied, when the first condition set is satisfied, the first timer is started after waiting for a third time length; at T6 time, when a second condition set is satisfied, the first timer is stopped; the first timer is expired at T7 time; herein, the first condition set comprises determining that a physical-layer problem occurs in the first serving cell, or the first condition set comprises that the first signal is transmitted; the second condition comprises that the physical-layer problem is recovered, or the second condition set comprises that the second signal is received, or the second condition set comprises initiating a first procedure, the first procedure being used for a radio link update, or the second condition set comprises that the first counter reaches the first value, or the second condition set comprises that the first serving cell is released; the first time length is used to determine an expiration value of the first timer.

In one embodiment, when the first condition set is satisfied, the first timer is started after waiting for a third time length; herein, the first condition set comprises determining that a physical-layer problem occurs in the first serving cell, or the first condition set comprises that the first signal is transmitted.

In one embodiment, the first timer and the second timer are started simultaneously.

In one embodiment, the first timer and the second timer are not started simultaneously.

In one embodiment, when a second condition set is satisfied, the first timer is stopped; herein, the second condition set comprises that the physical-layer problem is recovered, or the second condition set comprises that the second signal is received, or the second condition set comprises initiating a first procedure, the first procedure being used for a radio link update, or the second condition set comprises that the first counter reaches the first value, or the second condition set comprises that the first serving cell is released.

In one embodiment, the phrase of "when a second condition set is satisfied, stopping the first timer" includes as a response to the second condition set being satisfied, stopping the first timer.

In one embodiment, the phrase of "when a second condition set is satisfied, stopping the first timer" includes the second condition set being satisfied is used to determine to stop the first timer.

In one embodiment, the first timer and the second timer stop simultaneously.

In one embodiment, the first timer and the second timer do not stop simultaneously.

In one embodiment, the second condition set is used to determine to stop the first timer.

In one embodiment, the second condition set is a condition under which the first timer is stopped.

In one embodiment, the second condition set being satisfied is used to trigger stopping the first timer.

In one embodiment, the second condition set comprises the physical-layer problem recovery.

In one subembodiment of the above embodiment, when the second condition set comprises the physical-layer problem recovery, the first timer is stopped.

In one embodiment, the second condition set comprises that the second signal is received.

In one subembodiment of the above embodiment, when the second signal is received, the first timer is stopped.

In one subembodiment of the above embodiment, the second signal is a response signal of the first signal.

In one subembodiment of the above embodiment, the second signal comprises an RRC signal.

In one subembodiment of the above embodiment, the second signal comprises a MAC layer signal.

In one subembodiment of the above embodiment, the second signal comprises a PHY signal.

In one embodiment, the second condition set comprises initiating a first procedure, and the first procedure is used for a radio link update.

In one subembodiment of the above embodiment, when the first procedure is initiated, the first timer is stopped, and the first procedure is used for a radio link update.

In one subembodiment of the above embodiment, the first procedure comprises an RRC connection reestablishment.

In one subembodiment of the above embodiment, the first procedure comprises an RRC connection establishment.

In one subembodiment of the above embodiment, the first procedure comprises an RRC connection release.

In one subembodiment of the above embodiment, the first procedure comprises an RRC connection reconfiguration.

In one subembodiment of the above embodiment, the first procedure comprises an RRC connection recovery.

In one subembodiment of the above embodiment, the first procedure comprises handover.

In one subembodiment of the above embodiment, the first procedure comprises an MCG Link Fast Recovery.

In one subembodiment of the above embodiment, the first procedure comprises transmitting a measurement report.

In one subembodiment of the above embodiment, the first procedure comprises transmitting an RRCReestablishmentRequest message.

In one subembodiment of the above embodiment, the first procedure comprises transmitting an MCGFailureInformation message.

In one subembodiment of the above embodiment, the first procedure comprises transmitting an SCGFailureInformation message.

In one subembodiment of the above embodiment, the first procedure comprises transmitting an FailureInformation message.

In one embodiment, the second condition set comprises the first counter reaching the first value.

In one subembodiment of the above embodiment, when the first counter reaches the first value, the first timer is stopped.

In one subembodiment of the above embodiment, when the first counter reaches the first value comprises determining that a radio link failure occurs in a first serving cell.

In one subembodiment of the above embodiment, when the first counter reaches the first value comprises that the first counter is equal to the first value.

In one subembodiment of the above embodiment, when the first counter reaches the first value comprises that the first counter is greater than the first value.

In one embodiment, the second condition set comprises the first serving cell being released.

In one subembodiment of the above embodiment, when the first serving cell is released, the first timer is stopped.

In one subembodiment of the above embodiment, when the first serving cell comprises a PSCell of an SCG.

In one subembodiment of the above embodiment, the first timer is associated with the SCG.

In one subembodiment of the above embodiment, the first timer is valid for the SCG.

In one subembodiment of the above embodiment, the first serving cell being released comprises releasing an RRC connection of the first serving cell.

In one subembodiment of the above embodiment, the first serving cell being released comprises releasing an SRB configuration of the first serving cell.

In one subembodiment of the above embodiment, the first serving cell being released comprises releasing a DRB configuration of the first serving cell.

In one subembodiment of the above embodiment, the first serving cell being released comprises releasing RRC resources of the first serving cell.

In one subembodiment of the above embodiment, the first serving cell being released comprises releasing the first serving cell from continuing providing service for the first node.

In one embodiment, the stopping a first timer includes that the first timer stops timing.

In one embodiment, the stopping a first timer includes that the first timer does not continue timing.

In one embodiment, the stopping a first timer includes that the first timer is suspended.

In one embodiment, the first timer being expired is different from the first timer being stopped.

Embodiment 10A

Embodiment 10A illustrates a schematic diagram of a second timer in a running state being used to determine not to start a first timer according to one embodiment of the present disclosure, as shown in FIG. 10A.

In Embodiment 10A, when the second timer is in a running state, the first timer is not started.

In one embodiment, the phrase of "when the second timer is in a running state, the first timer is not started" includes when the second timer is running, not starting the first timer.

In one embodiment, the phrase of "when the second timer is in a running state, the first timer is not started" includes a condition under which the first timer is started includes that the second timer is not running.

In one embodiment, when the second timer is in a running state, the first counter not counting in the present disclosure is used to determine not to trigger the first timer.

In one subembodiment of the above embodiment, the phrase that the first counter does not count includes the first counter being suspended.

In one subembodiment of the above embodiment, the phrase that the first counter does not count includes stopping the first counter.

In one subembodiment of the above embodiment, the phrase that the first counter does not count includes when receiving an out-of-sync indication from a lower layer, the first counter does not continue accumulating.

In one embodiment, when the second timer is in a running state, the first counter does not continue counting.

In one embodiment, when the second timer is in a running state, the first counter continues counting.

In one embodiment, when the second timer is in the running state, the first counter continues counting, and when the first counter reaches a maximum value, starting the first timer is not triggered.

In one embodiment, when the first counter reaches a maximum value, and if the second timer is running, the first timer is not started.

In one embodiment, when the first counter reaches a maximum value, and if the second timer is not running, the first timer is started.

In one embodiment, when the second timer is in the running state, not performing an RLM is used to determine not to trigger starting the first timer.

In one subembodiment of the above embodiment, the phrase of not performing an RLM includes stopping the RLM.

In one subembodiment of the above embodiment, the phrase of not performing an RLM includes not receiving a reference signal used for the RLM.

In one subsidiary embodiment of the above embodiment, the reference signal comprises a Channel Status Information Reference Signal (SCI-RS).

In one subsidiary embodiment of the above embodiment, the reference signal comprises a Synchronization Signal Reference Signal (SS-RS).

In one subsidiary embodiment of the above embodiment, the reference signal comprises a PBCH.

In one subsidiary embodiment of the above embodiment, the reference signal comprises DeModulation Reference Signals (DMRS).

In one embodiment, when the second timer stops running, the RLM is continued being performed.

In one embodiment, when the second timer is expired, the RLM is continued being performed.

Embodiment 10B

Embodiment 10B illustrates a schematic diagram of starting a second timer being used to reset a first counter and a second counter according to one embodiment of the present disclosure, as shown in FIG. 10B. In FIG. 10B, each box represents a step. It is particularly underlined that the order illustrated in the embodiment does not put constraints over sequences of signal transmissions and implementations.

In Embodiment 10B, as a response to the first signal being triggered, a first counter and a second counter are reset; herein, the first counter reaching a first value is used to determine to start the first timer; the second counter reaching a second value is used to determine to stop the first timer; and the first value and the second value are non-negative integers.

In one embodiment, the first counter reaching the first value is used to determine an occurrence of the physical-layer problem.

In one embodiment, a number of out-of-sync indications received from a lower-layer reaching a maximum value of a first counter is used to determine an occurrence of the physical-layer problem.

In one embodiment, when an in-sync indication form a lower layer is received, the first counter is reset.

In one embodiment, when an RRCReconfiguration message carrying a reconfigurationWithSync is received, the first counter is reset.

In one embodiment, when a connection reestablishment procedure is initiated, the first counter is reset.

In one embodiment, when the second timer is started, the first counter is reset.

In one embodiment, when the first signal is transmitted, the first counter is reset.

In one embodiment, when the first signal is triggered, the first counter is reset.

In one embodiment, when an out-of-sync indication from a lower layer is received, the first counter is increased by K1.

In one subembodiment of the above embodiment, the K1 is equal to 1.

In one subembodiment of the above embodiment, the K1 is greater than 1.

In one embodiment, when the first counter reaches the first value, the first timer is started.

In one embodiment, the first counter is for the first serving cell.

In one embodiment, the first counter is for the second serving cell.

In one embodiment, the first counter is UE-specific.

In one embodiment, the first counter is cell-specific.

In one embodiment, the first counter comprises an N310.

In one embodiment, the first counter comprises an N313.

In one embodiment, the first counter comprises a counter.

In one embodiment, the first counter is used to count consecutive out-sync indications.

In one embodiment, the first counter is used to determine a number of out-sync indications.

In one embodiment, when an out-sync indication from a lower layer is received, the second counter is reset.

In one embodiment, when an RRCReconfiguration message carrying a reconfigurationWithSync is received, the second counter is reset.

In one embodiment, when a connection reestablishment procedure is initiated, the second counter is reset.

In one embodiment, when the second timer is started, the second counter is reset.

In one embodiment, when the first signal is transmitted, the second counter is reset.

In one embodiment, when the first signal is triggered, the second counter is reset.

In one embodiment, when an in-sync indication from a lower layer is received, the second counter is increased by K2.

In one subembodiment of the above embodiment, the K2 is equal to 2.

In one subembodiment of the above embodiment, the K2 is greater than 2.

In one embodiment, when the second counter reaches the second value, the first timer is stopped.

In one embodiment, the second counter is for the first serving cell.

In one embodiment, the second counter is for the second serving cell.

In one embodiment, the second counter is UE-specific.

In one embodiment, the second counter is cell-specific.

In one embodiment, the second counter comprises an N311.

In one embodiment, the second counter comprises an N314.

In one embodiment, the second counter comprises a counter.

In one embodiment, the second counter is used to count consecutive in-sync indications.

In one embodiment, the second counter is used to determine a number of in-sync indications.

In one embodiment, the first counter and the second counter do not count at the same time.

In one embodiment, when the first timer is not running, the first counter counts while the second counter does not count.

In one embodiment, when the first timer is running, the second counter counts while the first counter does not count.

In one embodiment, the meaning of the reset includes resetting.

In one embodiment, the meaning of the reset includes setting as an initial value.

In one embodiment, the meaning of the reset includes setting as 0.

In one embodiment, the phrase of "as a response to the first signal being triggered, resetting a first counter and a second counter" includes when the first signal is triggered, resetting the first counter and the second counter.

In one embodiment, when the first signal is triggered, the first counter is reset.

In one embodiment, when the first signal is triggered, the second counter is reset.

In one embodiment, the phrase of resetting the first counter and the second counter includes: resetting a value of the first counter and a value of the second counter to 0.

In one embodiment, the first value comprises a maximum value of the first counter.

In one embodiment, the first value is configurable.

In one embodiment, the first value is pre-configured.

In one embodiment, the first value is of a fixed magnitude.

In one embodiment, the first value is a non-negative integer.

In one embodiment, the first value comprises the N310.

In one embodiment, the first value comprises the N313.

In one embodiment, the first value is equal to 20.

In one embodiment, the first value is greater than 20.

In one embodiment, the first value is related to a parameter of a maintenance base station of the first serving cell.

In one embodiment, the second value comprises a maximum value of the first counter.

In one embodiment, the second value is configurable.

In one embodiment, the second value is pre-configured.

In one embodiment, the second value is of a fixed magnitude.

In one embodiment, the second value is a non-negative integer.

In one embodiment, the second value comprises the N311.

In one embodiment, the second value is equal to 20.

In one embodiment, the second value is greater than 20.

In one embodiment, the second value is related to a parameter of a maintenance base station of the first serving cell.

In one embodiment, the phrase that the first counter reaching a first value is used to determine to start the first timer includes when the first counter reaches a maximum value, determining to start the first timer.

In one embodiment, the phrase that the second counter reaching a second value is used to determining to stop the first timer includes when the second counter reaches a maximum value, determining to stop the first timer.

Embodiment 10C

Embodiment 10C illustrates a schematic diagram of a third condition set being satisfied being used to reset a first counter according to one embodiment of the present disclosure, as shown in FIG. 10C.

In Embodiment 10C, when the third condition set is satisfied, the first counter is reset; herein, the third condition set comprises that the first timer is started, or the third condition set comprises initiating a first procedure, or the third condition set comprises the first serving cell being released.

In one embodiment, the phrase of "when a third condition set is satisfied, resetting the first counter" includes as a response to the third condition set being satisfied, resetting the first counter.

In one embodiment, the phrase of "when a third condition set is satisfied, resetting the first counter" includes the third condition set being satisfied is used to determining resetting the first counter.

In one embodiment, the third condition set is used to determine to reset the first counter.

In one embodiment, the third condition set comprises a condition under which the first counter is reset.

In one embodiment, the third condition set being satisfied is used to trigger resetting the first counter.

In one embodiment, the third condition set comprises that the first timer being started.

In one embodiment of the above embodiment, when the third condition set is satisfied, the first counter is reset; herein, the third condition set comprises that the first timer being started.

In one embodiment of the above embodiment, when the first timer is started, the first counter is reset.

In one embodiment of the above embodiment, the first timer being started includes that the first condition set is satisfied.

In one embodiment of the above embodiment, the first timer being started comprises determining a physical-layer problem occurs in the first serving cell.

In one embodiment of the above embodiment, the first timer being started comprises the first signal being transmitted.

In one embodiment, the third condition set comprises initiating a first procedure.

In one embodiment of the above embodiment, when the third condition set is satisfied, the first counter is reset; herein, the third condition set comprises initiating the first procedure.

In one embodiment of the above embodiment, when the first procedure is initiated, the first counter is reset.

In one embodiment, the third condition set comprises the first serving cell being released.

In one embodiment of the above embodiment, when the third condition set is satisfied, the first counter is reset; herein, the third condition set comprises the first serving cell being released.

In one embodiment of the above embodiment, when the first serving cell is released, the first counter is reset.

Embodiment 11A

Embodiment 11A illustrates a schematic diagram of a first node keeping connection with a first serving cell and a second serving cell through Dual Connectivity according to one embodiment of the present disclosure, as shown in FIG. 11A.

In Embodiment 11A, the first node maintains connection with the first serving cell and the second serving cell through Dual Connectivity.

In one subembodiment of the above embodiment, the Dual Connectivity comprises a Multi-Radio Dual Connectivity (MR-DC).

In one subembodiment of the above embodiment, the Dual Connectivity comprises a NR-Dual Connectivity (NR-DC).

In one subembodiment of the above embodiment, the Dual Connectivity comprises an Intra-E-UTRA DC.

In one subembodiment of the above embodiment, the Dual Connectivity comprises a NR-E-UTRA Dual Connectivity (NE-DC).

In one subembodiment of the above embodiment, the Dual Connectivity comprises an NG-RAN E-UTRA-NR Dual Connectivity (NGEN-DC).

In one subembodiment of the above embodiment, the Dual Connectivity comprises an E-UTRA-NR Dual Connectivity (EN-DC).

In one embodiment, the first serving cell is associated with a first-type node.

In one embodiment, the first-type node comprises a maintenance base station of the first serving cell.

In one embodiment, the first-type node comprises an MN.

In one embodiment, the first-type node comprises a Master eNodeB (MeNB).

In one embodiment, the first-type node comprises a Centralized Unit (CU).

In one embodiment, the first-type node comprises a node in an MCG.

In one embodiment, the first-type node comprises an SN.

In one embodiment, the first-type node comprises an SgNB.

In one embodiment, the first-type node comprises a DU.

In one embodiment, the first-type node comprises a node in an SCG.

In one embodiment, the first-type node comprises a base station supporting NR.

In one embodiment, the first-type node comprises a base station supporting EUTRA.

In one embodiment, the first-type node comprises a base station supporting WLAN.

In one embodiment, the first-type node comprises a base station supporting BT.

In one embodiment, the first-type node comprises a maintenance base station of the first serving cell.

In one embodiment, the first-type node comprises a UE.

In one embodiment, the first-type node comprises an ender.

In one embodiment, the second serving cell is associated with a second-type node.

In one embodiment, the second-type node comprises a maintenance base station of the second serving cell.

In one embodiment, the second-type node comprises an MN.

In one embodiment, the second-type node comprises an MeNB.

In one embodiment, the second-type node comprises a CU.

In one embodiment, the second-type node comprises a node in an MCG.

In one embodiment, the second-type node comprises an SN.

In one embodiment, the second-type node comprises a SgNB.

In one embodiment, the second-type node comprises a DU.

In one embodiment, the second-type node comprises a node in an SCG.

In one embodiment, the second-type node comprises a base station supporting NR.

In one embodiment, the second-type node comprises a base station supporting an Evolved-UMTS Terrestrial Radio Access (EUTRA).

In one embodiment, the second-type node comprises a base station supporting a WLAN.

In one embodiment, the second-type node comprises a base station supporting a BT.

In one embodiment, the second-type node comprises a UE.

In one embodiment, the second-type node comprises a an Ender.

In one embodiment, the first-type node and the second-type node are connected via an Xn interface.

In one embodiment, the first-type node and the second-type node are connected via an Xn-C interface.

In one embodiment, the first-type node and the second-type node are connected via an X2-C interface.

In one embodiment, a link between the first-type node and the second-type node is a non-ideal backhaul.

In one embodiment, a link between the first-type node and the second-type node is an ideal backhaul.

In one embodiment, the first node and the first-type node are connected via a Uu interface.

In one embodiment, the first node and the second-type node are connected via a Uu interface.

In one embodiment, the first serving cell and the second serving cell belong to a same PLMN.

In one subembodiment of the above embodiment, a Radio Access Technology (RAT) adopted by the PLMN comprises NR.

In one embodiment, an RAT adopted by the PLMN comprises Long Term Evolution (LIE).

Embodiment 11B

Embodiment 11B illustrates a schematic diagram of a first indicator being used to determine whether a second timer is valid according to one embodiment of the present disclosure, as shown in FIG. 11B.

In Embodiment 11B, a first node receives a second signaling; the second signaling is used to indicate a first parameter set of the second timer; the first parameter set comprises a first indicator, and the first indicator is used to determine whether the second timer is valid.

In one embodiment, the phrase that the first parameter set comprises a first indicator includes: the first indicator is a field in the first parameter set.

In one embodiment, the phrase that the first parameter set comprises a first indicator includes: the first indicator is a parameter in the first parameter set.

In one embodiment, the phrase that the first parameter set comprises a first indicator includes: the first indicator is part of the first parameter set.

In one embodiment, the first indicator is used to explicitly indicate that the second timer is valid.

In one embodiment, the first indicator is used to explicitly indicate that the second timer is invalid.

In one embodiment, the first indicator is used to implicitly indicate that the second timer is valid.

In one embodiment, the first indicator is used to implicitly indicate that the second timer is invalid.

In one embodiment, the first indicator is only valid to NTN.

In one embodiment, the first indicator comprises a Setu- pRelease.

In one embodiment, the first indicator comprises an MCG-only.

In one embodiment, the first indicator comprises an NTN-only.

In one embodiment, the first indicator is used to determine that the second timer is conditional.

In one embodiment, the first indicator comprises a Setup.

In one embodiment, the first indicator comprises a release.

In one embodiment, the first indicator comprises true.

In one embodiment, the first indicator comprises false.

Embodiment 11C

Embodiment 11C illustrates a schematic diagram of starting a first timer after waiting for a third time length according to one embodiment of the present disclosure, as shown in FIG. 11C. In FIG. 11C, a slash-filled box represents the first timer, T8, T9 and T10 are three times increasing progressively in time, a difference value between the T9 time and the T8 time is equal to the third time length, and a difference value between the T10 time and the T9 time is equal to a first time length.

In Embodiment 11C, the first condition set is satisfied at the T8 time, as a response to the phrase that the first condition set is satisfied, a first node starts a first timer at the T9 time after waiting for a third time length, and the first timer is expired at the T10 time.

In one embodiment, as a response to the first condition set being satisfied, a first timer is started after waiting for a third time length.

In one embodiment, when a first condition set is satisfied, the first timer is started after waiting for a third time length.

In one embodiment, the phrase that a first condition set is used to satisfy a condition under which the first timer is started.

In one embodiment, the third time length is configured via an RRC signaling.

In one embodiment, the third time length is configured via the first signaling.

In one embodiment, the third time length comprises a field of the first signaling.

In one embodiment, the third time length is configurable.

In one embodiment, the third time length is pre-configured.

In one embodiment, the third time length is of a fixed magnitude.

In one embodiment, the third time length is used to determine a time length that a second timer is prolonged to run.

In one embodiment, the third time length is used to determine a time length that a second timer is delayed to be started.

In one embodiment, the third time length is used to delay a start time and an expiration time of the second timer.

In one embodiment, the third time length is used to prolong a running time of the second timer.

In one embodiment, the third time length is related to a parameter of a maintenance base station of the first serving cell.

In one embodiment, the third time length is related to a type of the first signal.

In one embodiment, the third time length is related to retransmission times of the first signal.

In one embodiment, the third time length comprises a time length that the first timer is prolonged to run.

In one embodiment, a value of the third time length is equal to 0.

In one subembodiment of the above embodiment, when a value of the third time length is equal to 0, as a response to the first signal being transmitted, the first timer is started immediately.

In one embodiment, a value of the third time length is greater than 0.

In one subembodiment of the above embodiment, when a value of the third time length is greater than 0, as a response to the first signal being transmitted, the first timer is not started immediately.

In one embodiment, the third time length is measured by ms.

In one embodiment, the third time length comprises Q1 slot(s).

In one subembodiment of the above embodiment, the slot comprises a slot.

In one subembodiment of the above embodiment, the slot comprises a symbol.

In one subembodiment of the above embodiment, the slot comprises a subframe.

In one subembodiment of the above embodiment, the slot comprises a radio frame.

In one subembodiment of the above embodiment, a unit for measurement of the slot comprises ms.

In one subembodiment of the above embodiment, the slot comprises a predefined time length.

In one subembodiment of the above embodiment, a unit for measurement of the slot comprises s.

Embodiment 12A

Embodiment 12A illustrates a structure block diagram of a processing device in a first node according to one embodiment of the present disclosure, as shown in FIG. 12A. In FIG. 12A, a first node's processing device 1200A comprises a first receiver 1201A and a first transmitter 1202A.

The first receiver 1201A determines that a physical-layer problem occurs in a first serving cell; as a response to determining that the physical-layer problem occurs in the first serving cell, starts a first timer; and determines that a first condition set is satisfied;

a first transmitter 1202A, as a response to the first condition set being satisfied, transmits a first signaling; and the first receiver 1202A, as a response to the first condition set being satisfied, starts a second timer and stops the first timer; when the second timer is in a running state, monitors a second signaling;

in Embodiment 12A, the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the occurrence of the radio connection failure is unrelated to the first timer.

In one embodiment, the first receiver 1201A determines that the physical layer problem occurs in a second serving cell; as a response to determining that the physical-layer problem occurs in the second serving cell, starting a third timer; herein, a transmitting behavior of the first signaling does not affect a timing of the third timer.

In one embodiment, the first transmitter 1202A, as a response to the second signaling being received, and when the second signaling comprises an RRC connection release message, stops the second timer; when the second signaling comprises an RRC connection reconfiguration message, transmits a third signaling and stops the second timer; herein, the third signaling is used to confirm the RRC connection reconfiguration message.

In one embodiment, the first transmitter 1202A, when the second timer is expired, transmits a fourth signaling; herein, the fourth signaling is used to request an RRC connection reestablishment.

In one embodiment, the first receiver 1201A receives a fifth signaling; herein, the fifth signaling is used to indicate an expiration value of the first timer and an expiration value of the second timer; the fifth signaling comprises a first field, and the first field is used to indicate a state of the second timer.

In one embodiment, when the second timer is in a running state, the first timer is not started.

In one embodiment, the first receiver 1201A comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201A comprises the antenna 452, the receiver 454, the multi-antenna receiving processor 458 and the receiving processor 456 in FIG. 4 of the present disclosure.

In one embodiment, the first receiver 1201A comprises the antenna 452, the receiver 454 and the receiving processor 456 in FIG. 4 of the present disclosure.

In one embodiment, the first transmitter 1202A comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202A comprises the antenna 452, the transmitter 454, the multi-antenna transmitting processor 457 and the transmitting processor 468 in FIG. 4 of the present disclosure.

In one embodiment, the first transmitter 1202A comprises the antenna 452, the transmitter 454 and the transmitting processor 468 in FIG. 4 of the present disclosure.

Embodiment 12B

Embodiment 12B illustrates a structure block diagram of a processing device in a first node according to one embodiment of the present disclosure; as shown in FIG. 12B. In FIG. 12B, a first node's processing device 1200B comprises a first receiver 1201B and a first transmitter 1202B.

The first receiver 1201B determines that a physical-layer problem occurs in a first serving cell; as a response to the phrase of determining that a physical-layer problem occurs in a first serving cell, starts a first serving cell;

the first transmitter 1202B transmits a first signal; and
the first receiver 1201B, as a response to the first signal being triggered, starts a second timer; when the second timer is running, monitors a second signal, when the first timer is expired, maintains a radio connection and the second timer continues to time.

In Embodiment 12B, the first signal is used to trigger the second signal; and the second timer is related to a parameter of a maintenance base station of the first serving cell.

In one embodiment, the first receiver 1201 B, as a response to the first signal being triggered, resets a first counter and a second counter; herein, the first counter reaching a first value is used to determine to start the first timer; the second counter reaching a second value is used to determine to stop the first timer; and the first value and the second value are non-negative integers.

In one embodiment, the first receiver 1201B, after a first event occurs and when the second timer is expired, determines an occurrence of a radio connection failure; the first transmitter 1202B, as a response to the behavior of determining that an RLF occurs, transmits a first signaling; herein, the first signaling is used to request updating a radio connection, and the first event comprises that the second timer is running and the first timer is expired.

In one embodiment, the first receiver 1201B receives a second signaling; herein, the second signaling is used to indicate a first parameter set of the second timer; the first parameter set comprises a first expiration value and a first offset, and a sum of the first expiration value and the first offset is used to determine an end time of the second timer.

In one embodiment, the first parameter set comprises a first indicator, and the first indicator is used to determine whether the second timer is valid.

In one embodiment, the first receiver 1201B receives the second signal; as a response to receiving the second signal, stops the second timer.

In one embodiment, the first signal is transmitted when the first timer is running.

In one embodiment, the first receiver 1201B comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201B comprises the antenna 452, the receiver 454, the multi-antenna receiving processor 458 and the receiving processor 456 in FIG. 4 of the present disclosure.

In one embodiment, the first receiver 1201B comprises the antenna 452, the receiver 454 and the receiving processor 456 in FIG. 4 of the present disclosure.

In one embodiment, the first transmitter 1202B comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202B comprises the antenna 452, the transmitter 454, the multi-antenna transmitting processor 457 and the transmitting processor 468 in FIG. 4 of the present disclosure.

In one embodiment, the first transmitter 1202B comprises the antenna 452, the transmitter 454 and the transmitting processor 468 in FIG. 4 of the present disclosure.

Embodiment 12C

Embodiment 12C illustrates a structure block diagram of a processing device in a first node according to one embodiment of the present disclosure; as shown in FIG. 12C. In FIG. 12C, a first node's processing device 1200C comprises a first receiver 1201C and a first transmitter 1202C.

the first receiver 1201C receives a first signaling; starts a first timer; when a second timer is expired, updates a first counter; when the first timer is running and when the first counter reaches a first value, determines that an RLF occurs in a first serving cell;

in Embodiment 12C, the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, the first transmitter 1202C transmits a first signal; as a response to the first signal being transmitted, starts the first timer after waiting for a third time length; the first receiver 1201C receives a second signal; as a response to the second signal being received, stops the first timer; herein, the first signal comprises a measurement report, and the second signal comprises a response for the first signal.

In one embodiment, the first receiver 1201C, when a first condition set is satisfied, starts the first timer after waiting for a third time length; herein, the first condition set comprises determining that a physical-layer problem occurs in the first serving cell, or the first condition set comprises that the first signal is transmitted.

In one embodiment, the first receiver 1201C, when a second condition set is satisfied, stops the first timer; herein, the second condition comprises that the physical-layer problem is recovered, or the second condition set comprises that the second signal is received, or the second condition set comprises initiating a first procedure, the first procedure being used for a radio link update, or the second condition set comprises that the first counter reaches the first value, or the second condition set comprises that the first serving cell is released.

In one embodiment, the first receiver 1201C, when a third condition set is satisfied, resets the first counter; herein, the third condition set comprises that the first timer is started, or the third condition set comprises initiating a first procedure, or the third condition set comprises the first serving cell being released.

In one embodiment, the first receiver 1201C, when the physical-layer problem occurs in a first serving cell, starts the second timer; and when the physical-layer problem of the first serving cell is recovered, stops the second timer.

In one embodiment, when a timekeeping of the first timer reaches the first time length, the first counter not being less than a first value is used to determine an occurrence of the RLF.

In one embodiment, the first receiver 1201C comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201C comprises the antenna 452, the receiver 454, the multi-antenna receiving processor 458 and the receiving processor 456 in FIG. 4 of the present disclosure.

In one embodiment, the first receiver 1201C comprises the antenna 452, the receiver 454 and the receiving processor 456 in FIG. 4 of the present disclosure.

In one embodiment, the first transmitter 1202C comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202C comprises the antenna 452, the transmitter 454, the multi-antenna transmitting processor 457 and the transmitting processor 468 in FIG. 4 of the present disclosure.

In one embodiment, the first transmitter 1202C comprises the antenna 452, the transmitter 454 and the transmitting processor 468 in FIG. 4 of the present disclosure.

Embodiment 13A

Figure 13A:
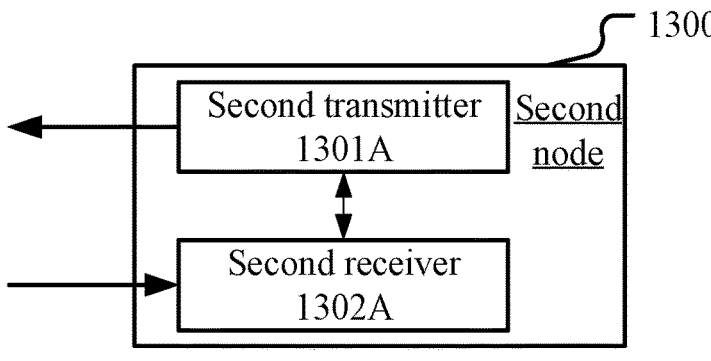
FIG. 13A illustrates a structure block diagram of a processing device in a second node according to one embodiment of the present disclosure.

Embodiment 13A illustrates a structure block diagram of a processing device in a second node according to one embodiment of the present disclosure; as shown in FIG. 13A. In FIG. 13A, a second node's processing device 1300A comprises a second transmitter 1301A and a second receiver 1302A.

A second receiver 1302A monitors a first signaling; and a second transmitter 1301A, when the first signaling is received, transmits a second signaling;

in Embodiment 13A, as a response to determining that a physical-layer problem occurs in a first serving cell, a first timer is started; as a response to a first condition set being satisfied, a second timer is started and the first timer is stopped; the first condition set comprises that an RLF occurs in the first serving cell and the second timer is configured; the second timer is associated with the first serving cell; the first signaling is used to initiate a radio connection recovery; and the second signaling is used to update a radio connection.

In one embodiment, the occurrence of the radio connection failure is unrelated to the first timer.

In one embodiment, as a response to determining that the physical-layer problem occurs in a second serving cell, a third timer is started; herein, a transmitting behavior of the first signaling does not affect a timing of the third timer.

In one embodiment, as a response to the second signaling being transmitted, when the second signaling comprises an RRC connection release message, the second timer being stopped; when the second signaling comprises an RRC connection reconfiguration message, a third signaling being received by a maintenance base station of the first serving cell, and the second timer being stopped; herein, the third signaling is used to confirm the RRC connection reconfiguration message.

In one embodiment, when the second timer is expired, a fourth signaling is received by a target node; herein, the fourth signaling is used to request an RRC connection reestablishment; and the target node is determined by a transmitter of the first signaling through cell selection.

In one embodiment, a fifth signaling is received by a maintenance base station of the first serving cell; herein, the fifth signaling is used to indicate an expiration value of the first timer and an expiration value of the second timer; the fifth signaling comprises a first field, and the first field is used to indicate a state of the second timer.

In one embodiment, when the second timer is in a running state, the first timer is not started.

In one embodiment, the second transmitter 1301A comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301A comprises the antenna 420, the transmitter 418, the multi-antenna transmitting processor 471 and the transmitting processor 416 in FIG. 4 of the present disclosure.

In one embodiment, the second transmitter 1301A comprises the antenna 420, the transmitter 418 and the transmitting processor 416 in FIG. 4 of the present disclosure.

In one embodiment, the second receiver 1302A comprises the antenna 420, the receiver 418, the multi-antenna receiving processor 472, the receiving processor 470, the controller/processor 475 and the memory in FIG. 4 of the present disclosure.

In one embodiment, the second receiver 1302A comprises the antenna 420, the receiver 418, the multi-antenna receiving processor 472 and the receiving processor 470 in FIG. 4 of the present disclosure.

In one embodiment, the second receiver 1302A comprises the antenna 420, the receiver 418 and the receiving processor 470 in FIG. 4 of the present disclosure.

Embodiment 13B

Figure 13B:
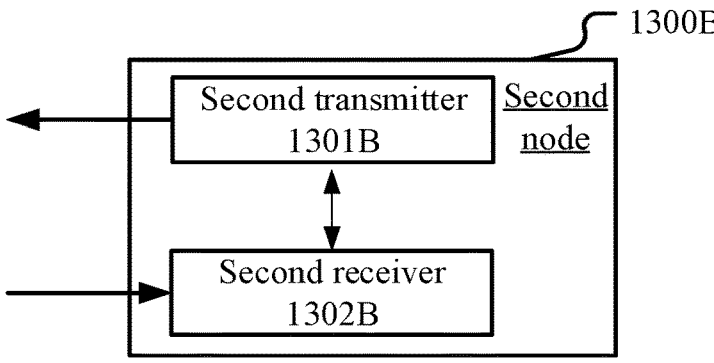
FIG. 13B illustrates a structure block diagram of a processing device in a second node according to one embodiment of the present disclosure.

Embodiment 13B illustrates a structure block diagram of a processing device in a second node according to one embodiment of the present disclosure, as shown in FIG. 13B. In FIG. 13B, a second node's processing device 1300B comprises a second transmitter 1301B and a second receiver 1302B.

The second receiver 1302B receives a first signal; and the second transmitter 1301B, as a response to the first signal being received, transmits a second signal;

in Embodiment 13B, as a response to determining that a physical-layer problem occurs in a first serving cell, a first timer is started; as a response to the first signal being triggered, a second timer is started; when the second timer is running, the second signal is monitored, and when the first timer is expired, a radio connection is maintained and the second timer continues timing; the first signal is used to trigger the second signal; and the second timer is related to a parameter of a maintenance base station of the first serving cell.

In one embodiment, as a response to the first signal being triggered, a first counter and a second counter are reset; herein, the first counter reaching a first value is used to determine to start the first timer; the second counter reaching a second value is used to determine to stop the first timer; and the first value and the second value are non-negative integers.

In one embodiment, the second receiver 1302B, as a response to determining that a radio connection failure occurs, receives a first signaling; herein, after a first event occurs and when the second timer is expired, an occurrence of the radio connection failure is determined; the first signaling is used to request updating a radio connection, and the first event comprises that the second timer is running and the first timer is expired.

In one embodiment, the second transmitter 1301B transmits a second signaling; herein, the second signaling is used to indicate a first parameter set of the second timer; the first parameter set comprises a first expiration value and a first offset, and a sum of the first expiration value and the first offset is used to determine an end time of the second timer.

In one embodiment, the first parameter set comprises a first indicator, and the first indicator is used to determine whether the second timer is valid.

In one embodiment, as a response to receiving the second signal, the second timer is stopped.

In one embodiment, the first signal is transmitted when the first timer is running.

In one embodiment, the second transmitter 1301B comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301B comprises the antenna 420, the transmitter 418, the multi-antenna transmitting processor 471 and the transmitting processor 416 in FIG. 4 of the present disclosure.

In one embodiment, the second transmitter 1301B comprises the antenna 420, the transmitter 418 and the transmitting processor 416 in FIG. 4 of the present disclosure.

In one embodiment, the second receiver 1302B comprises the antenna 420, the receiver 418, the multi-antenna receiving processor 472, the receiving processor 470, the controller/processor 475 and the memory in FIG. 4 of the present disclosure.

In one embodiment, the second receiver 1302B comprises the antenna 420, the receiver 418, the multi-antenna receiving processor 472 and the receiving processor 470 in FIG. 4 of the present disclosure.

In one embodiment, the second receiver 1302B comprises the antenna 420, the receiver 418 and the receiving processor 470 in FIG. 4 of the present disclosure.

Embodiment 13C

Figure 13C:
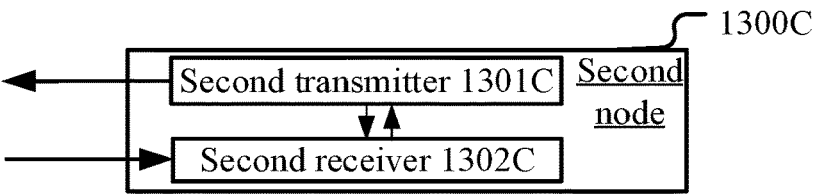
FIG. 13C illustrates a structure block diagram of a processing device in a second node according to one embodiment of the present disclosure.

Embodiment 13C illustrates a structure block diagram of a processing device in a second node according to one embodiment of the present disclosure; as shown in FIG. 13C. in FIG. 13C, a second node's processing device 1300C comprises a second transmitter 1301C and a second receiver 1302C.

The second transmitter 1301C transmits a first signaling;

In Embodiment 13C, a first timer is started; when a second timer is expired, the first counter is updated; when the first timer is running and the first counter reaches a first value, an occurrence of an RLF is determined in a first serving cell; the first signaling is used to determine a first time length and a second time length, the first time length is used to determine an expiration value of the first timer, and the second time length is used to determine an expiration value of the second timer; when a timekeeping of the second timer reaching the second time length is used to determine the second timer being expired; the first counter is used to determine expiration times of the second timer; the first counter is valid when the first timer is running; and the first timer is related to a parameter of a maintenance base station of the first serving cell.

In one embodiment, the second receiver 1302C receives a first signal; the second transmitter 1301C transmits a second signal; herein, as a response to the first signal being transmitted, the first timer is started after waiting for a third time length; as a response to the second signal being received, the first timer is stopped; the first signal comprises a measurement report, and the second signal comprises a response for the first signal.

In one embodiment, when a first condition set is satisfied, the first timer is started after waiting for a third time length; the first condition set comprises determining that a physical-layer problem occurs in the first serving cell, or the first condition set comprises that the first signal is transmitted.

In one embodiment, when a second condition set is satisfied, the first timer is stopped; herein, the second condition comprises that the physical-layer problem is recovered, or the second condition set comprises that the second signal is received, or the second condition set comprises initiating a first procedure, the first procedure being used for a radio link update, or the second condition set comprises that the first counter reaches the first value, or the second condition set comprises that the first serving cell is released.

In one embodiment, when a third condition set is satisfied, the first counter is reset; the third condition set comprises that the first timer is started, or the third condition set comprises initiating a first procedure, or the third condition set comprises the first serving cell being released.

In one embodiment, when the physical-layer problem occurs in a first serving cell, the second timer is started; and when the physical-layer problem of the first serving cell is recovered, the second timer is stopped.

In one embodiment, when a timekeeping of the first timer reaches the first time length, the first counter not being less than a first value is used to determine an occurrence of the RLF.

In one embodiment, the second transmitter 1301C comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301C comprises the antenna 420, the transmitter 418, the multi-antenna transmitting processor 471 and the transmitting processor 416 in FIG. 4 of the present disclosure.

In one embodiment, the second transmitter 1301C comprises the antenna 420, the transmitter 418 and the transmitting processor 416 in FIG. 4 of the present disclosure.

In one embodiment, the second receiver 1302C comprises the antenna 420, the receiver 418, the multi-antenna receiving processor 472, the receiving processor 470, the controller/processor 475 and the memory in FIG. 4 of the present disclosure.

In one embodiment, the second receiver 1302C comprises the antenna 420, the receiver 418, the multi-antenna receiving processor 472 and the receiving processor 470 in FIG. 4 of the present disclosure.

In one embodiment, the second receiver 1302C comprises the antenna 420, the receiver 418 and the receiving processor 470 in FIG. 4 of the present disclosure.

Embodiment 14

Figure 14:
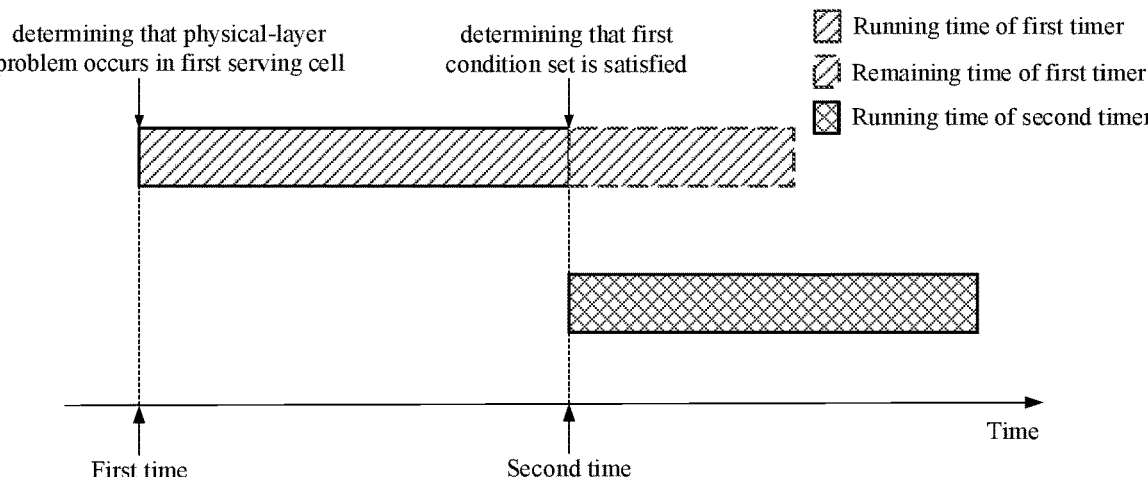
FIG. 14 illustrates a schematic diagram of a relative relation between a first timer and a second timer according to one embodiment of the present disclosure.

Embodiment 14 illustrates a schematic diagram of a relative relation of a first timer and a second timer according to one embodiment of the present disclosure, as shown in FIG. 14. In FIG. 14, the horizontal axis represents time, the slash-filled solid-line-framed box represents a running time of the first timer, the slash-filled dotted-line-framed box represents a remaining time of the first timer, and a diamond-filled solid-line-framed box represents a running time of the second timer; the leftmost of a slash-filled solid-line-framed box represents a start time of the first timer, the rightmost of a slash-filled solid-line-framed box represents an end time of the first timer, the rightmost of a slash-filled dotted-line-framed box represents an expiration time of the first timer; the leftmost of a diamond-filled solid-line-framed box represents a start time of the second timer, and the rightmost of a diamond-filled solid-line-framed box represents an end time or an expiration time of the second timer.

In Embodiment 14, the first node in the present disclosure determines that a physical-layer problem occurs in a first serving cell at a first time, and determine that a first condition set is satisfied at a second timer.

In one embodiment, the slash-filled solid-line-framed box and the slash-filled dotted-line-framed box are used together to determine a time length of the first timer.

In one embodiment, the first timer is started at the first time.

In one embodiment, the second timer is started at the second time and the first timer is stopped.

In one embodiment, starting the second timer is used to trigger stopping the first timer.

In one embodiment, when the second timer is started, the first timer is stopped.

In one embodiment, when the first condition set is satisfied, the first timer is stopped.

In one embodiment, when the first condition set is satisfied, the second timer is started.

In one embodiment, the first time represents a time when it is determined that a physical-layer problem occurs in a first serving cell.

In one embodiment, the first time represents a time in a duration when it is determined that a physical-layer problem occurs in a first serving cell.

In one subembodiment of the above embodiment, the first time length is related to a processing time.

In one subembodiment of the above embodiment, the first time length is related to implementation.

In one subembodiment of the above embodiment, the first time length is related to performance of the first node.

In one subembodiment of the above embodiment, the first time length is related to a system design.

In one subembodiment of the above embodiment, the first time length comprises a duration.

In one embodiment, the second timer represents a time determining that the first condition set is satisfied.

In one embodiment, the second timer represents a time within a second time length after determining that the first condition set is satisfied.

In one subembodiment of the above embodiment, the second time length is related to a processing time.

In one subembodiment of the above embodiment, the second time length is related to implementation.

In one subembodiment of the above embodiment, the second time length is related to performance of the first node.

In one subembodiment of the above embodiment, the second time length is related to a system design.

In one subembodiment of the above embodiment, the second time length comprises a duration.

In one embodiment, the first serving cell being released is used to determine the end time of the second timer.

In one subembodiment of the above embodiment, the first node receives the second signaling, and the second signaling comprises that an RRC connection release message is used to determine the first serving cell being released.

In one embodiment, the first node's completing an RRC connection reconfiguration is used to determine the end time of the second timer.

In one subembodiment of the above embodiment, the first node's transmitting the third signaling is used to determine that an RRC connection reconfiguration is completed.

In one subembodiment of the above embodiment, the first node receives the second signaling, the second signaling comprises an RRC connection reconfiguration message, and a configuration that the first node applies to the RRC connection reconfiguration message is used to determine a completion of an RRC connection reconfiguration.

In one embodiment, a running time of the second timer reaching the expiration value of the second timer is used to determine the expiration time of the second timer.

In one embodiment, when the second timer is started, the remaining time of the first timer does not continue timing.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:
a transmitter; and
a receiver,
wherein the UE is configured to:
on a condition that N310 out-of-sync indications are received from a lower layer for a first cell:
start a T310 timer,
on a condition that a T316 timer is configured and a radio link failure occurs while a T310 timer is running:
transmit a master cell group (MCG) failure information (MCGFailureInformation) message for fast MCG link recovery,
stop the T310 timer, and
after the T310 timer is stopped, start the T316 timer, and
during a time when the T316 timer is running, receive an RRCRelease message or an RRCConnectionReconfiguration message including reconfiguration-WithSync.

2. The UE according to claim 1, wherein the UE is configured to transmit the MCGFailureInformation message, stop the T310 timer and start the T316 timer on a condition that:
the radio link failure occurs for the first cell,
the UE is configured with a split SRB1 or an SRB3,
the first cell and a second cell are not suspended, and
the T316 timer is not running.

3. The UE according to claim 1, wherein the UE is configured to determine that the radio link failure occurred in the first cell on a condition that:
the T310 timer expires,
a timer T312 expires, an indication of reaching a maximum retransmission number is received from an MCG RLC,
an indication of reaching a maximum retransmission number of an SRB or a DRB is received from an MCG RLC,
an indication of a Random Access (RA) problem is received from an MCG Medium Access Control (MAC) and none of timers T300, T301, T304, T311 and T319 is running, or
an indication of an RA problem is received from an MCG MAC and none of timers T300, T301, T304, and T311 is running.

4. The UE according to claim 1, wherein:
a signaling radio bearer of the MCGFailureInformation message is SRB1 or SRB3, and;
a logical channel bearing the MCGFailureInformation message includes a Dedicated Control Channel (DCCH), and the MCGFailureInformation message includes a ULInformationTransferMRDC message.

5. The UE according to claim 1, wherein the occurrence of the radio link failure is unrelated to the T310 timer.

6. The UE according to claim 1, wherein the UE is configured to:
on condition that N310 out-of-sync indications are received for a second cell, start a third timer, wherein transmitting the MCGFailureInformation message does not affect a timing of the third timer.

7. The UE according to claim 1, wherein the UE is configured to stop the T316 timer and transmit a confirmation message on a condition that the RRCConnectionReconfiguration message is received.

8. The UE according to claim 7, wherein a signaling radio bearer of the confirmation message includes an SRB1 or an SRB3, a logical channel bearing the confirmation message includes a DCCH, and the confirmation message is an RRCConnectionReconfigurationComplete message.

9. The UE-according to claim 1, wherein: the UE is configured to transmit an RRCReestablishmentRequest message or an RRCConnectionReestablishmentRequest message in response to expiration of the T316 timer.

10. The UE according to claim 1, wherein: the RRCConnectionReconfiguration message indicates an expiration value of the T310 timer and an expiration value of the T316 timer.

11. The UE according to claim 10, wherein a signaling radio bearer of the RRCConnectionReconfiguration message is SRB1 or SRB3.

12. The UE according to claim 1, wherein the T310 timer is not started on a condition that the T316 timer is running.

13. The UE according to claim 12, wherein the T310 timer is started on a condition that the T316 timer is not running.

14. A method, comprising:
receiving N310 out-of-sync indications from a lower layer for a first cell, and starting a T310 timer,
wherein a T316 timer is configured and a radio link failure occurs while the T310 timer is running;
transmitting a master cell group (MCG) failure information (MCGFailureInformation) message for fast MCG link recovery,
stopping the T310 timer, and
starting a T316 timer, wherein the T316 timer is started after the T310 timer is stopped; and
during a time when the T316 timer is running, receiving an RRCRelease message or an RRCConnectionReconfiguration message including reconfigurationWithSync.

* * * * *